US010762688B2

(12) United States Patent
Ogata

(10) Patent No.: US 10,762,688 B2
(45) Date of Patent: Sep. 1, 2020

(54) INFORMATION PROCESSING APPARATUS, INFORMATION PROCESSING SYSTEM, AND INFORMATION PROCESSING METHOD

(71) Applicant: SONY CORPORATION, Tokyo (JP)

(72) Inventor: Masami Ogata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 16/073,931

(22) PCT Filed: Nov. 21, 2016

(86) PCT No.: PCT/JP2016/084408
§ 371 (c)(1),
(2) Date: Jul. 30, 2018

(87) PCT Pub. No.: WO2017/141511
PCT Pub. Date: Aug. 24, 2017

(65) Prior Publication Data
US 2019/0043245 A1 Feb. 7, 2019

(30) Foreign Application Priority Data
Feb. 17, 2016 (JP) ................. 2016-028033

(51) Int. Cl.
H04N 7/15 (2006.01)
H04N 7/14 (2006.01)
(Continued)

(52) U.S. Cl.
CPC ............. G06T 15/20 (2013.01); G06T 19/00 (2013.01); G06T 19/20 (2013.01); H04N 7/14 (2013.01);
(Continued)

(58) Field of Classification Search
None
See application file for complete search history.

(56) References Cited

U.S. PATENT DOCUMENTS 6,285,392 B1 9/2001 Satoda et al.
7,742,623 B1 * 6/2010 Moon ................ G06K 9/00604
382/103

(Continued)

FOREIGN PATENT DOCUMENTS

JP 2000-165831 A 6/2000
JP 3139100 B2 2/2001

(Continued)

OTHER PUBLICATIONS

Nguyen et al. (MultiView: Spatially Faithful Group Video Conferencing, ACM, 2005) (Year: 2005).*

(Continued)

Primary Examiner — Kyle Zhai
(74) Attorney, Agent, or Firm — Chip Law Group

(57) ABSTRACT

Achieving a configuration that reduces the artificiality to give a strange feeling about the viewpoint of the user displayed on the display unit appearing different from the actual viewpoint. Photographed images from a plurality of different viewpoints are input to generate a plurality of virtual viewpoint images, and then, the plurality of virtual viewpoint images is combined to generate a combined image to be output on a display unit. The virtual viewpoint image generation unit generates a plurality of user viewpoint-corresponding virtual viewpoint images each corresponding to each of viewpoints of each of a plurality of viewing users viewing the display unit, while the image combining unit extracts a portion from each of the plurality of user viewpoint-corresponding virtual viewpoint images in accordance with a relative position between the viewing user and the display unit, and combines the extracted image to generate a combined image. The combined image is generated by extracting a display region image located at a front position of the viewing user at the viewpoint corresponding to the virtual viewpoint image from among the user view- (Continued)

point-corresponding virtual viewpoint images corresponding to individual viewing users.

18 Claims, 30 Drawing Sheets

(51) Int. Cl.
 G06T 15/20 (2011.01)
 G06T 19/20 (2011.01)
 G06T 19/00 (2011.01)
(52) U.S. Cl.
 CPC ............. H04N 7/141 (2013.01); H04N 7/147 (2013.01); H04N 7/15 (2013.01); *G06T 2219/2004* (2013.01)

(56) References Cited

U.S. PATENT DOCUMENTS

2006/0083421 A1   4/2006   Weiguo et al.
2014/0063177 A1*  3/2014   Tian .................... H04N 7/15
                                             348/14.07
2014/0098179 A1*  4/2014   Moore ................ H04N 13/239
                                             348/14.08
2017/0188002 A1*  6/2017   Chan .................. H04N 13/128

FOREIGN PATENT DOCUMENTS

| JP | 3289730 B2 | 6/2002 |
| JP | 2006-114023 A | 4/2006 |
| JP | 2012-070081 A | 4/2012 |
| JP | 2012-088538 A | 5/2012 |
| JP | 2014-096701 A | 5/2014 |

OTHER PUBLICATIONS

International Search Report and Written Opinion of PCT Application No. PCT/JP2016/084408, dated Feb. 21, 2017, 07 pages of ISRWO.

* cited by examiner

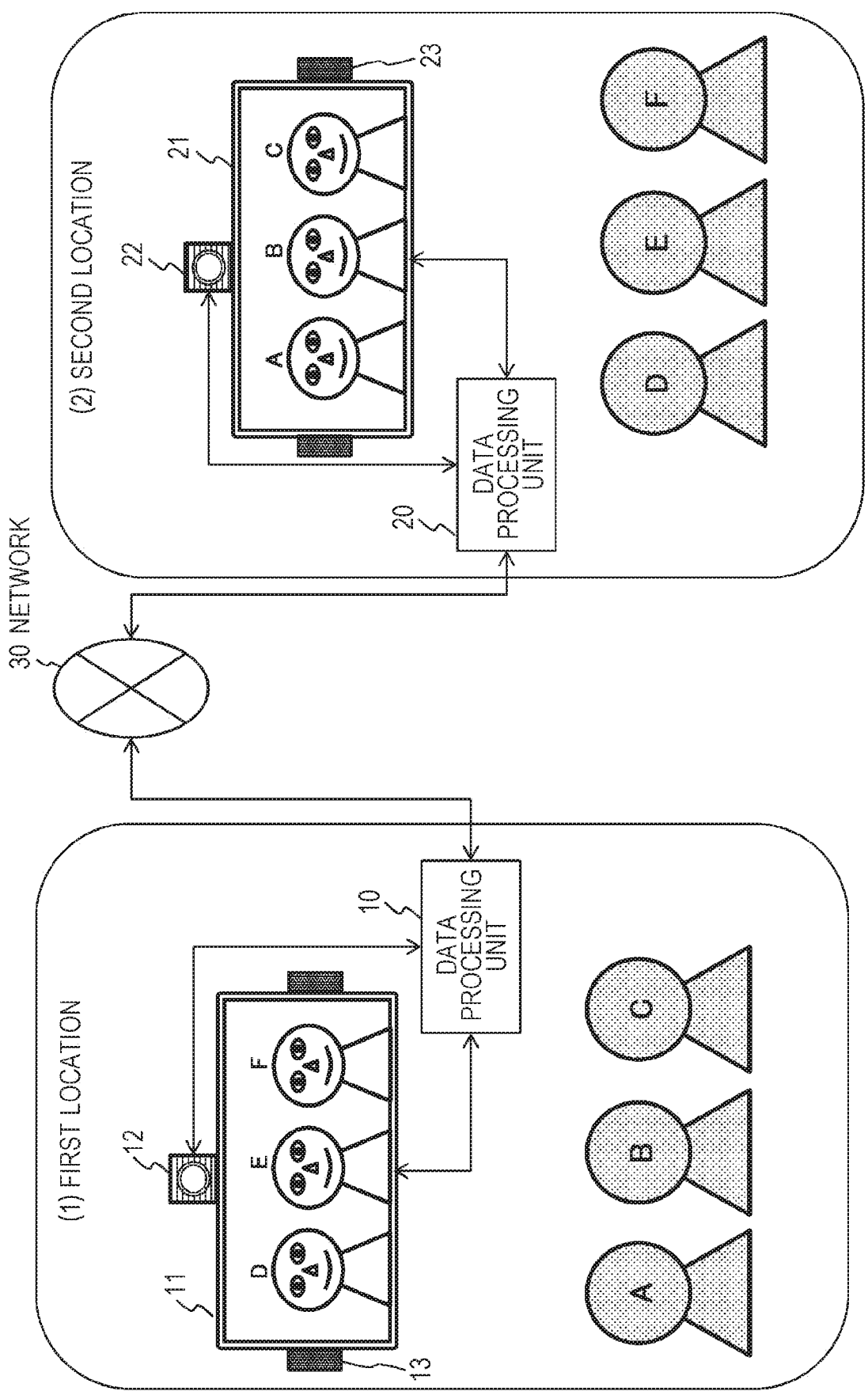

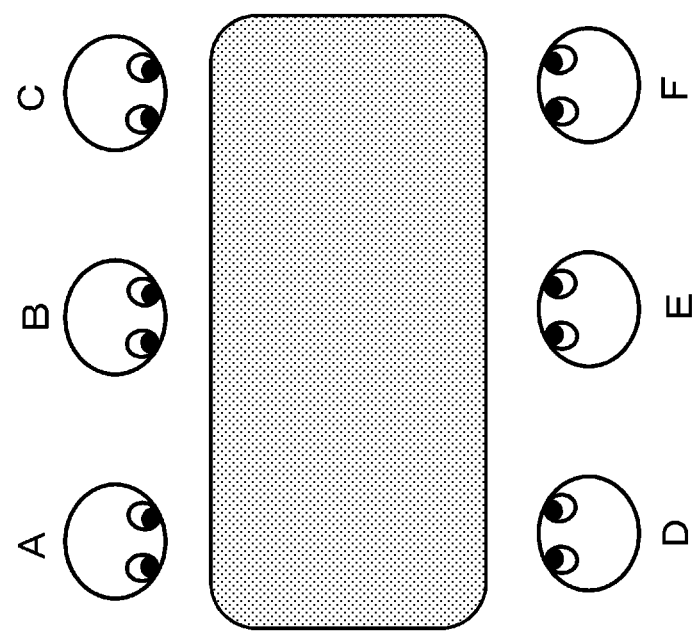
FIG. 2C  RELATIVE IMAGE
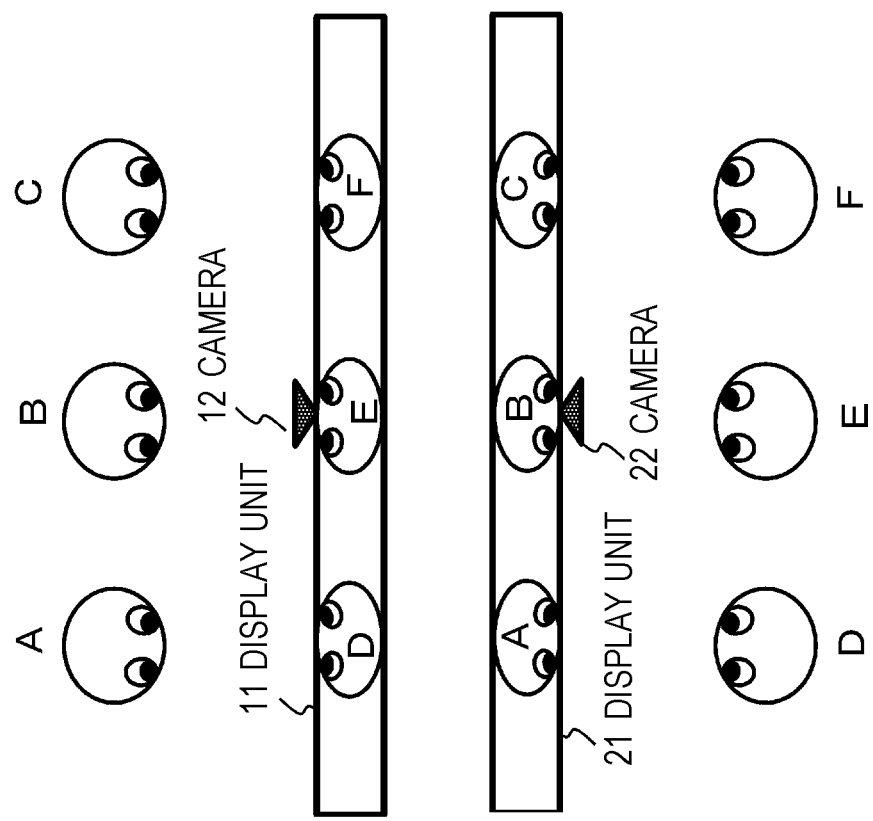
FIG. 2A  FIRST LOCATION
FIG. 2B  SECOND LOCATION

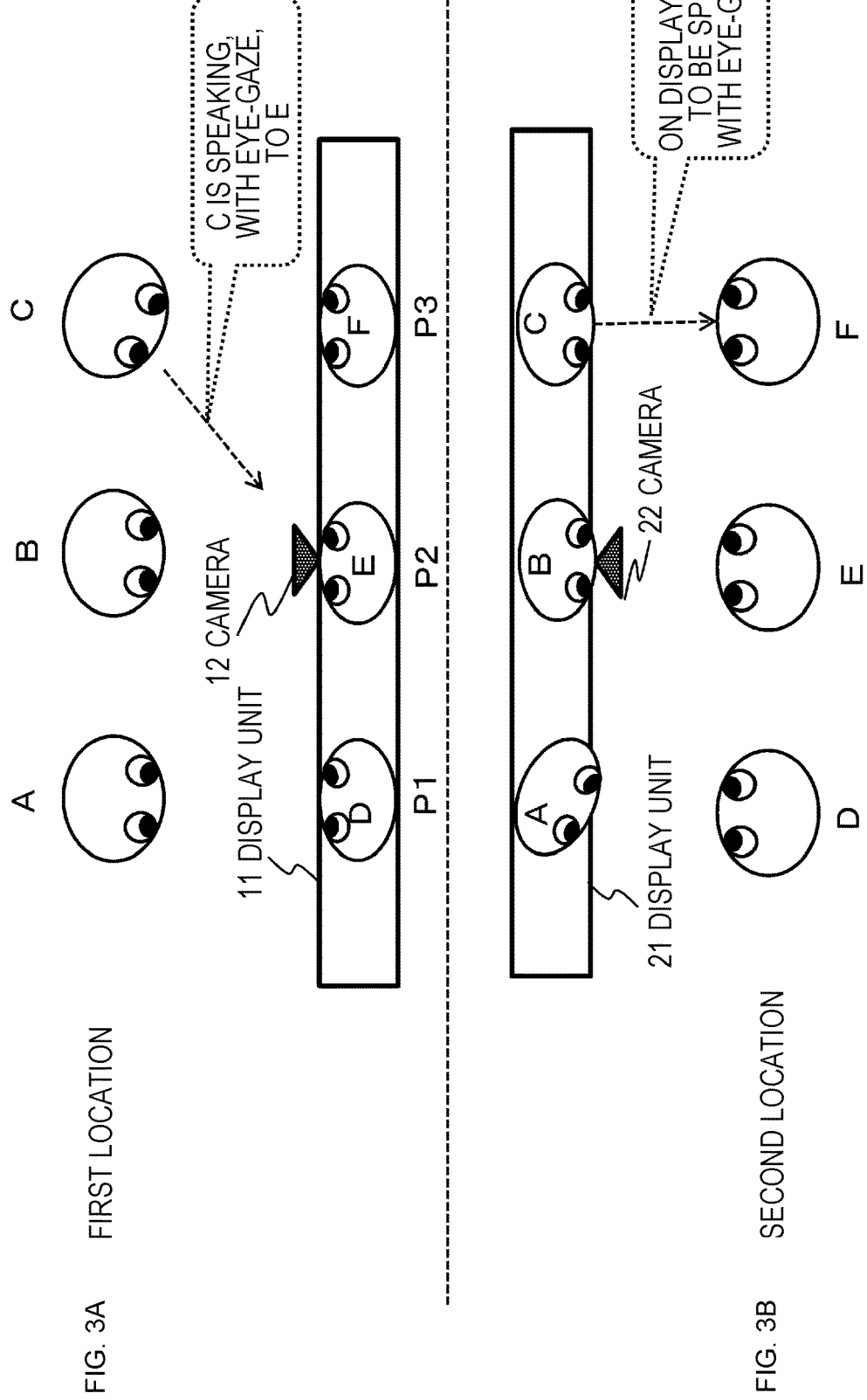

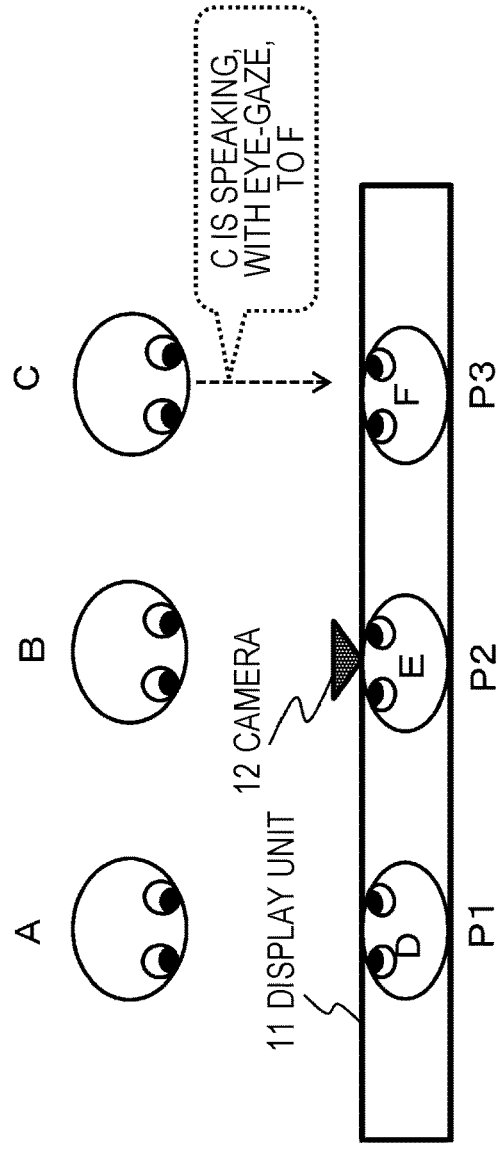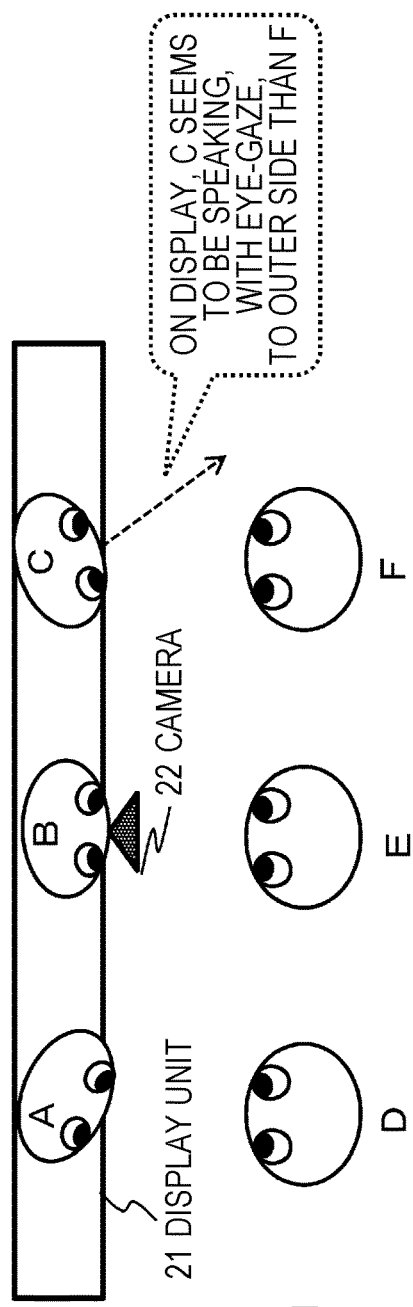
FIG. 4A  FIRST LOCATION
FIG. 4B  SECOND LOCATION

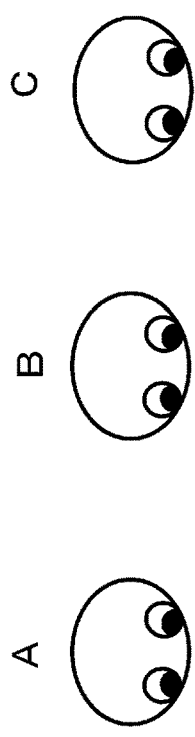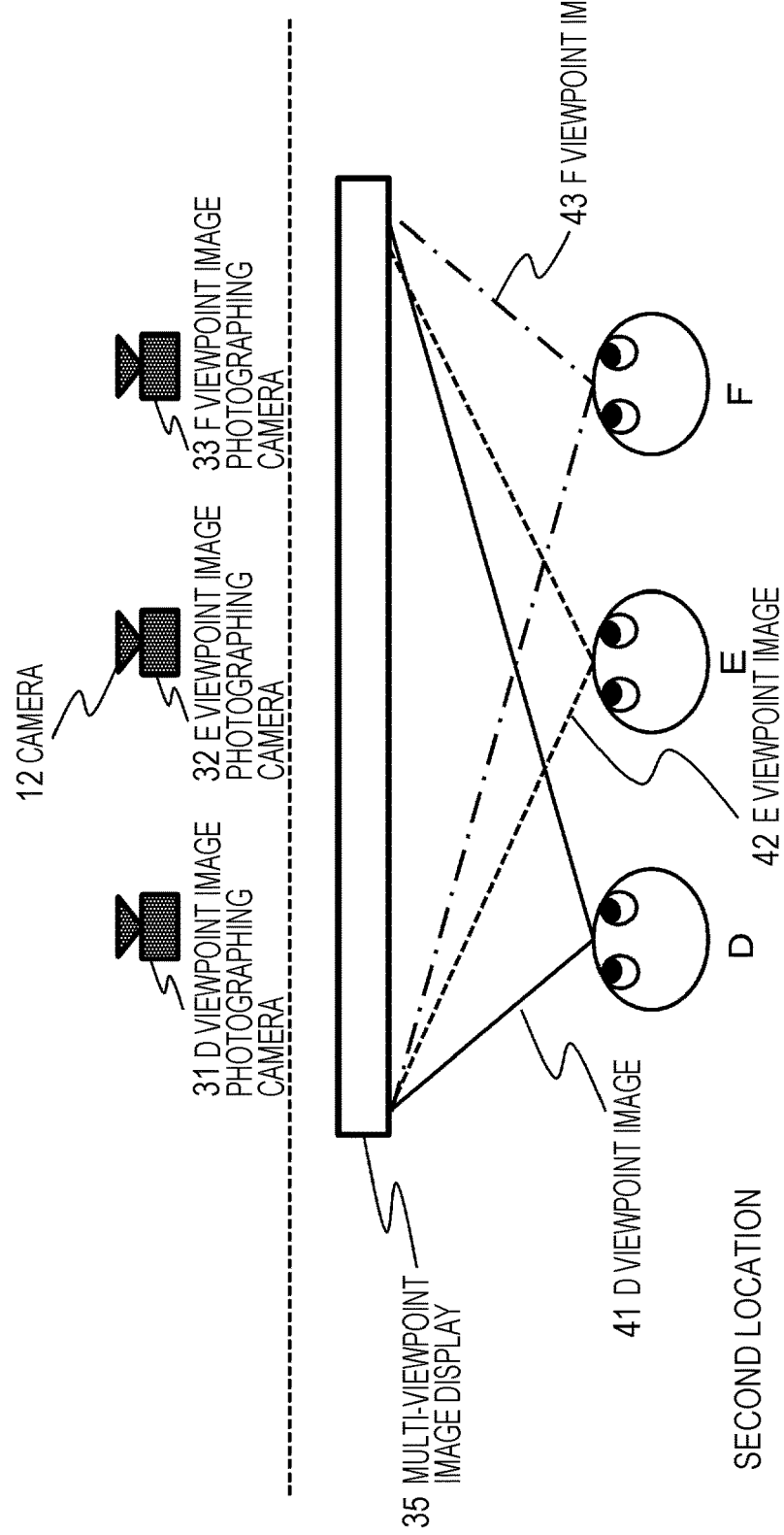

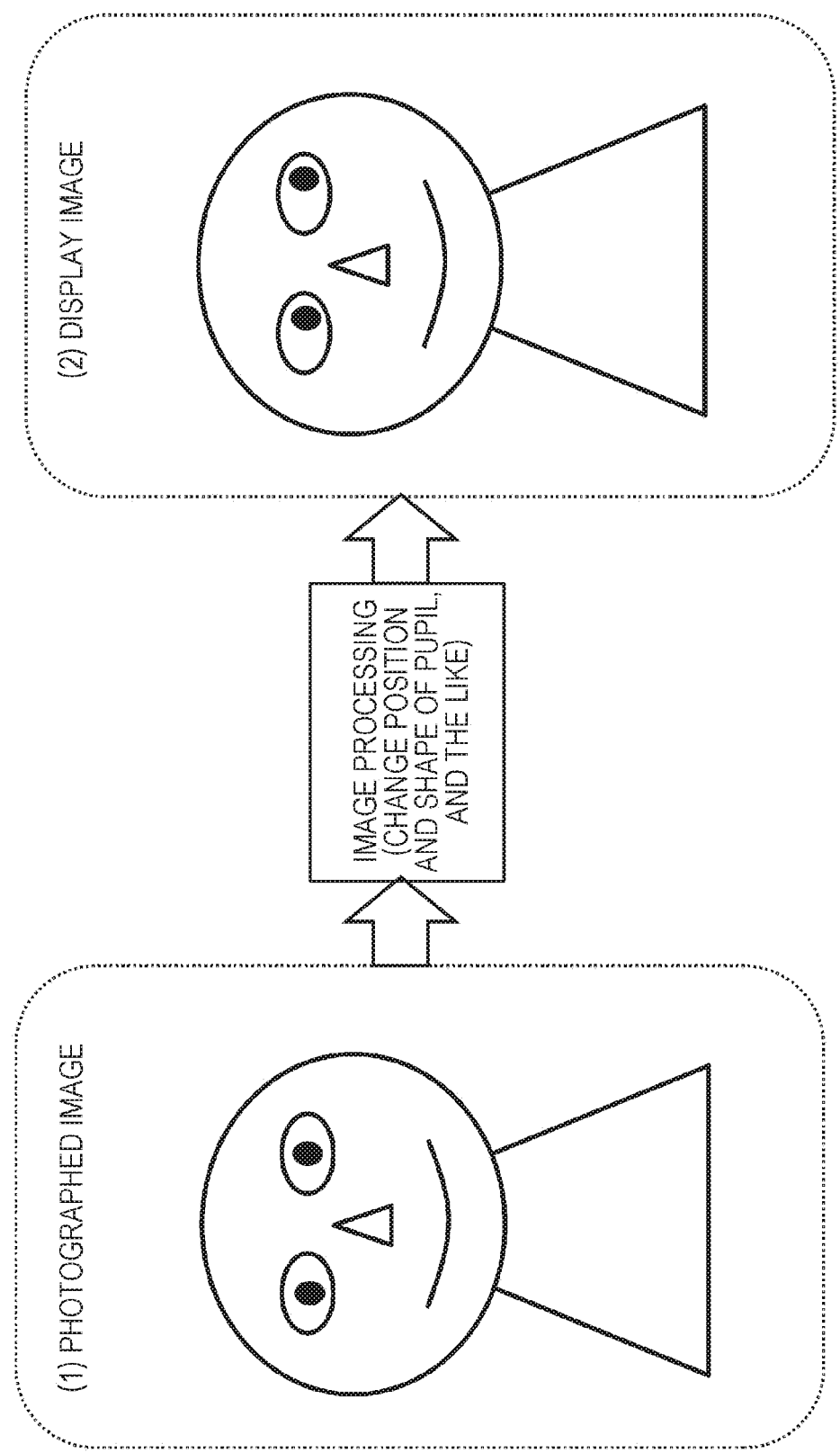

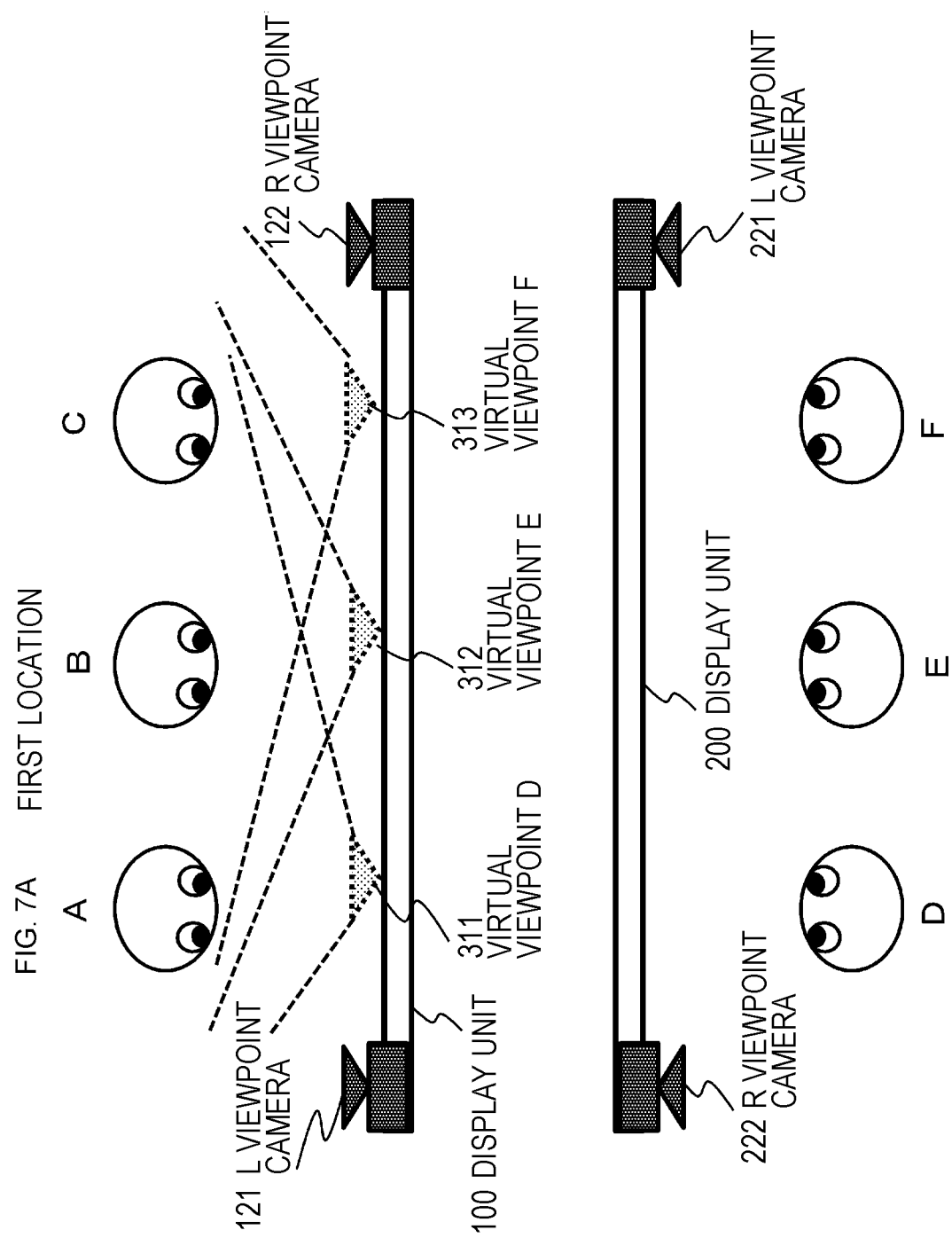

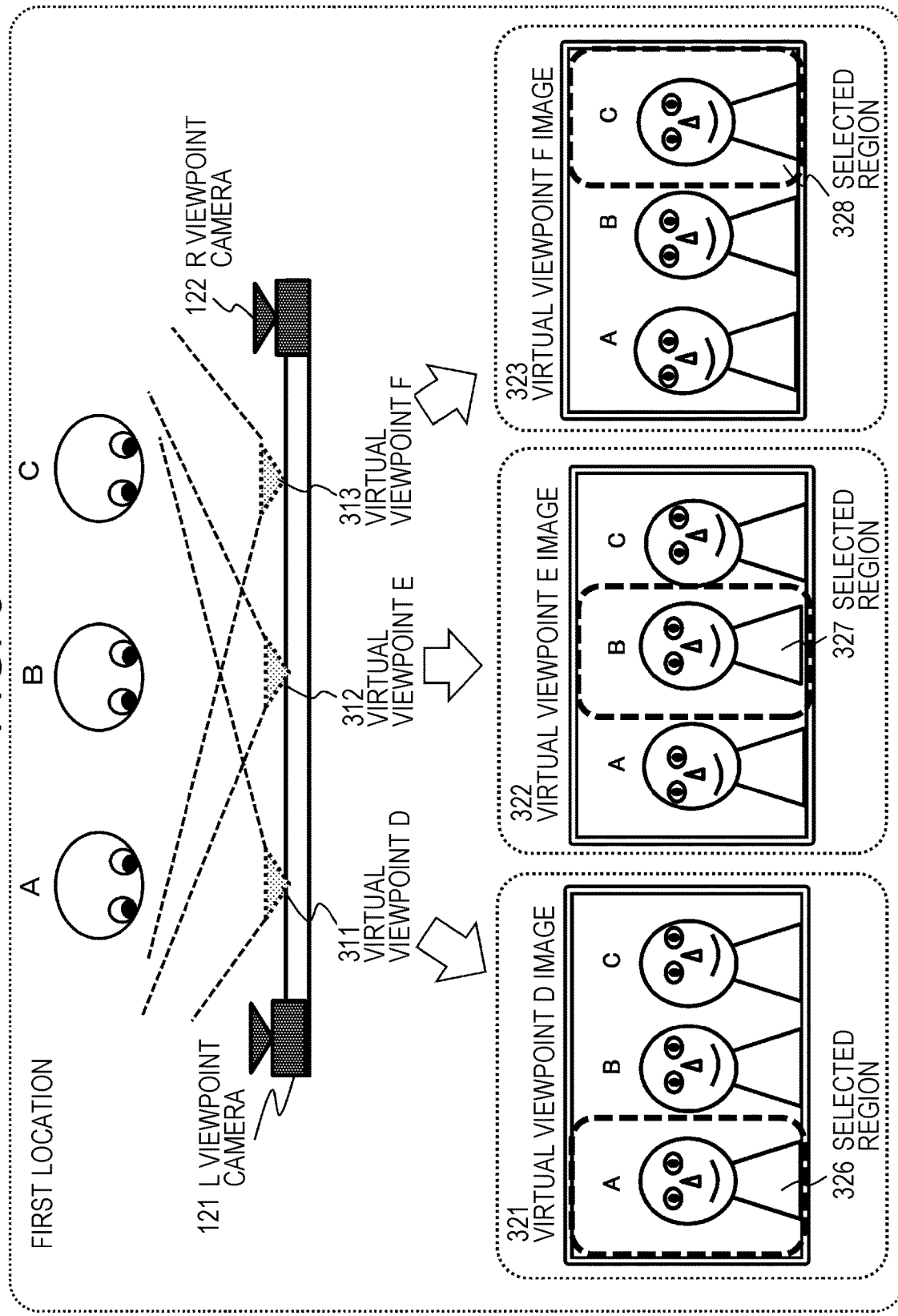

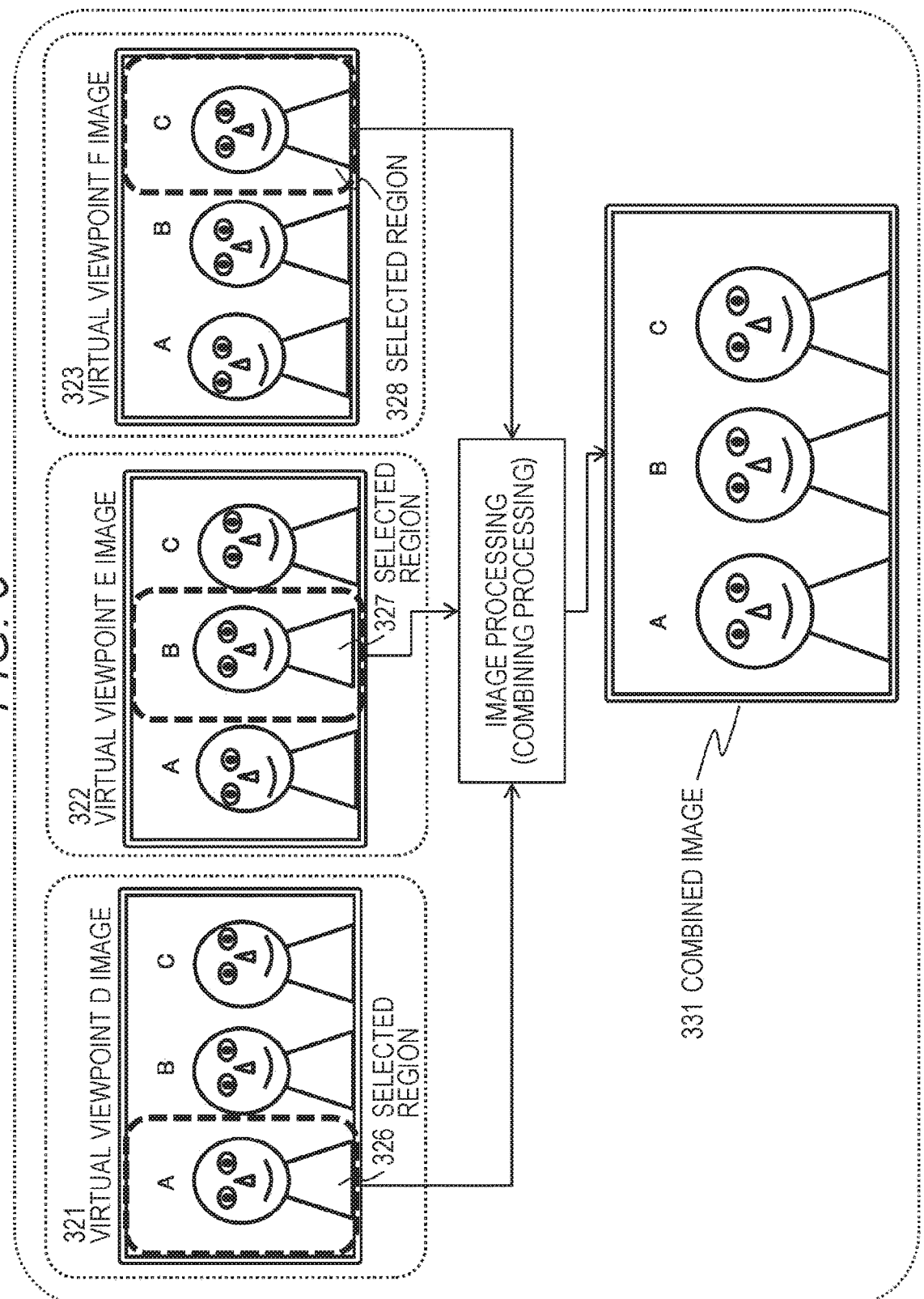

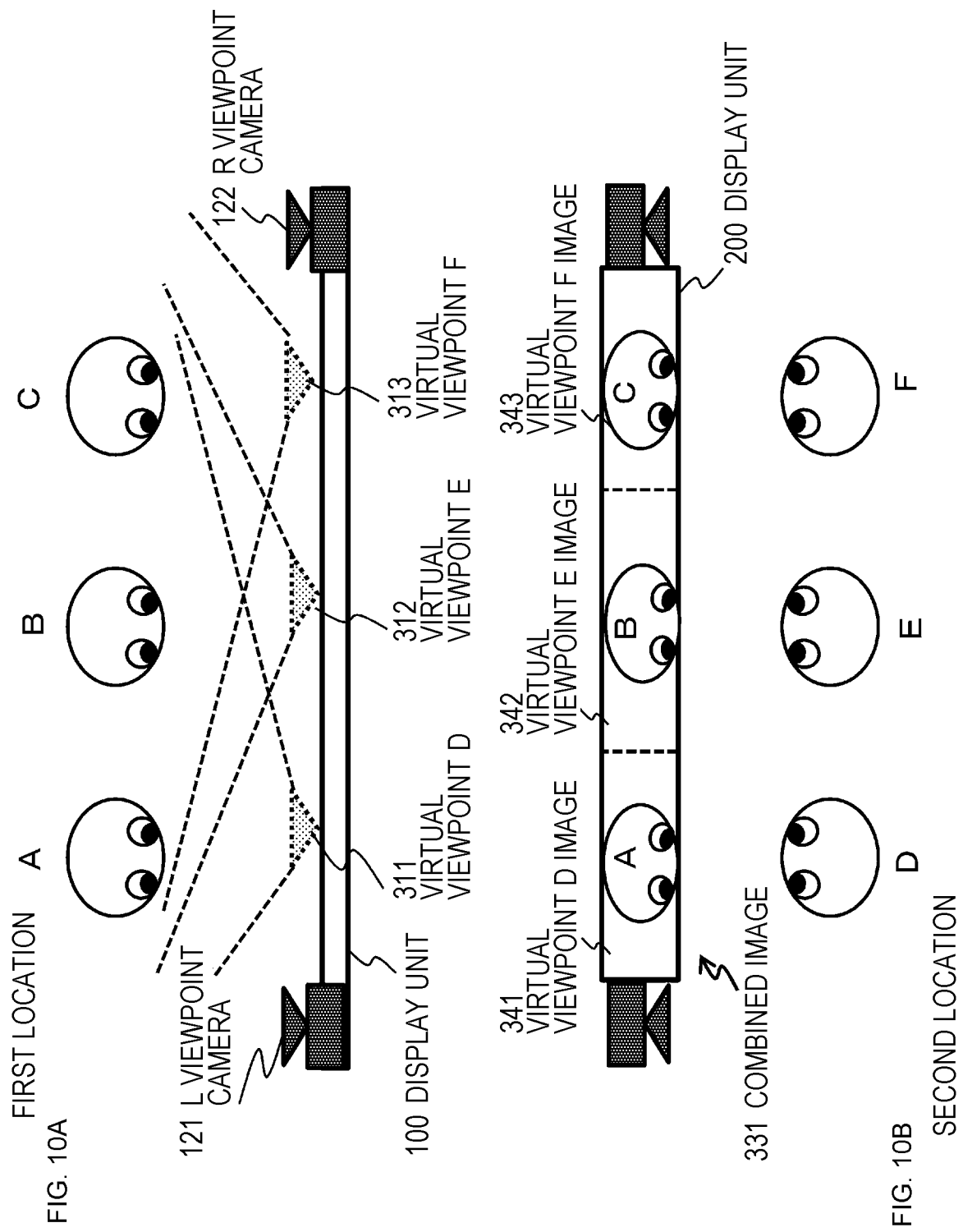

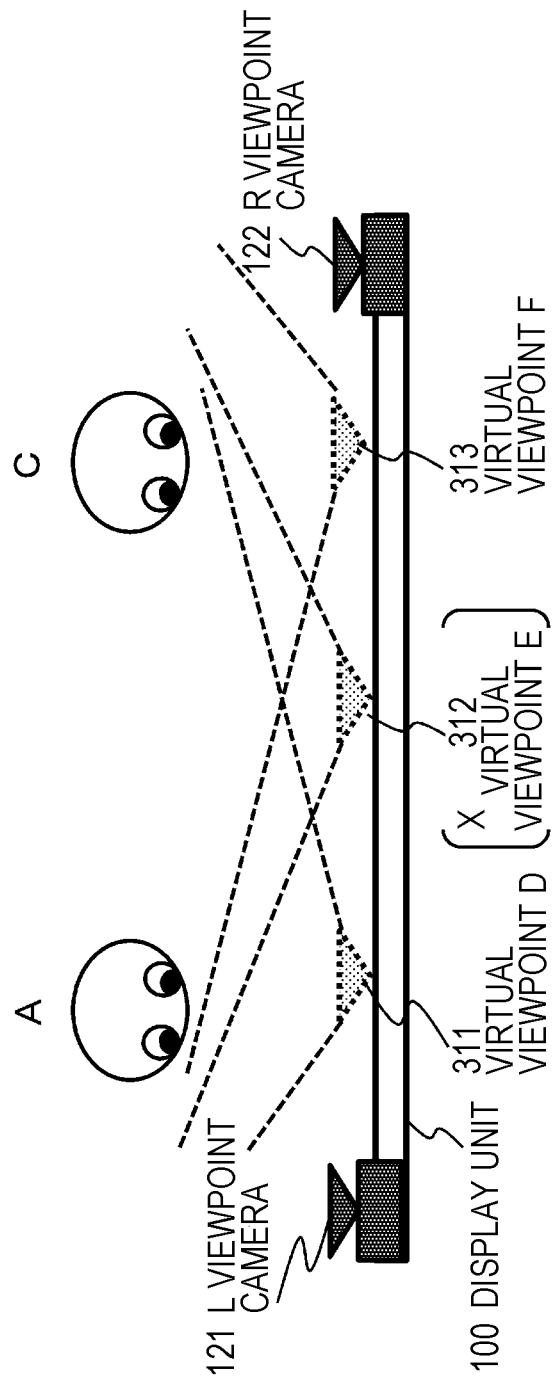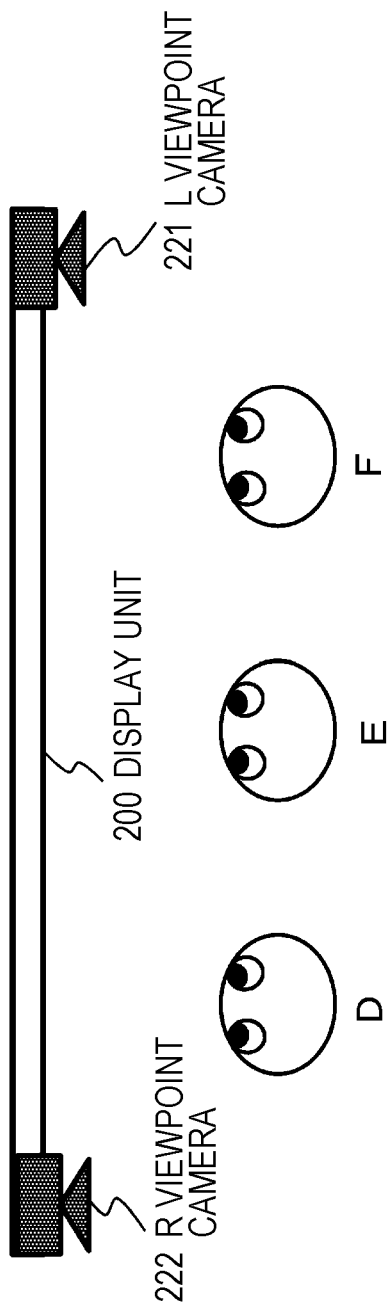

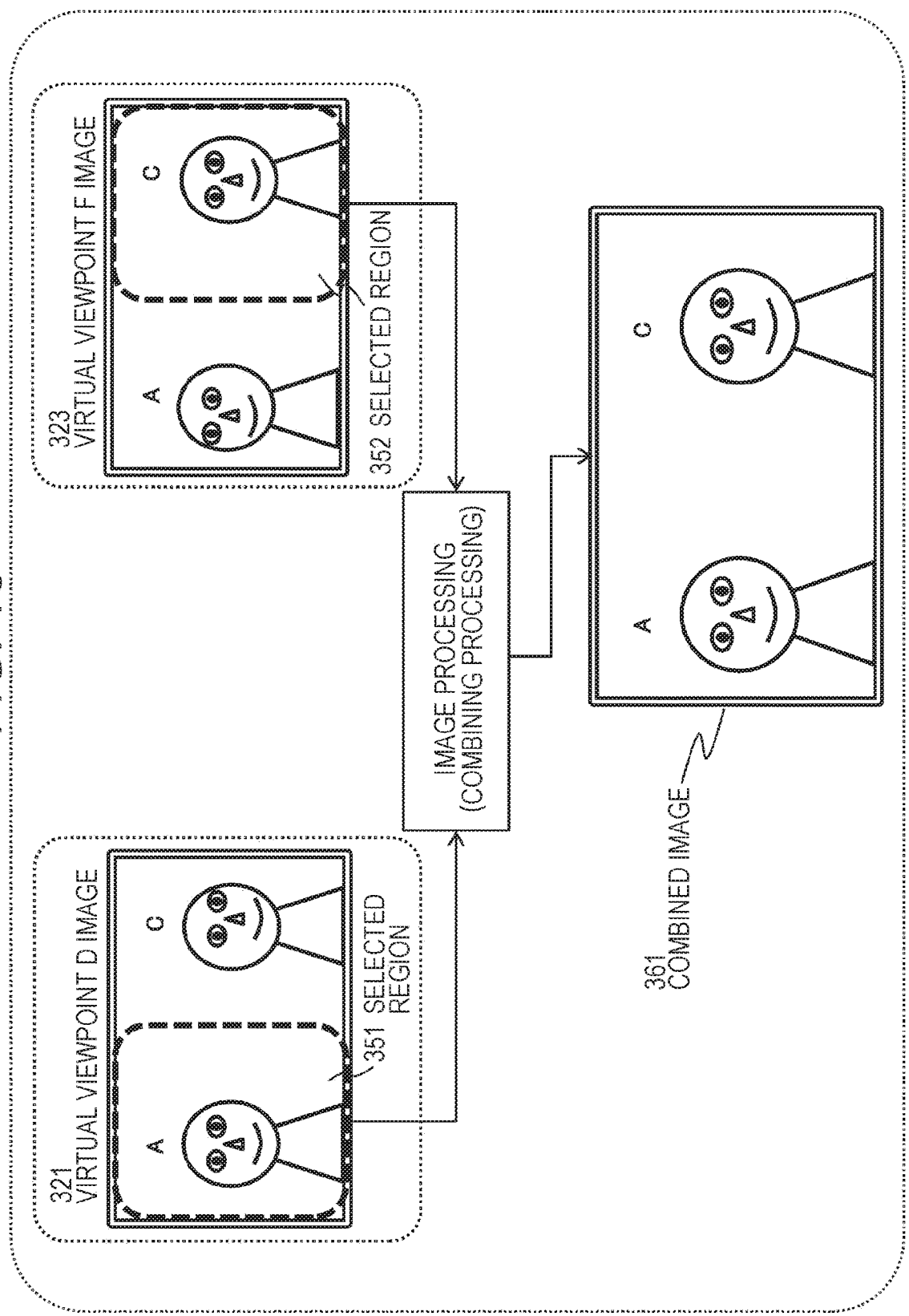

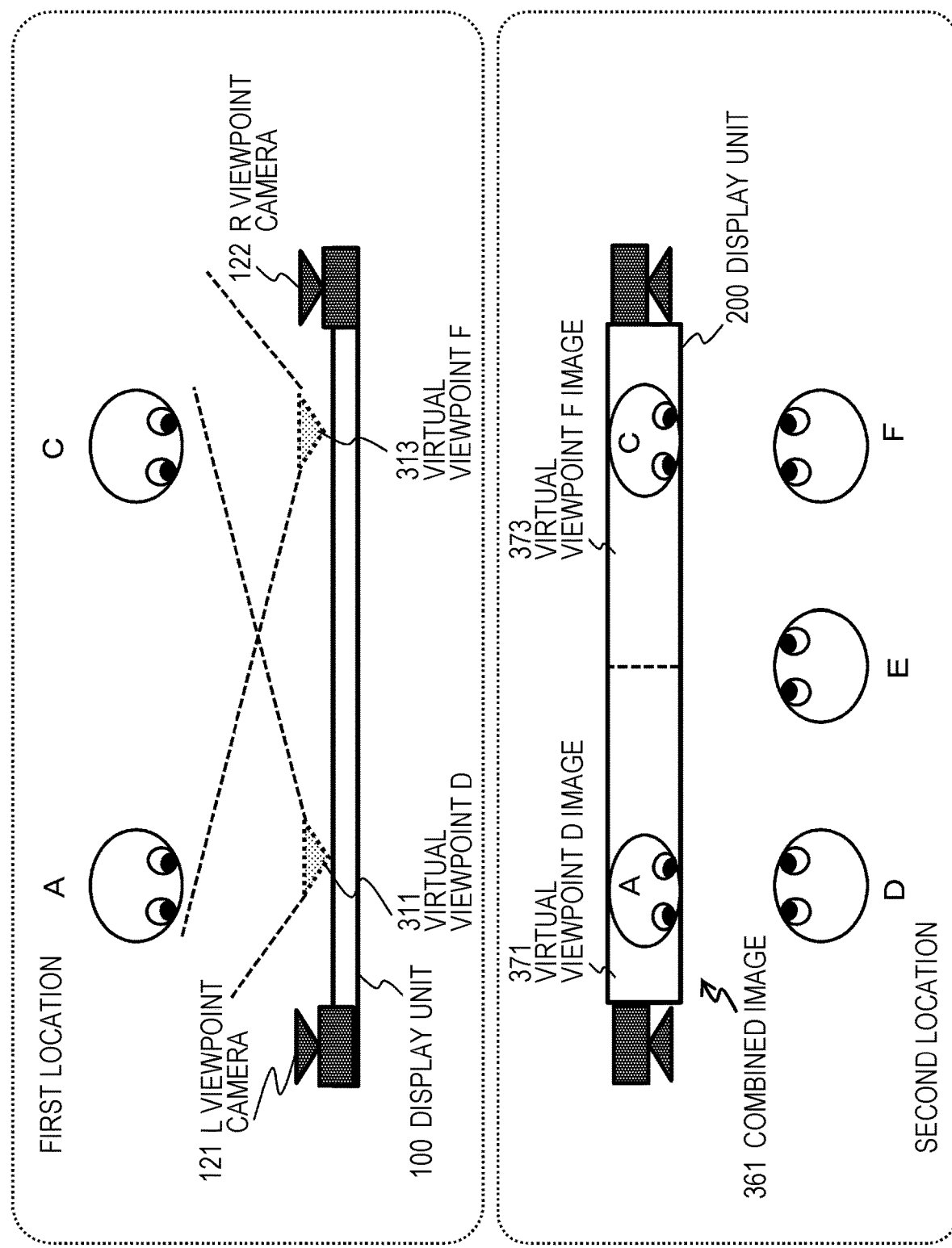

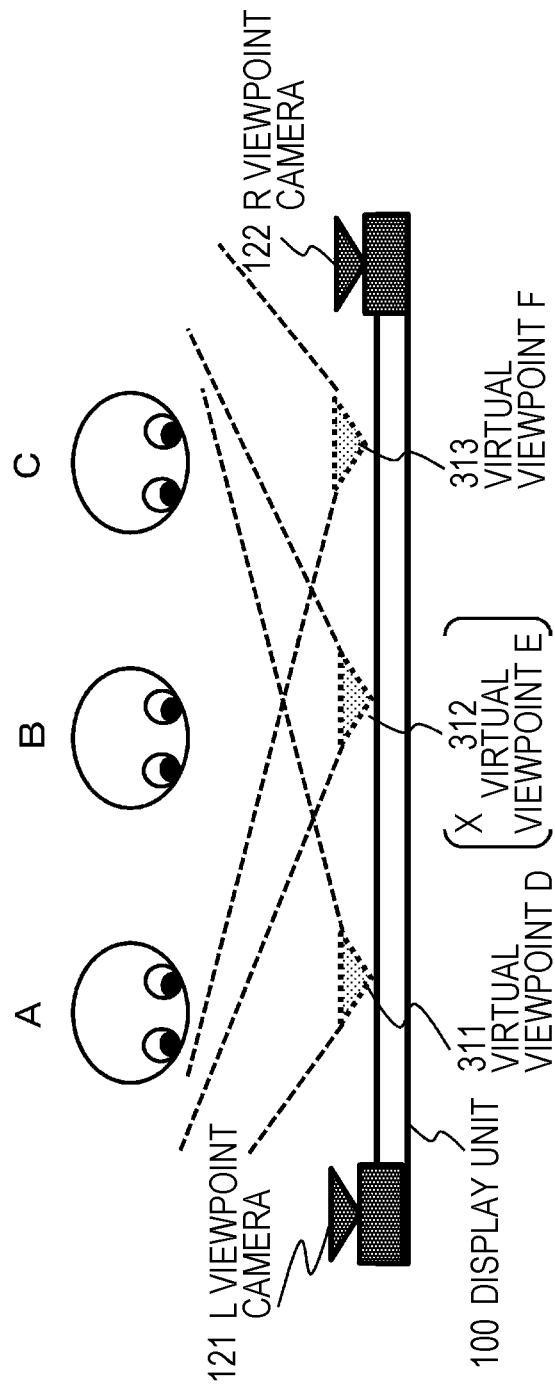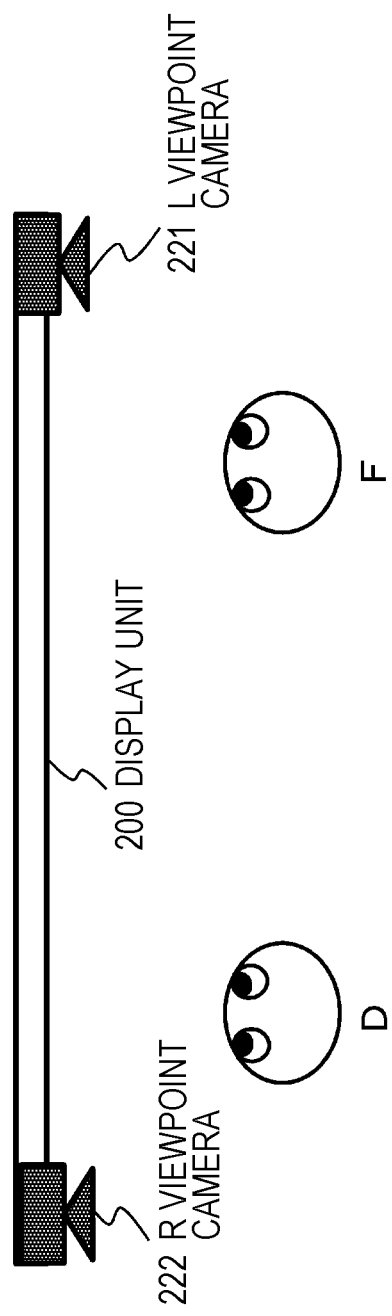
FIG. 15A  FIRST LOCATION
FIG. 15B  SECOND LOCATION

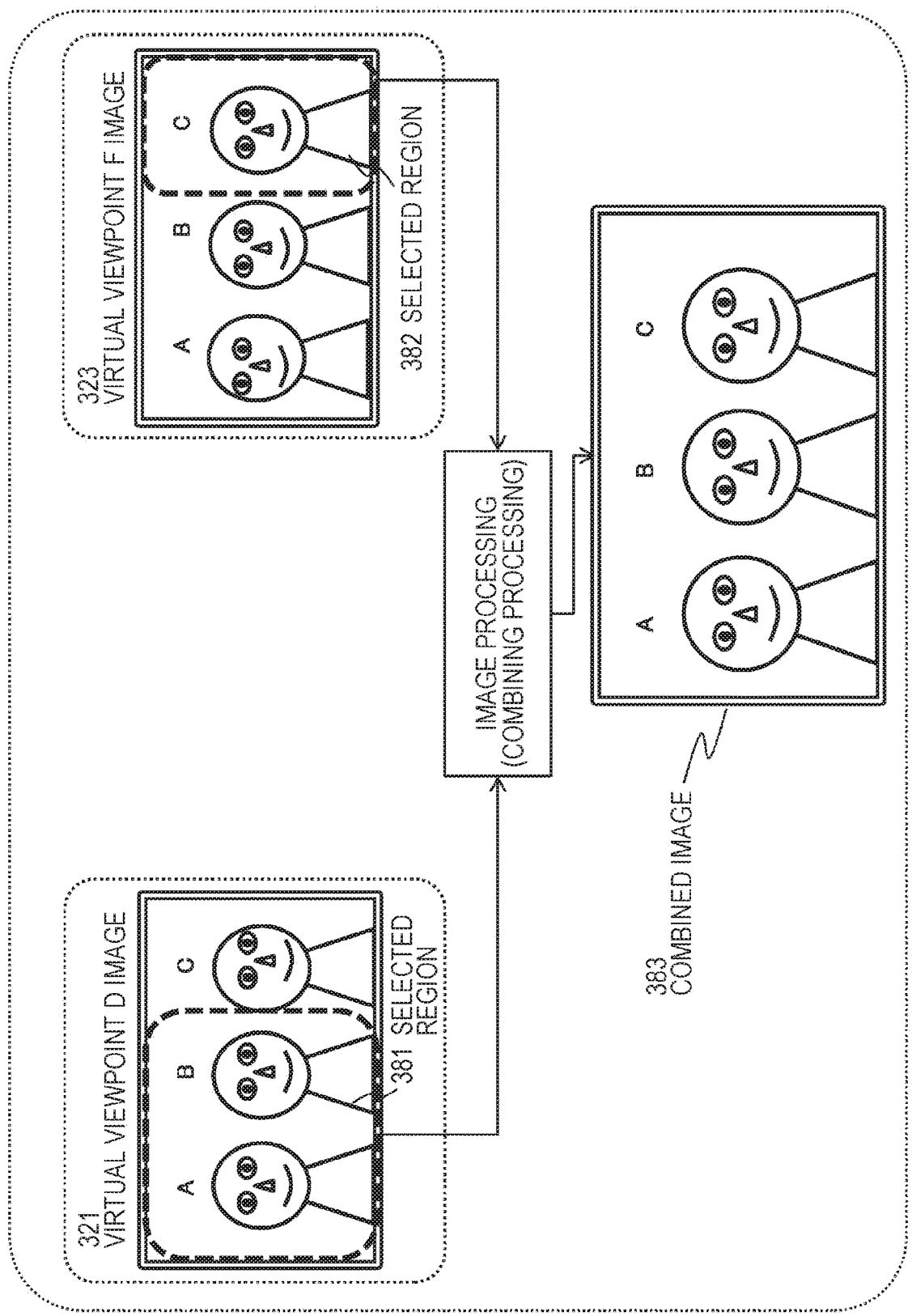

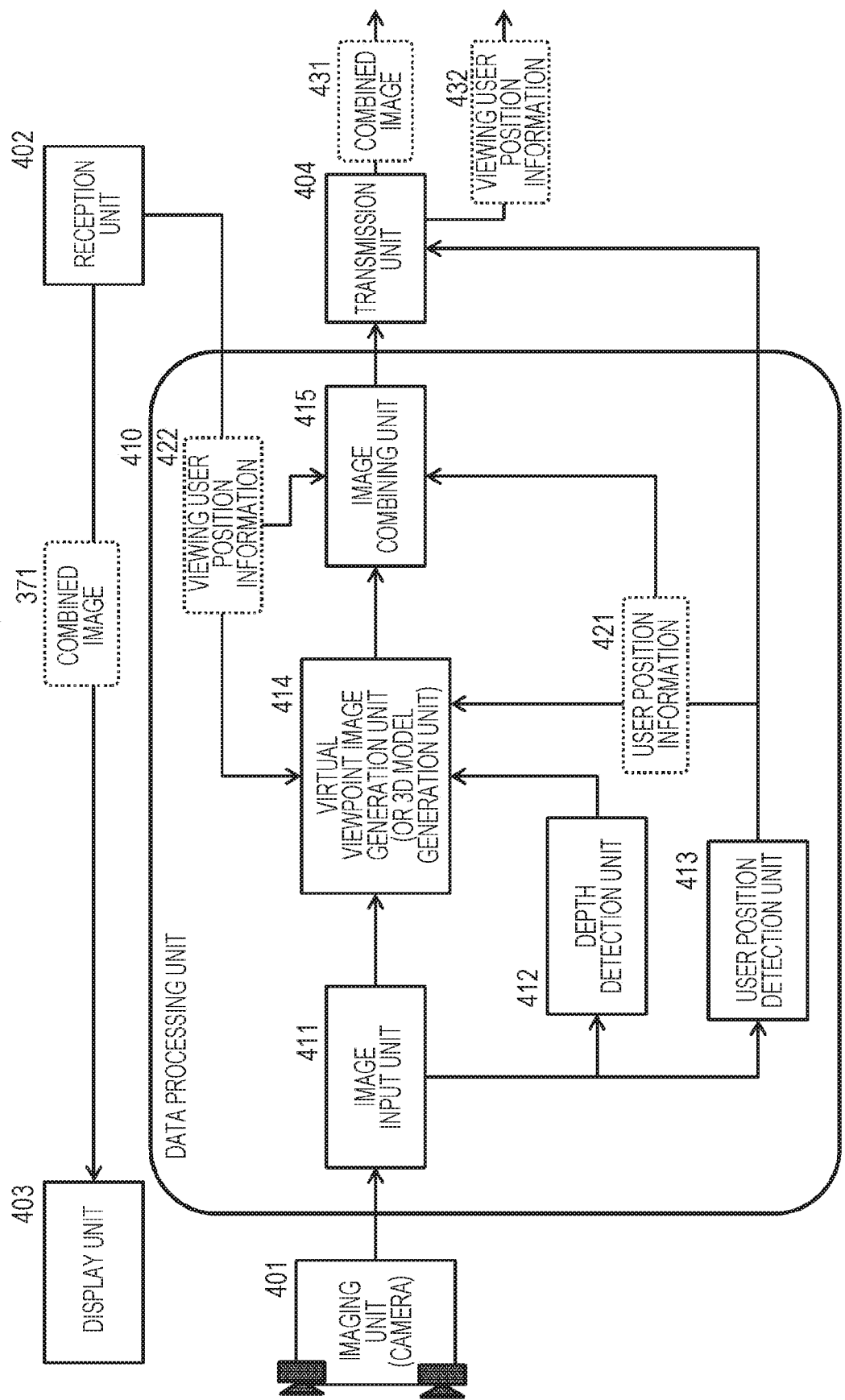

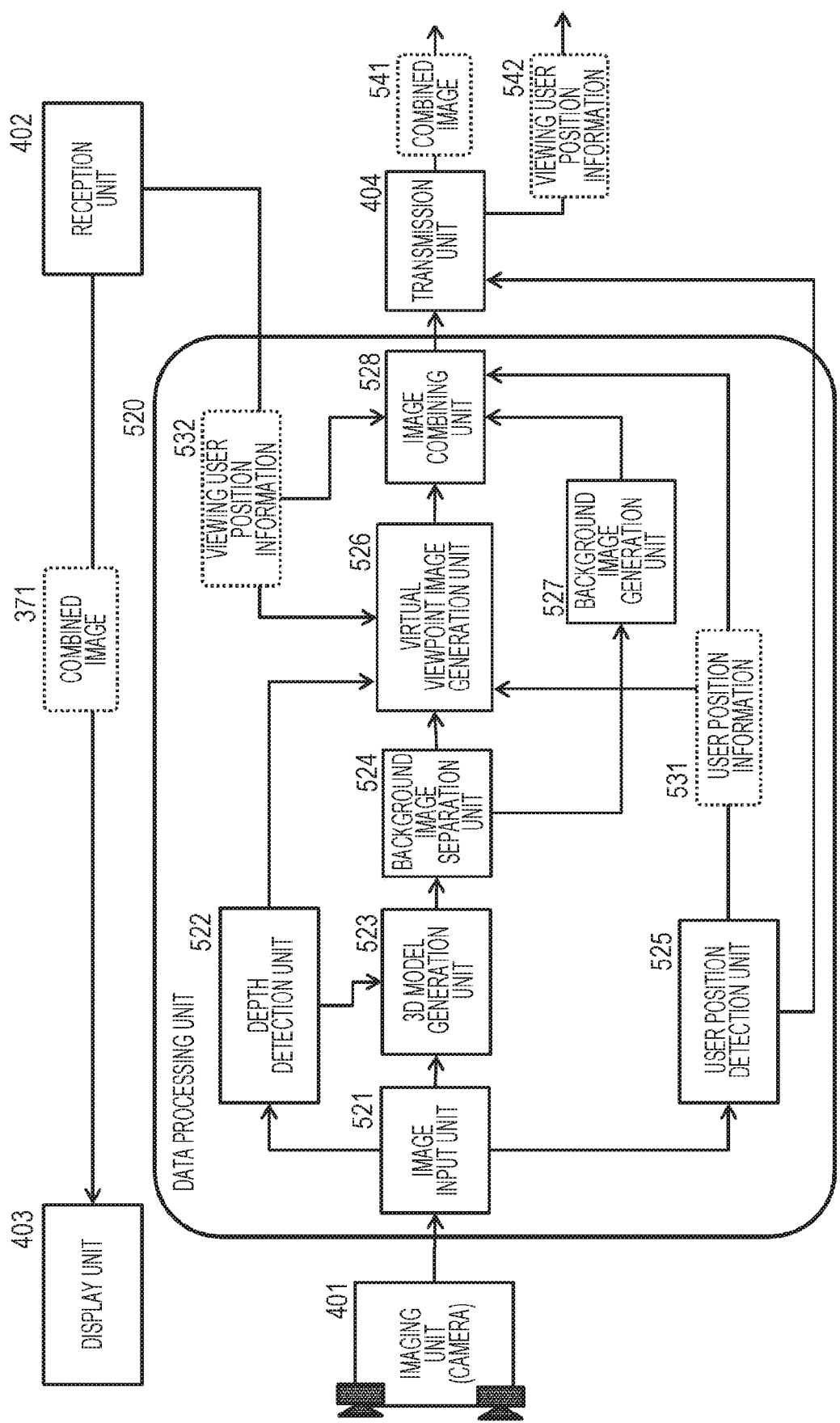

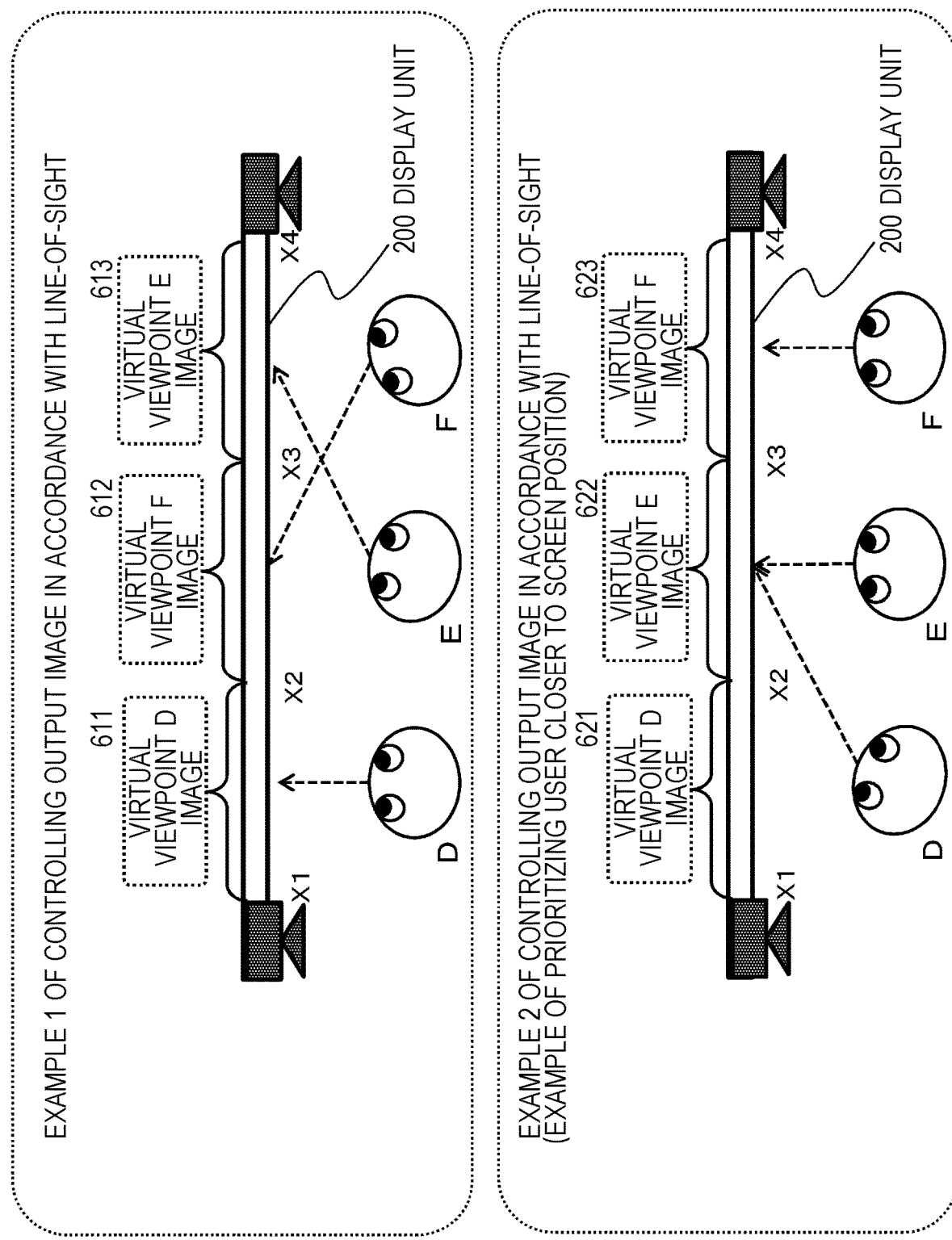

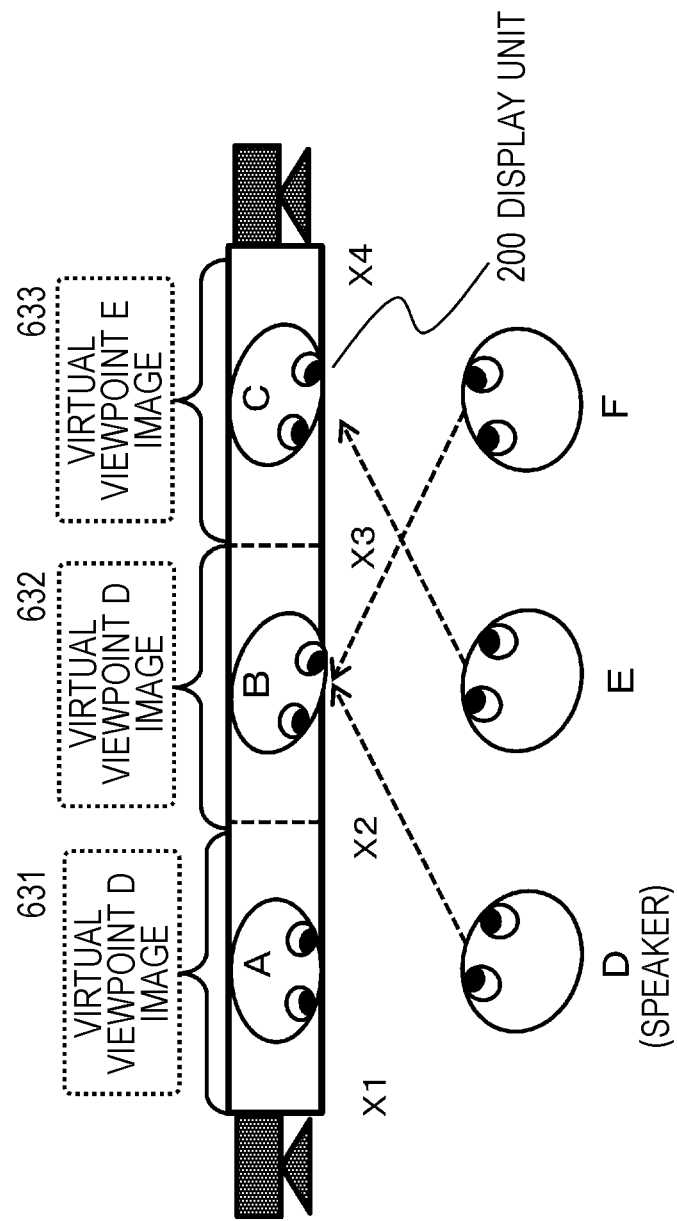

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2016/084408 filed on Nov. 21, 2016, which claims priority benefit of Japanese Patent Application No. JP 2016-028033 filed in the Japan Patent Office on Feb. 17, 2016. Each of the above-referenced applications is hereby incorporated herein by reference in its entirety.

TECHNICAL FIELD

The present disclosure relates to an information processing apparatus, an information processing system, an information processing method, and a program. More specifically, for example, the present invention relates to an information processing apparatus, an information processing system, an information processing method, and a program that transmit images and voices by bidirectional telecommunication via a network so as to execute bidirectional communication.

BACKGROUND ART

An bidirectional communication system such as a video conference system that transmits images and voices through bidirectional telecommunication via a network is used in various fields.

In recent years, a large number of high-definition large displays are frequently used with enhanced quality of images and voices exchanged in telecommunication via the network, making it possible to perform communication with remote users displayed on the display with realistic feeling.

This bidirectional communication system, however, includes a problem that a line-of-sight direction of a user such as a conference participant displayed on a display unit (display) does not match the direction in which the user actually gazes.

This is because the camera that photographs the user (conference participant) is a photographed image from a certain viewpoint. An image photographed from one camera viewpoint is displayed on a display apparatus on another party.

In a case, however, where there is a viewing user viewing the display image from a direction different from the viewpoint of the camera, the viewing user would feel strange in the viewpoint direction of the user displayed on the display unit.

This problem can be serious particularly in a case where a plurality of users (for example, conference participant) is present in front of the display unit.

In a case where a plurality of viewers is present in front of the display unit, the user at the position corresponding to the position of the camera that photographed the display image on the display unit can observe the image without feeling strange. In contrast, the user existing at a position different from the position corresponding to the position of the camera that photographed the display image on the display unit, the line-of-sight of the other user (conference participant) displayed on the display unit might look completely different from the original situation.

Examples of conventional technologies disclosing a configuration to solve such a problem include Patent Document 1 (Japanese Patent No. 3139100), Patent Document 2 (Japanese Patent No. 3289730), Patent Document 3 (Japanese Patent Application Laid-Open No. 2012-070081), Patent Document 4 (Japanese Patent Application Laid-Open No. 2014-096701), Patent Document 5 (Japanese Patent Application Laid-Open No. 2012-088538), and the like.

The methods disclosed in these conventional technologies, however, include a configuration that requires the use of a special display, a configuration of correcting an eye image of a face included in the image to change the line-of-sight direction, or the like. The configuration using a special display would disable the use of the conventional display, resulting in high cost. In addition, the configuration of correcting the image of the eyes of the face and changes the line-of-sight direction would be a problem such as artificiality to give a strange feeling about the facial expression because the face is partially corrected.

CITATION LIST

Patent Document

Patent Document 1: Japanese Patent No. 3139100
Patent Document 2: Japanese Patent No. 3289730
Patent Document 3: Japanese Patent Application Laid-Open No. 2012-070081
Patent Document 4: Japanese Patent Application Laid-Open No. 2014-096701
Patent Document 5: Japanese Patent Application Laid-Open No. 2012-088538

SUMMARY OF THE INVENTION

Problems to be Solved by the Invention

The present disclosure has been made in view of the above-described problems, for example, and aims to provide an information processing apparatus, imaging apparatus, information processing system, an information processing method, and a program capable of providing a display image of a display unit (display) used in a bidirectional communication system as an image with reduced artificiality to give a strange feeling, for example.

One exemplary embodiment of the present disclosure is to provide an information processing apparatus, an imaging apparatus, an information processing system, an information processing method and a program capable of matching a line-of-sight direction of a user displayed in a display region of a display unit observed by many viewing user with an actual line-of-sight direction.

Solutions to Problems

A first aspect of the present disclosure is an information processing apparatus including:

a virtual viewpoint image generation unit that inputs a photographed image from a plurality of different viewpoints and generates a plurality of virtual viewpoint images; and an image combining unit that combines the plurality of virtual viewpoint images to generate a combined image to be output to a display unit, in which the virtual viewpoint image generation unit generates a plurality of user viewpoint-corresponding virtual viewpoint images each corresponding to each of viewpoints of a plurality of viewing users viewing the display unit, and the image combining unit extracts a portion of each of the plurality of user viewpoint-corresponding virtual viewpoint images in accordance with a relative position between the viewing user and the display unit, and combines the extracted images to generate the combined image.

Furthermore, a second aspect of the present disclosure is an information processing apparatus including:

a reception unit that executes data reception via a communication network;

a virtual viewpoint image generation unit that inputs, via the reception unit, a photographed image from a plurality of different viewpoints and generates a plurality of virtual viewpoint images;

an image combining unit that combines the plurality of virtual viewpoint images to generate a combined image to be output to a display unit, and the display unit that displays the combined image, in which the virtual viewpoint image generation unit generates a plurality of user viewpoint-corresponding virtual viewpoint images each corresponding to each of viewpoints of a plurality of viewing users viewing the display unit, and the image combining unit extracts a portion of each of the plurality of user viewpoint-corresponding virtual viewpoint images in accordance with a relative position between the viewing user and the display unit, and combines the extracted images to generate the combined image.

Furthermore, a third aspect of the present disclosure is an information processing system including: a transmission apparatus that executes image transmission; and a reception apparatus that receives a transmission image from the transmission apparatus and displays the transmission image on a display unit, in which the transmission apparatus includes:

a virtual viewpoint image generation unit that inputs a photographed image from a plurality of different viewpoints and generates a plurality of virtual viewpoint images; and an image combining unit that combines the plurality of virtual viewpoint images to generate a combined image to be output to the display unit, the virtual viewpoint image generation unit generates a plurality of user viewpoint-corresponding virtual viewpoint images each corresponding to each of viewpoints of a plurality of viewing users viewing the display unit, the image combining unit extracts a portion from each of the plurality of user viewpoint-corresponding virtual viewpoint images in accordance with a relative position between the viewing user and the display unit, and combines the extracted image to generate the combined image, and the reception apparatus receives the combined image transmitted by the transmission apparatus, and displays the received combined image on the display unit.

Furthermore, a fourth aspect of the present disclosure is an information processing method to be executed on an information processing apparatus, the information processing apparatus including:

a virtual viewpoint image generation unit that inputs a photographed image from a plurality of different viewpoints and generates a plurality of virtual viewpoint images; and an image combining unit that combines the plurality of virtual viewpoint images to generate a combined image to be output to a display unit, in which the virtual viewpoint image generation unit generates a plurality of user viewpoint-corresponding virtual viewpoint images each corresponding to each of viewpoints of a plurality of viewing users viewing the display unit, and the image combining unit extracts a portion of each of the plurality of user viewpoint-corresponding virtual viewpoint images in accordance with the relative position between the viewing user and the display unit, and combines the extracted images to generate the combined image.

Furthermore, a fifth aspect of the present disclosure is a program that causes an information processing apparatus to execute information processing, the information processing apparatus including:

a virtual viewpoint image generation unit that inputs a photographed image from a plurality of different viewpoints and generates a plurality of virtual viewpoint images; and an image combining unit that combines the plurality of virtual viewpoint images to generate a combined image to be output to a display unit, in which the program causes the virtual viewpoint image generation unit to generate a plurality of user viewpoint-corresponding virtual viewpoint images each corresponding to each of viewpoints of a plurality of viewing users viewing the display unit, and causes the image combining unit to execute processing of extracting a portion of each of the plurality of user viewpoint-corresponding virtual viewpoint images in accordance with the relative position between the viewing user and the display unit, and combining the extracted images to generate the combined image.

Note that the program of the present disclosure is a program that can be provided by a storage medium or a telecommunication medium provided in a computer readable format to an information processing apparatus or a computer system that can execute various program codes, for example. By providing such a program in a computer readable format, processing according to the program is implemented on the information processing apparatus or the computer system.

Still other objects, features and advantages of the present disclosure will become apparent from the detailed description based on exemplary embodiments of the present disclosure and attached drawings to be described below. Note that in the present description, the system represents a logical set of a plurality of apparatuses, and that all the constituent apparatuses need not be in a same housing.

Effects of the Invention

According to a configuration of an exemplary embodiment of the present disclosure, it is possible to achieve a configuration that reduces the artificiality to give a strange feeling about the viewpoint of the user displayed on the display unit not matching with the actual viewpoint.

Specifically, a photographed image from a plurality of different viewpoints is input to generate a plurality of virtual viewpoint images, and then, the plurality of virtual viewpoint images is combined to generate a combined image to be output on a display unit. The virtual viewpoint image generation unit generates a plurality of user viewpoint-corresponding virtual viewpoint images each corresponding to each of viewpoints of each of a plurality of viewing users viewing the display unit, while the image combining unit extracts a portion from each of the plurality of user viewpoint-corresponding virtual viewpoint images in accordance with a relative position between the viewing user and the display unit, and combines the extracted image to generate a combined image. The combined image is generated by extracting a display region image located at a front position of the viewing user at the viewpoint corresponding to the virtual viewpoint image from among the user viewpoint-corresponding virtual viewpoint images corresponding to individual viewing users.

With this configuration, it is possible to achieve a configuration that reduces the artificiality to give a strange feeling about the viewpoint of the user displayed on the display unit not matching with the actual viewpoint.

Note that effects described here in the present specification are provided for purposes of exemplary illustration and are not intended to be limiting. Still other additional effects may also be contemplated.

BRIEF DESCRIPTION OF DRAWINGS

FIG. 1 is a diagram illustrating a bidirectional communication system.

FIGS. 2A, 2B, and 2C are diagrams illustrating a bidirectional communication system.

FIGS. 3A and 3B are diagrams illustrating problems of an image displayed on a display unit.

FIGS. 4A and 4B are diagrams illustrating problems of an image displayed on a display unit.

FIGS. 5A and 5B are diagrams illustrating an exemplary solution of a problem of an image displayed on a display unit.

FIG. 6 is a diagram illustrating an exemplary solution of a problem of an image displayed on a display unit.

FIGS. 7A and 7B are diagrams illustrating exemplary processing executed by an information processing apparatus according to a first exemplary embodiment of the present disclosure.

FIG. 8 is a diagram illustrating exemplary processing executed by an information processing apparatus according to the first exemplary embodiment of the present disclosure.

FIG. 9 is a diagram illustrating exemplary processing executed by an information processing apparatus according to the first exemplary embodiment of the present disclosure.

FIGS. 10A and 10B are diagrams illustrating exemplary processing executed by an information processing apparatus according to the first exemplary embodiment of the present disclosure.

FIGS. 11A and 11B are diagrams illustrating exemplary processing executed by an information processing apparatus according to the first exemplary embodiment of the present disclosure.

FIG. 13 is a diagram illustrating exemplary processing executed by an information processing apparatus according to the first exemplary embodiment of the present disclosure.

FIGS. 14A and 14B are diagrams illustrating exemplary processing executed by an information processing apparatus according to the first exemplary embodiment of the present disclosure.

FIGS. 15A and 15B are diagrams illustrating exemplary processing executed by an information processing apparatus according to the first exemplary embodiment of the present disclosure.

FIG. 17 is a diagram illustrating exemplary processing executed by an information processing apparatus according to the first exemplary embodiment of the present disclosure.

FIG. 19 is a diagram illustrating an exemplary configuration of an information processing apparatus according to the first exemplary embodiment of the present disclosure.

FIG. 24 is a diagram illustrating an exemplary configuration of an information processing apparatus according to the second exemplary embodiment of the present disclosure.

FIGS. 26A and 26B is a are diagrams illustrating exemplary processing executed by an information processing apparatus according to the third exemplary embodiment of the present disclosure.

FIG. 27 is a diagram illustrating exemplary processing executed by an information processing apparatus according to the third exemplary embodiment of the present disclosure.

MODE FOR CARRYING OUT THE INVENTION

Figure 12:
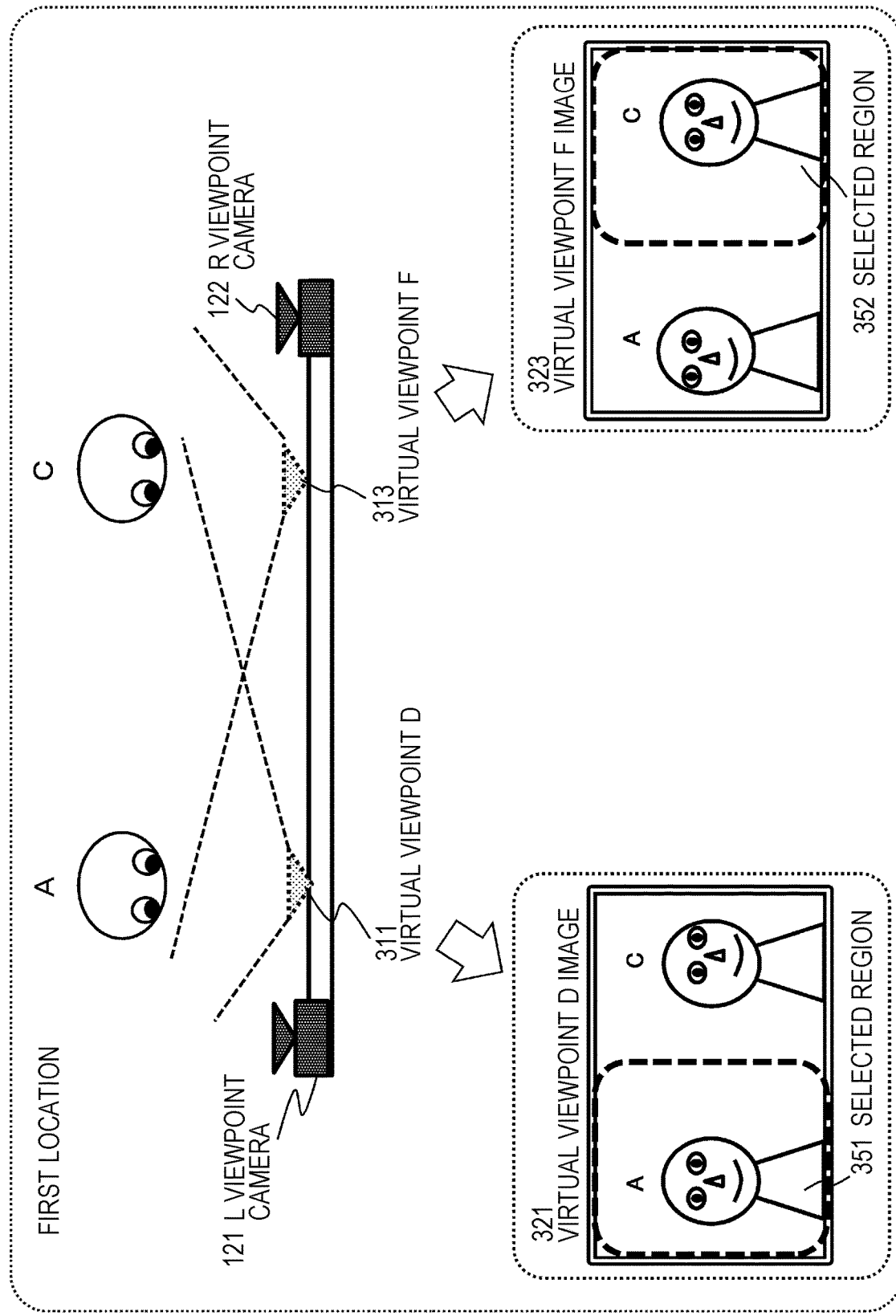
FIG. 12 is a diagram illustrating exemplary processing executed by an information processing apparatus according to the first exemplary embodiment of the present disclosure.

Hereinafter, an information processing apparatus, an information processing system, an information processing method, and a program of the present disclosure will be described in detail with reference to the drawings. Note that the description is provided in accordance with the following items.

1. Outline and problems of configuration of bidirectional communication system

2. Configuration and processing of information processing apparatus according to first exemplary embodiment of present disclosure 2-1. Processing executed by information processing apparatus 2-2. Configuration example of information processing apparatus 2-3. Specific example of virtual viewpoint image generation processing 2-4. Specific example of 3D model generation processing 2-5. Modification (variation) of configuration and processing of information processing apparatus of the first exemplary embodiment 3. Configuration and processing of information processing apparatus according to second exemplary embodiment of present disclosure 3-1. Processing executed by information processing apparatus 3-2. Configuration example of information processing apparatus 3-3. Modification (variation) of configuration and processing of information processing apparatus of the second exemplary embodiment 4. Configuration and processing of information processing apparatus according to third exemplary embodiment of present disclosure 4-1. Processing executed by information processing apparatus 4-2. Configuration example of information processing apparatus 4-3. Modification (variation) of configuration and processing of information processing apparatus of the third exemplary embodiment 5. Hardware configuration example of information processing apparatus 6. Summary of the configuration of the present disclosure

1. Outline and Problems of Configuration of Bidirectional Communication System First, an outline and problems of the configuration of the bidirectional communication system will be described.

FIG. 1 is a diagram illustrating an exemplary configuration of a bidirectional communication system.

FIG. 1 includes:

(1) First location; and (2) Second location.

The figure illustrates a configuration example of these two locations.

These two locations are provided at remote places separated from each other, and users at individual locations perform bidirectional communication with each other. Individual systems at individual locations are connected with each other via a network 30.

The first location includes users A, B, and C.

Moreover, the first location includes a data processing unit 10, together with a display unit (display) 11, a camera 12, and a voice input/output unit (microphone and speaker) 13, connected to the data processing unit 10.

Meanwhile, the second location includes users D, E and F.

Moreover, the second location includes a data processing unit 20, together with a display unit (display) 21, a camera 22, and a voice input/output unit (microphone and speaker) 23, connected to the data processing unit 20.

The camera 12 at the first location photographs the users A, B, and C at the first location, and photographed image data is transmitted to the data processing unit 20 at the second location via the data processing unit 10 and the network 30.

The data processing unit 20 at the second location displays a received image from the first location, on the display unit 21.

Further, the voice input/output unit (microphone and speaker) 13 at the first location obtains speech or the like of the users A, B, and C at the first location, and the obtained voice data is transmitted to the data processing unit 20 at the second location via the data processing unit 10 and the network 30.

The data processing unit 20 at the second location outputs the received voice from the first location via the voice input/output unit (microphone and speaker) 23.

Meanwhile, the camera 22 at the second location photographs the users D, E, and F at the second location, and photographed image data is transmitted to the data processing unit 10 at the first location via the data processing unit 20 and the network 30.

The data processing unit 10 at the first location displays the image received from the second location, on the display unit 11.

Moreover, the voice input/output unit (microphone and speaker) 23 at the second location obtains speech or the like of the users D, E, and F at the second location, and the obtained voice data is transmitted to the data processing unit 10 at the first location via the data processing unit 20 and the network 30.

The data processing unit 10 at the first location outputs the received voice from the second location via the voice input/output unit (microphone and speaker) 13.

This processing enables the users A, B, and C at the first location and the users D, E, and F at the second location to obtain images and speech of remote users via the display unit and the speaker, so as to perform bidirectional communication.

FIGS. 2A, 2B, and 2C are diagrams illustrating one example of a communication environment implemented in a bidirectional communication system.

FIG. 2A illustrates users A, B, and C on the first location side and users D, E, and F at the second location displayed on the display unit 11.

FIG. 2B illustrates users D, E, and F on the second location side and users A, B, and C at the first location displayed on the display unit 21.

In these locations, it is possible to communicate with each other having a realistic feeling that the other users in distant locations are present in front of one user, that is, a feeling that they are in a same conference room as illustrated in FIG. 2C.

This bidirectional communication system, however, includes a problem that a line-of-sight direction of a user displayed on the display unit (display) does not match the direction in which the user actually gazes.

This is mainly because the image photographed from one viewpoint where the camera for photographing the user at each of locations is placed is displayed on the other party's display apparatus.

This problem can be serious particularly in a case where a plurality of users (for example, conference participant) is present in front of the display unit.

This issue will be described with reference to FIGS. 3A and 3B and the following.

FIGS. 3A and 3B are diagrams illustrating an exemplary display image displayed on the display unit of each of locations in the bidirectional communication system described with reference to FIGS. 1, 2A, 2B, and 2C.

The display unit 11 of the first location displays images of users D, E, and F at the second location.

This image is an image photographed by the camera 22 at the second location.

Meanwhile, the images of the users A, B, and C at the first location are displayed on the display unit 21 at the second location.

This image is an image photographed by the camera 12 at the first location.

Now it is assumed that the user C at the first location starts speaking, with eye-gaze, to the user E at the center of the users D, E, and F at the second location displayed on the display unit 11.

Since the users D, E and F at the second location are displayed on the display unit 11 and the user E is displayed in a central region in the horizontal direction of the display unit, the user C speaks, with eye-gaze, to the center direction (P2) of the display unit 11.

Note that FIGS. 3A and 3B include identifiers P1, P2, and P3 from the left side of the figure as position identifiers indicating the horizontal direction of the display unit 11.

The camera 12 for photographing the users A, B, and C at the first location is fixed in the central region (P2) in the horizontal direction of the display unit.

The camera 12 photographs the viewpoint image from the position P2 and the photographed image is displayed on the display unit 21 at the second location.

The users A, B, and C at the first location displayed on the display unit 21 at the second location are set as illustrated in FIGS. 3A and 3B.

The speaking user C at the first location is speaking, with eye-gaze, to the user E displayed on the display unit 11. This line-of-sight is directed to the position (P) of the camera 12.

That is, the user C is in a state of speaking with the line-of-sight directed to the camera 12, and the image of the user C is photographed as a front-facing image with respect to the camera 12.

As a result, the image of the first location C displayed on the display unit 21 of the second location is an image facing the front.

That is, the display image of the display unit 21 at the second location is a display image in which the user C seems to be speaking to the user F at the second location.

Note that the orientation of the face is changed in the figure with the line-of-sight direction in order to clearly express the strange feeling about the line-of-sight direction of each of the users, although the actual image would give a slight level of strange feeling about the user's line-of-sight in the display image. This similarly applies to the other drawings illustrated below.

In this manner, even though the user C at the first location is speaking to the user E at the second location, the user F at the second location might misunderstand that the user C at the first location is speaking to the user F oneself.

In this manner, since the line-of-sight direction of the subject displayed on the display unit is decided by the position of the photographing viewpoint of the camera, leading to observation of an image in a line-of-sight direction different from the actual line-of-sight direction depending on the position of the user arranged in a line in front of the display unit.

FIGS. 4A and 4B are diagrams illustrating another example in which an image with an erroneous line-of-sight direction is displayed.

The display unit 11 of the first location displays images of users D, E, and F at the second location.

This image is an image photographed by the camera 22 at the second location.

Meanwhile, the images of the users A, B, and C at the first location are displayed on the display unit 21 at the second location.

This image is an image photographed by the camera 12 at the first location.

The example illustrated in FIGS. 4A and 4B is an example in which the user C at the first location is speaking, with eye-gaze, to the user F at the second location displayed on the display unit 11.

The users D, E, and F at the second location are displayed on the display unit 11. Since the user F is displayed in a front region (P3) from the user C on the display unit 11, the user C speaks, with eye-gaze, to a front (P3) of the display unit 11.

The camera 12 for photographing the users A, B, and C at the first location is fixed in the central region (P2) in the horizontal direction of the display unit.

The camera 12 photographs the viewpoint image from the position P2 and the photographed image is displayed on the display unit 21 at the second location.

The users A, B, and C at the first location displayed on the display unit 21 at the second location are set as illustrated in FIGS. 3A and 3B.

The speaking user C at the first location is speaking, with eye-gaze, to the user F displayed on the display unit 11. This line-of-sight is not directed to the position (P) of the camera 12.

That is, the user C is in a state of speaking with the line-of-sight directed to a direction different from the camera 12, and the image of the user C is photographed as an image with the line-of-sight directed to a direction different from the camera 12.

As a result, the image of the first location C displayed on the display unit 21 of the second location is an image facing rightward (outer side than F), as illustrated in the drawing.

That is, the display image of the display unit 21 at the second location is a display image in which the user C seems to be speaking to outer side than the user F at the second location.

Note that the orientation of the face is changed in the figure with the line-of-sight direction for simplification, although the actual image gives a slight level of strange feeling about the user's line-of-sight in the display image.

In this manner, even though the user C at the first location is speaking to the user F at the second location, the user F at the second location might misunderstand that the user C at the first location is not speaking to the user F oneself.

As described with reference to FIGS. 3A 3B, 4A, and 4B, the line-of-sight direction of the subject displayed on the display unit is decided depending on the position of the photographing viewpoint of the camera.

This line-of-sight direction is the line-of-sight direction viewed from the camera viewpoint.

Therefore, when the viewing user in front of the display unit displaying the photographed image observes the display image from the viewpoint position different from the viewpoint of the camera that photographed the image, the line-of-sight direction of the person in the display image is different from the actual line-of-sight direction, leading to hindrance of smooth communication.

An exemplary conventional configuration for solving such a problem will be described.

For example, Patent Document 2 (Japanese Patent No. 3289730) discloses a configuration, as illustrated in FIGS. 5A and 5B, in which images of various viewpoint directions are photographed by a plurality of cameras 31 to 33, and the plurality of images is displayed on a multi-viewpoint image display 35.

The multi-viewpoint image display 35 is a special display that enables viewing of images that differ depending on the viewing direction.

A photographed image of a D viewpoint image photographing camera 31 displayed on the multi-viewpoint image display 35 can be viewed solely from the position of the user D at the second location.

A photographed image of an E viewpoint image photographing camera 31 displayed on the multi-viewpoint image display 35 can be viewed solely from the position of the user E at the second location.

A photographed image of a viewpoint F image photographing camera 31 displayed on the multi-viewpoint image display 35 can be viewed solely from the position of the user F at the second location.

With this configuration, the users D, E, and F at the second location can view images giving no strange feeling corresponding to their individual positions (viewpoints).

Implementation of this configuration, however, needs a special multi-viewpoint image display.

In addition, there arises a problem that the position of the camera set at the first location has to be changed with the position of the user at the second location.

Meanwhile, as illustrated in FIG. 6, Patent Document 3 (Japanese Unexamined Patent Application Publication No. 2012-070081) discloses a configuration that corrects and displays the position, the shape, or the like of the eyes on the face of a person included in the display image so as to allow the display image on the display unit to match with the actual line-of-sight direction.

This processing, however, need to extract a face image to be displayed on the display unit, identify the image region of the eye included in the extracted face image, and perform correction processing on the eye image region in accordance with the actual line-of-sight direction of each of persons, leading to necessity of performing special image processing.

Furthermore, image correction processing like this might result in displaying an image that would give more strange feeling.

Hereinafter, a configuration of the present disclosure capable of displaying an image in which the line-of-sight direction of the user displayed on the display unit (display) matches the actual line-of-sight direction without causing such a problem will be described.

2. Configuration and Processing of Information Processing Apparatus According to First Exemplary Embodiment of Present Disclosure Hereinafter, a configuration and processing of information processing apparatus according to a first exemplary embodiment of the present disclosure will be described.

The information processing apparatus according to the present disclosure described below controls a display image on a display unit (display) used in the bidirectional communication system illustrated in FIGS. 1, 2A, 2B and 2C described above, for example.

Hereinafter, a plurality of exemplary embodiments of the present disclosure will be sequentially described.

2-1. Processing Executed by Information Processing Apparatus

Processing executed by the information processing apparatus according to the first exemplary embodiment of the present disclosure will be described with reference to FIGS. 7A and 7B and the following.

FIGS. 7A and 7B illustrate users and a display unit at a first location and a second location during execution of bidirectional communication, similarly to the description with reference to FIGS. 1, 2A, 2B, and 2C.

FIG. 7A is First location

FIG. 7B is Second location

These two locations are remote places separated from each other, and users at individual locations perform bidirectional communication with each other. Systems at the individual locations are connected via a network, so as to transmit or receive images and voices.

There are users A, B, and C at the first location, and images containing users A, B, and C photographed by cameras 121 and 122 on the first location side, or a combined image generated on the basis of these photographed images is transmitted to the second location and displayed on a display unit 200 at the second location.

This display image is observed by viewing users D, E, and F at the second location.

Similarly, there are users D, E, and F at the second location, and images containing the users D, E, and F photographed by an L viewpoint camera 221 and an R viewpoint camera 222 on the second location side, or a combined image generated on the basis of these photographed image is transmitted to the first location and displayed on a display unit 100 at the first location.

This display image is observed by the viewing users A, B, and C at the first location.

The images photographed by the cameras 121 and 122 at the first location side are input to a data processing unit of an information processing apparatus on the first location side, and a transmission image (combined image) for the second location is generated and transmitted to the second location.

Similarly, the images photographed by the cameras 221 and 222 on the second location side are input to a data processing unit of an information processing apparatus on the second location side, and a transmission image (combined image) for the first location is generated and transmitted to the first location.

Processing executed by the information processing apparatuses of the first location and the second location is similar to each other, and hereinafter, processing executed by the information processing apparatus at the first location will be described as a representative example.

The first location includes the display unit (display) 100, and further includes the plurality of cameras 121 and 122 for photographing images from different viewpoints.

The L viewpoint camera 121 photographs the users A, B, and C from the L viewpoint on the left side of the display unit 100.

Furthermore, the other R viewpoint camera 122 photographs the users A, B, and C from the R viewpoint on the right side of the display unit 100.

The information processing apparatus at the first location inputs images photographed from these two different viewpoints and generates observation images (virtual viewpoint images) from the three virtual viewpoints illustrated in the drawing. That is, they are observation images (virtual viewpoint images) from the following three virtual viewpoints.

(1) Observation image from virtual viewpoint D, 311 (virtual viewpoint D image)

(2) Observation image from virtual viewpoint E, 312 (virtual viewpoint E image)

(3) Observation Image from Virtual Viewpoint F, 313 (virtual viewpoint F Image)

The virtual viewpoints D to F, 311 to 313 respectively correspond to the viewpoint positions of the viewing users D, E and F at the second location.

The information processing apparatus at the first location obtains viewing position information of the viewing users D, E, and F at the second location from the first location via a network, and decides the viewpoint position of the virtual viewpoint image to be generated in accordance with the position information of the viewing users D, E, and F on the second location side.

That is, the information processing apparatus at the first location sets virtual viewpoints D to F, 311 to 313 corresponding to the viewing positions of the viewing users D, E and F at the second location, and generates a virtual viewpoint image observed from each of the virtual viewpoints.

Note that the virtual viewpoint image is generated using two photographed images photographed from two different viewpoint positions, that is, an L viewpoint image photographed by the L viewpoint camera 211 and an R viewpoint image photographed by the R viewpoint camera 212. While known processing can be applied to this virtual viewpoint image generation processing, a specific processing example will be described below.

An example of virtual viewpoint image generation processing executed by the information processing apparatus at the first location will be described with reference to FIG. 8.

FIG. 8 is a diagram illustrating virtual viewpoint image generation processing executed by the information processing apparatus at the first location.

As illustrated in FIG. 8, the information processing apparatus at the first location generates an image from a virtual viewpoint corresponding to the viewpoint position (viewpoint position relative to display unit 200 at second location) of the viewing users D, E, and F at the second location.

The example illustrated in FIG. 8 generates three virtual viewpoint images observed from three virtual viewpoints corresponding to the viewpoint positions of the three viewing users D, E, and F at the second location.

These correspond to the following three virtual viewpoint images illustrated in FIG. 8.

(1) Virtual viewpoint D image 321 corresponding to the observation image from the virtual viewpoint D, 311, (2) Virtual viewpoint E image 322 corresponding to the observation image from the virtual viewpoint E, 312, and (3) Virtual viewpoint F image 323 corresponding to the observation image from the virtual viewpoint F, 313.

The information processing apparatus at the first location generates a combined image to be transmitted to the second location from these three virtual viewpoint images.

Specifically, selected regions 326 to 328 illustrated as the dotted line frame regions in individual virtual viewpoint images 321 to 323 in FIG. 8 are obtained, and these selected regions 326 to 328 are combined to generate one combined image.

FIG. 9 illustrates an example of generating a specific combined image 331.

As illustrated in FIG. 9, the selected regions 326 to 328 illustrated as dotted line frame regions in the virtual viewpoint images 321 to 323 are combined to generate one combined image 331.

The information processing apparatus at the first location transmits this combined image 331 to the second location.

The combined image 331 is displayed on the display unit 200 of the location of the second location.

FIGS. 10A and 10B illustrate an example of a display image on the display unit 200 at the second location.

As illustrated in FIGS. 10A and 10B, the display image of the display unit 200 at the second location is the combined image 331 generated by combining three virtual viewpoint images, namely the virtual viewpoint D image 341, the virtual viewpoint E image 342, and the virtual viewpoint F image 343.

The display image at the front of the viewing user D at the second location is the virtual viewpoint D image 341. Moreover, the display image at the front of the viewing user D is the virtual viewpoint E image 342. Furthermore, the display image at the front of the viewing user F is the virtual viewpoint F image 343.

In this manner, the display image on the front of each of the viewing users is an image observed from the viewpoints of each of the viewing users, meaning that the display image having a viewpoint direction matching the actual viewpoint direction of the displayed user of the display unit is displayed.

The example described with reference to FIGS. 7A, 7B, 8, 9, 10A, and 10B is an exemplary case where there were three users (bidirectional communication participants) in each of the first location and the second location.

The number of users at both locations, however, can be set in various manners.

Hereinafter, processing examples in various types of setting will be described.

The processing in the following two settings will be sequentially described.

(Setting 1) Case where the number of users on the image transmission side (number of displayed users) is smaller than the number of users on the image reception display side (number of viewing users)

(Setting 2) Case where the number of users on the image transmission side (number of displayed users) is larger than the number of users on the image reception display side (number of viewing users)

Note that, in either case, the basic processing mode in a setting in which the displayed user and the viewing user on the display unit face each other is a processing mode in which a virtual viewpoint image from the viewpoint of the viewing user is displayed on the front region of the viewing user.

(Processing Corresponding to Setting 1)

First, a processing example in a case where the number of users on the image transmission side is smaller than the number of users on the image reception display side will be described with reference to FIGS. 11A and 11B and the following.

In the example illustrated in FIGS. 11A and 11B, the user setting of each of locations is performed as follows.

Users A and C (displayed users) are present at the first location, and

Users D, E and F (viewing users) are present at the second location.

This setting is used as user setting.

Note that an exemplary case where an image of the user at the first location is transmitted to the second location and displayed on the display unit 200 of the second location will be described herein, and accordingly, the users at the first location will be referred to as displayed user, and the users at the second locations as viewing users.

As illustrated in FIGS. 11A and 11B, in a case where the displayed users are two (A and C), the line-of-sight direction need to be considered solely about the two users A and C.

While there are three viewing users D, E, and F are present at the second location, no displayed user is displayed in front of the viewing user E.

In such a case, the information processing apparatus at the first location inputs images photographed from these two different viewpoints of the L viewpoint camera 121 and the R viewpoint camera 122, and generates observation images (virtual viewpoint images) from the two virtual viewpoints illustrated in the drawing. That is, they are observation images (virtual viewpoint images) from the following two virtual viewpoints.

(1) Observation image from virtual viewpoint D, 311 (virtual viewpoint D image)

(2) Observation Image from Virtual Viewpoint F, 313 (virtual viewpoint F Image)

The virtual viewpoints D, 311 corresponds to the viewpoint position of the viewing user D at the second location.

The virtual viewpoint F, 313 corresponds to the viewpoint position of the viewing user F at the second location.

No observation image (virtual viewpoint E image) from the virtual viewpoint E, 312 is not to be generated because there is no displayed user to be displayed at the front position of the viewing user at the second location.

The information processing apparatus at the first location obtains viewing position information of the viewing users D, E, and F at the second location from the first location via a network, and decides the viewpoint position of the virtual viewpoint image to be generated in accordance with the position information of the viewing users D, E, and F on the second location side and presence/absence information of the displayed user at that front position.

That is, the information processing apparatus at the first location sets virtual viewpoints D to F, 311 to 313 corresponding to the viewing positions of the viewing users D, E and F at the second location, and further determines whether there is a displayed user at the front position of each of the virtual viewpoints, and generates a virtual viewpoint image observed from each of the virtual viewpoints in a case where there is the displayed user.

In the present example, since there are the displayed users A and C solely at the front position of each of the virtual viewpoints of the viewing users D and F at the second location, and there is no displayed user at the front position of the virtual viewpoint of the viewing user E at the second location. Accordingly, two virtual viewpoint images observed from the individual virtual viewpoints of the viewing users D and F are to be generated.

Note that the virtual viewpoint image is generated using two photographed images photographed from two different viewpoint positions, that is, an L viewpoint image photographed by the L viewpoint camera 211 and an R viewpoint image photographed by the R viewpoint camera 212. While known processing can be applied to this virtual viewpoint image generation processing, a specific processing example will be described below.

An example of virtual viewpoint image generation processing executed by the information processing apparatus at the first location will be described with reference to FIG. 12.

FIG. 12 is a diagram illustrating virtual viewpoint image generation processing executed by the information processing apparatus at the first location.

As illustrated in FIG. 12, the information processing apparatus at the first location generates an image from a virtual viewpoint corresponding to the viewpoint position (viewpoint position relative to display unit 200 at second location) of the viewing users D and F at the second location.

The example illustrated in FIG. 12 generates two virtual viewpoint images observed from two virtual viewpoints corresponding to the viewpoint positions of the two viewing users D and F at the second location.

These correspond to the following two virtual viewpoint images illustrated in FIG. 12.

(1) Virtual viewpoint D image 321 corresponding to the observation image from the virtual viewpoint D, 311, (2) Virtual viewpoint F image 323 corresponding to the observation image from the virtual viewpoint F, 313.

The information processing apparatus at the first location generates, from these two virtual viewpoint images, a combined image to be transmitted to the second location.

Specifically, selected regions 351 and 352 illustrated as the dotted line frame regions in individual virtual viewpoint images 321 and 323 in FIG. 12 are obtained, and these selected regions 351 and 352 are combined to generate one combined image.

FIG. 13 illustrates an example of generating a specific combined image 361.

As illustrated in FIG. 13, the selected regions 351 and 352 illustrated as dotted line frame regions in the virtual viewpoint images 321 and 323 are combined to generate one combined image 361.

The information processing apparatus at the first location transmits this combined image 361 to the second location.

The combined image 361 is displayed on the display unit 200 of the location of the second location.

FIGS. 14A and 14B illustrate an example of a display image of the display unit 200 at the second location.

As illustrated in FIGS. 14A and 14B, the display image of the display unit 200 at the second location is the combined image 361 obtained by combining two virtual viewpoint images, namely a virtual viewpoint D image 371 and a virtual viewpoint F image 372.

The display image of the front of the viewing user D at the second location is the virtual viewpoint D image 371. Moreover, the display image on the front of the viewing user F is the virtual viewpoint F image 372. A virtual viewpoint E image is not set at the front of the viewing user E. Accordingly, in a case where the viewing user E views the leftward direction, the virtual viewpoint D image 371 is observed. In a case where the viewing user E views the right side, the virtual viewpoint F image 372 is observed.

In this manner, in this example, the virtual viewpoint image from the viewpoint of the viewing user is displayed in a case where the displayed user is displayed in the front display region of the viewing user viewing the display unit. Each of the virtual viewpoint images is an observation image from the viewpoint of the viewing user viewing from the front, and the display image, meaning that the display image having a viewpoint direction matching the actual viewpoint direction of the displayed user of the display unit is displayed.

In a case, however, where the displayed user is not displayed in the display region at the front of the viewing user, the virtual viewpoint image from the viewing user's viewpoint would not be displayed.

(Processing Corresponding to Setting 2)

Next, a processing example in a case where the number of users on the image transmission side is larger than the number of users on the image reception display side will be described with reference to FIGS. 15A and 15B and the following.

In the example illustrated in FIGS. 15A and 15B, the user setting of each of locations is the following setting.

Users A, B, and C (displayed users) are present at the first location, and

Users D and F (viewing users) are present at the second location.

This setting is used as user setting.

As illustrated in FIGS. 11A and 11B, in a case where there are three displayed users (A, B, and C), the line-of-sight direction need to be considered about the three users A, B, and C.

Two users D and F are viewing users at the second location.

In such a case, the information processing apparatus at the first location inputs images photographed from these two different viewpoints of the L viewpoint camera 121 and the R viewpoint camera 122, and generates observation images (virtual viewpoint images) from the two virtual viewpoints illustrated in the drawing. That is, they are observation images (virtual viewpoint images) from the following two virtual viewpoints.

(1) Observation image from virtual viewpoint D, 311 (virtual viewpoint D image)

(2) Observation Image from Virtual Viewpoint F, 313 (virtual viewpoint F Image)

The virtual viewpoints D, 311 corresponds to the viewpoint position of the viewing user D at the second location.

The virtual viewpoint F, 313 corresponds to the viewpoint position of the viewing user F at the second location.

No observation image (virtual viewpoint E image) from the virtual viewpoint E, 312 is not to be generated because there is no viewing user corresponding to this viewpoint at the second location.

The information processing apparatus at the first location obtains viewing position information of the viewing users D and F at the second location from the first location via a network, and decides the viewpoint position of the virtual viewpoint image to be generated in accordance with the position information of the viewing users D and F on the second location side.

That is, the information processing apparatus at the first location sets virtual viewpoints D, 311 and F313 corresponding to the viewing positions of the viewing users D and F at the second location, and generates a virtual viewpoint image observed from each of the virtual viewpoints.

Note that the virtual viewpoint image is generated using two photographed images photographed from two different viewpoint positions, that is, an L viewpoint image photographed by the L viewpoint camera 211 and an R viewpoint image photographed by the R viewpoint camera 212. While known processing can be applied to this virtual viewpoint image generation processing, a specific processing example will be described below.

An example of virtual viewpoint image generation processing executed by the information processing apparatus at the first location will be described with reference to FIG. 16.

Figure 16:
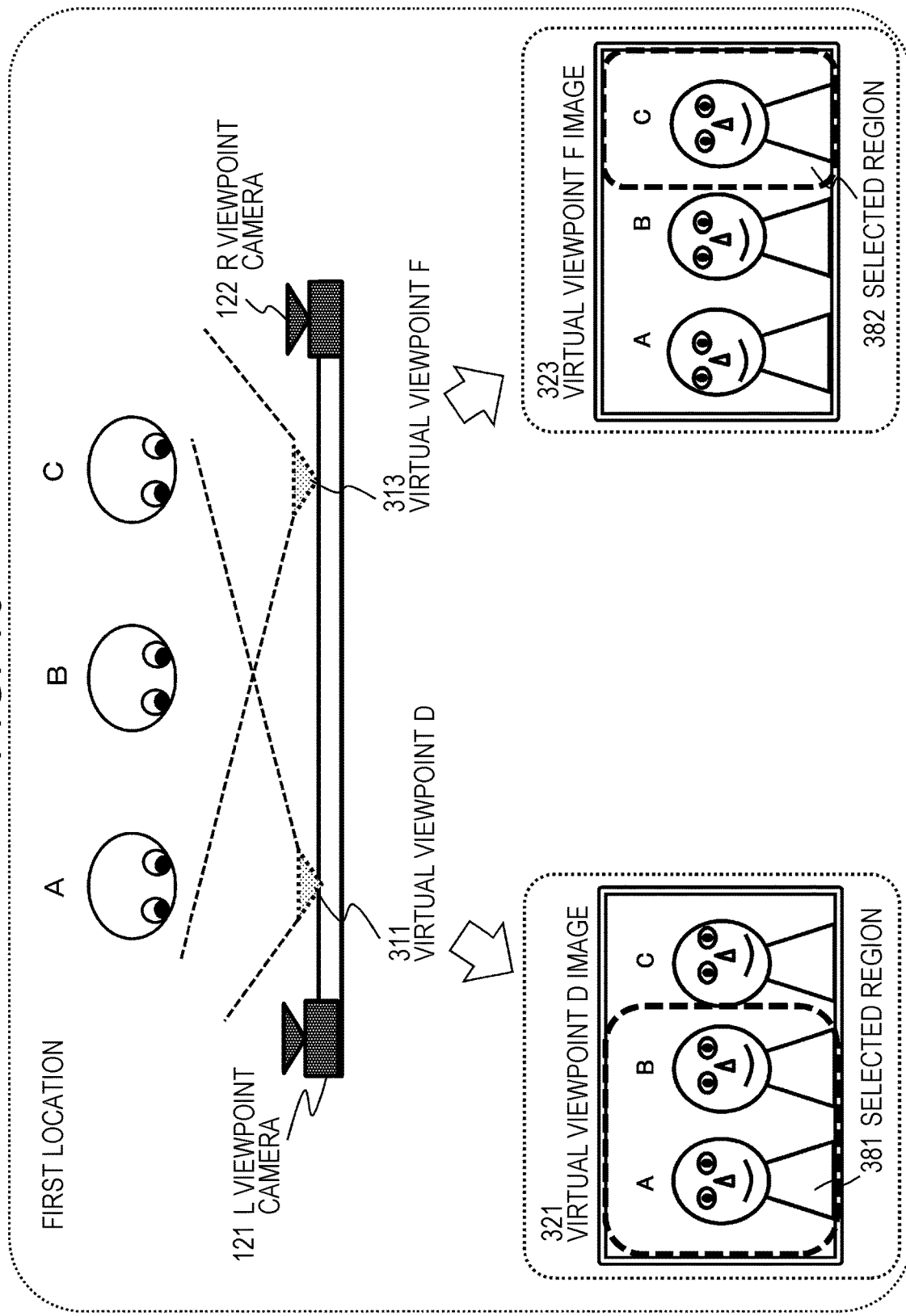
FIG. 16 is a diagram illustrating exemplary processing executed by an information processing apparatus according to the first exemplary embodiment of the present disclosure.

FIG. 16 is a diagram illustrating virtual viewpoint image generation processing executed by the information processing apparatus at the first location.

As illustrated in FIG. 16, the information processing apparatus at the first location generates an image from a virtual viewpoint corresponding to the viewpoint position (viewpoint position relative to display unit 200 at second location) of the viewing users D and F at the second location.

The example illustrated in FIG. 16 generates two virtual viewpoint images observed from two virtual viewpoints corresponding to the viewpoint positions of the two viewing users D and F at the second location.

These correspond to the following two virtual viewpoint images illustrated in FIG. 16.

(1) Virtual viewpoint D image 321 corresponding to the observation image from the virtual viewpoint D, 311, (2) Virtual viewpoint F image 323 corresponding to the observation image from the virtual viewpoint F, 313.

The information processing apparatus at the first location generates, from these two virtual viewpoint images, a combined image to be transmitted to the second location.

Specifically, selected regions 381 and 382 illustrated as the dotted line frame regions in individual virtual viewpoint images 321 and 323 in FIG. 16 are obtained, and these selected regions 381 and 382 are combined to generate one combined image.

The selected region 381 of the virtual viewpoint D image 321 is an image region including the displayed users A and B, while the selected region 382 of the virtual viewpoint F image 322 is an image region including the displayed user C.

Note that while the example illustrated in FIG. 16 is an exemplary setting of including the displayed user B in the same selected region 381 as the displayed user A, the displayed user B may be set to be included in the same selected region 382 as the displayed user C. Moreover, it is allowable to have a configuration of deciding in which region the displayed user B is to be included in accordance with the line-of-sight of the displayed user B.

For example, in a case where the displayed user B is watching the viewing user D, the displayed user B is included in the selected region 381 on the virtual viewpoint D side, and in a case where the displayed user B is watching the viewing user F, the displayed user B is to be included in the selected region 382 on the virtual viewpoint F side.

FIG. 17 illustrates an example of generating a specific combined image 383.

As illustrated in FIG. 17, the selected regions 381 and 382 illustrated as dotted line frame regions in the virtual viewpoint images 321 and 323 are combined to generate the one combined image 383.

The information processing apparatus at the first location transmits this combined image 383 to the second location.

The combined image 383 is displayed on the display unit 200 of the location of the second location.

Figures 18A, 18B:
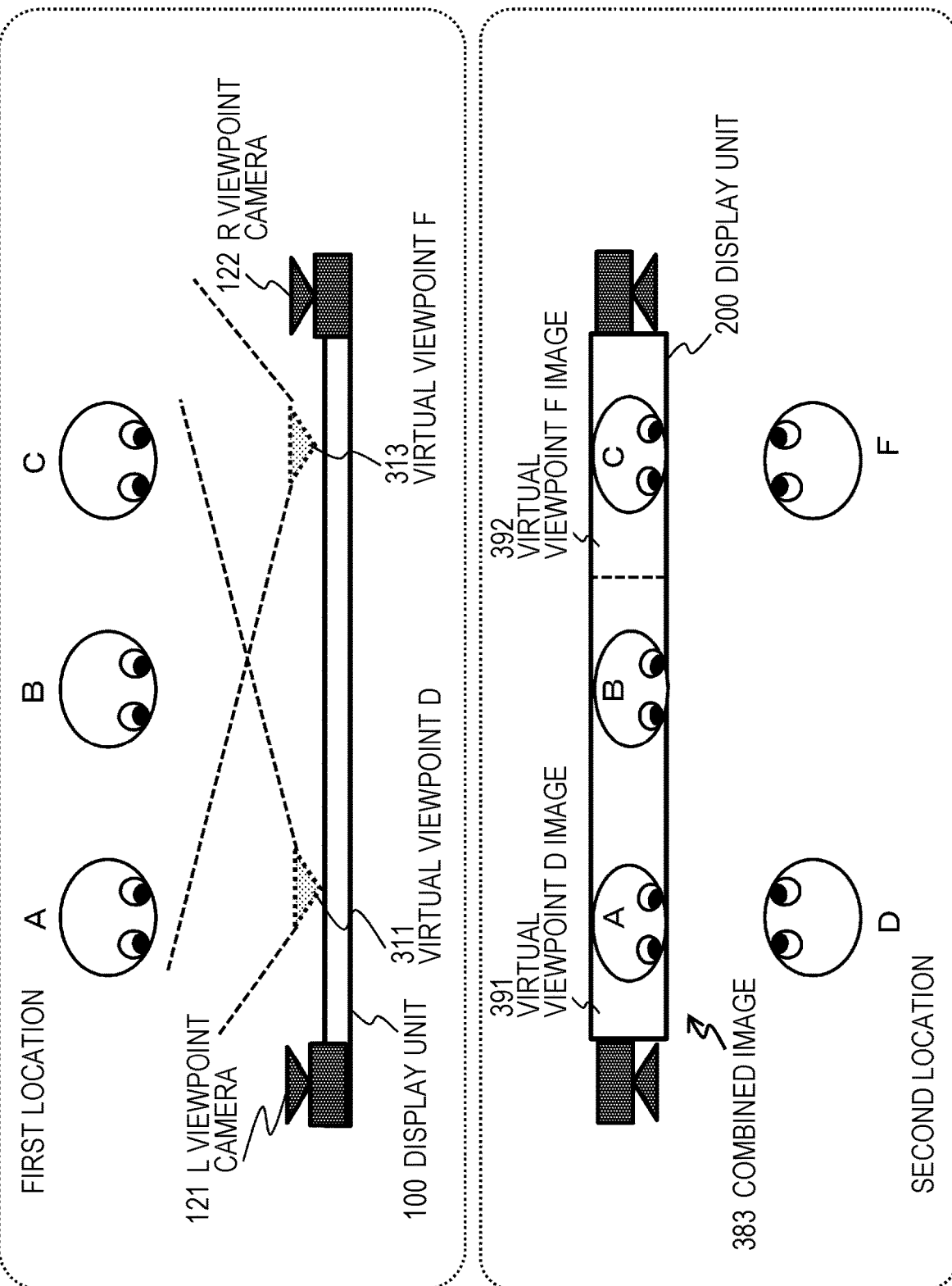
FIGS. 18A and 18B are diagrams illustrating exemplary processing executed by an information processing apparatus according to the first exemplary embodiment of the present disclosure.

FIGS. 18A and 18B illustrate an example of a display image of the display unit 200 at the second location.

As illustrated in FIGS. 18A and 18B, the display image of the display unit 200 at the second location is the combined image 383 generated by combining two virtual viewpoint images, namely a virtual viewpoint D image 391 and a virtual viewpoint F image 392.

The display image of the front of the viewing user D at the second location is the virtual viewpoint D image 391. Moreover, the display image on the front of the viewing user F is the virtual viewpoint F image 392. A virtual viewpoint E image is not set on the front of the viewing user E. Accordingly, in the case of viewing in the front to left direction, the virtual viewpoint D image 391 is observed. In the case of viewing the right side, the virtual viewpoint F image 392 is observed.

In this manner, in this example, the virtual viewpoint image from the viewpoint of the viewing user is displayed in a case where the displayed user is displayed in the front display region of the viewing user viewing the display unit. Each of the virtual viewpoint images is an observation image from the viewpoint of the viewing user viewing from the front, and the display image, meaning that the display image having a viewpoint direction matching the actual viewpoint direction of the displayed user of the display unit is displayed.

In a case, however, where the viewing user is not present in the front of the displayed user displayed in the display unit, the virtual viewpoint image from the non-existing viewing user's viewpoint would not be displayed.

2-2. Configuration Example of Information Processing Apparatus

Next, a configuration of the information processing apparatus according to the first exemplary embodiment will be described with reference to FIG. 19.

FIG. 19 is a block diagram illustrating a configuration example of an information processing apparatus installed at the first location.

Note that the same information processing apparatus is installed in the second location, and mutual transmission and reception of images, voices, and other control information are executed via a network.

An imaging unit 401 is an imaging unit that corresponds to the L viewpoint camera 121 and the R viewpoint camera 122 illustrated in FIGS. 7A and 7B or the like, and photographs images from different viewpoints.

A display unit 403 displays a combined image transmitted from the second location received via a reception unit 402.

The photographed image of the imaging unit 401 is input to a data processing unit 410.

On the basis of these input images, the data processing unit 410 generates a combined image as an image to be displayed on the display unit at the second location.

The photographed image of the imaging unit 401 is input to a virtual viewpoint image generation unit 414 via an image input unit 411 of the data processing unit 410.

The virtual viewpoint image generation unit 414 executes processing of generating an image from a specific virtual viewpoint.

For example, the virtual viewpoint image generation unit 414 generates the following virtual viewpoint image described with reference to FIGS. 7A, 7B, and 8, or the like.

(1) Virtual viewpoint D image 321 corresponding to the observation image from the virtual viewpoint D, 311, (2) Virtual viewpoint E image 322 corresponding to the observation image from the virtual viewpoint E, 312, and (3) Virtual viewpoint F image 323 corresponding to the observation image from the virtual viewpoint F, 313.

These virtual viewpoint images are generated on the basis of photographed images of the L viewpoint camera 121 and the R viewpoint camera 122 illustrated in FIGS. 7A and 7B or the like, that is, images from different viewpoints, and depth information.

The depth information is distance information to the subject in the image detected by a depth detection unit 412. The distance from the camera is detected in units of pixel.

Depth detection processing by the depth detection unit 412 is executed using the photographed images of the L viewpoint camera 121 and the R viewpoint camera 122 illustrated in FIGS. 7A and 7B or the like, that is, images from different viewpoints, for example.

Specifically, a depth map having depth data (distance information) corresponding to pixels included in each of the images generated by a stereo matching method. Note that a depth map corresponding to each of the images may be generated by using a special sensor capable of depth measurement without using the photographed image.

The user position detection unit 413 detects the position of the user (communication participant) in front of the display unit 403. For example, the user position is detected on the basis of photographed images from two different viewpoints input by the image input unit 411. Note that the user position detection unit 413 may be configured to detect the user position using a position sensor.

The user position information 421 detected by the user position detection unit 413 is input to the virtual viewpoint image generation unit 414 and the image combining unit 415. Furthermore, the user position information 421 is transmitted to the second location as viewing user position information 432 via a transmission unit 404. This transmission information is used as viewing user position information 432 at the second location.

While the virtual viewpoint image generation unit 414 generates an image from a specific virtual viewpoint, from which viewpoint a virtual viewpoint image is to be generated is decided on the basis of the corresponding positional relationship between the displayed user and the viewing user as described in the above processing example.

For this processing, the virtual viewpoint image generation unit 414 inputs the user position information 421 generated by the user position detection unit 413, and further inputs the viewing user position information 422 received from the second location where the viewing user is located via the reception unit 402.

On the basis of these pieces of input information, the virtual viewpoint image generation unit 414 decides from which viewpoint a virtual viewpoint image is to be generated.

As described with reference to FIGS. 7A, 7B, 8, 9, 10A, 10B, 11A, 11B, 14A, 14B, 15A, 15B, 16, 17, 18A, and 18B, in a case where the viewing user and the displayed user face each other in the front direction, a virtual viewpoint image corresponding to the viewpoint of the viewing user with this setting is generated as basic processing.

Note that the virtual viewpoint image generation unit 414 may include a 3D model generation unit that generates a 3D model formed by three-dimensional data of a subject. The 3D model is formed by three-dimensional position data of the subject and pixel value data of individual positions. Note that the 3D model can also be generated on the basis of images from different viewpoints and depth information. A specific processing example will be described below.

The 3D model includes data for generating a virtual viewpoint image from a large number of viewpoints. In a case where the virtual viewpoint image generation unit 414 includes a 3D model generation unit, the virtual viewpoint image generation unit 414 first generates a 3D model, and then, generates a necessary virtual viewpoint image from the generated 3D model.

The virtual viewpoint image generated by the virtual viewpoint image generation unit 414 is output to the image combining unit 415.

The image combining unit 415 executes combining processing of the virtual viewpoint image generated by the virtual viewpoint image generation unit 414, and generates a combined image (=transmission image (display image)) to be displayed on the display unit of the second location.

For example, as described with reference to FIG. 9 or the like, a selected region is extracted from a plurality of virtual viewpoint images to generate one combined image.

Note that this combining processing is executed on the basis of the corresponding positional relationship between the displayed user and the viewing user.

As described with reference to FIGS. 7A, 7B, 8, 9, 10A, 10B, 11A, 11B, 14A, 14B, 15A, 15B, 16, 17, 18A, and 18B, basic processing generates a combined image in which a virtual viewpoint image from the viewpoint of the viewing user is set in a case where there is a displayed user in the front region of the viewing user.

The combined image 431 generated by the combined image generation unit 415 is transmitted to the second location via the transmission unit 404.

2-3. Specific Example of Virtual Viewpoint Image Generation Processing

Next, a specific example of the virtual viewpoint image generation processing executed by the virtual viewpoint image generation unit 414 will be described with reference to FIG. 20.

Figure 20:
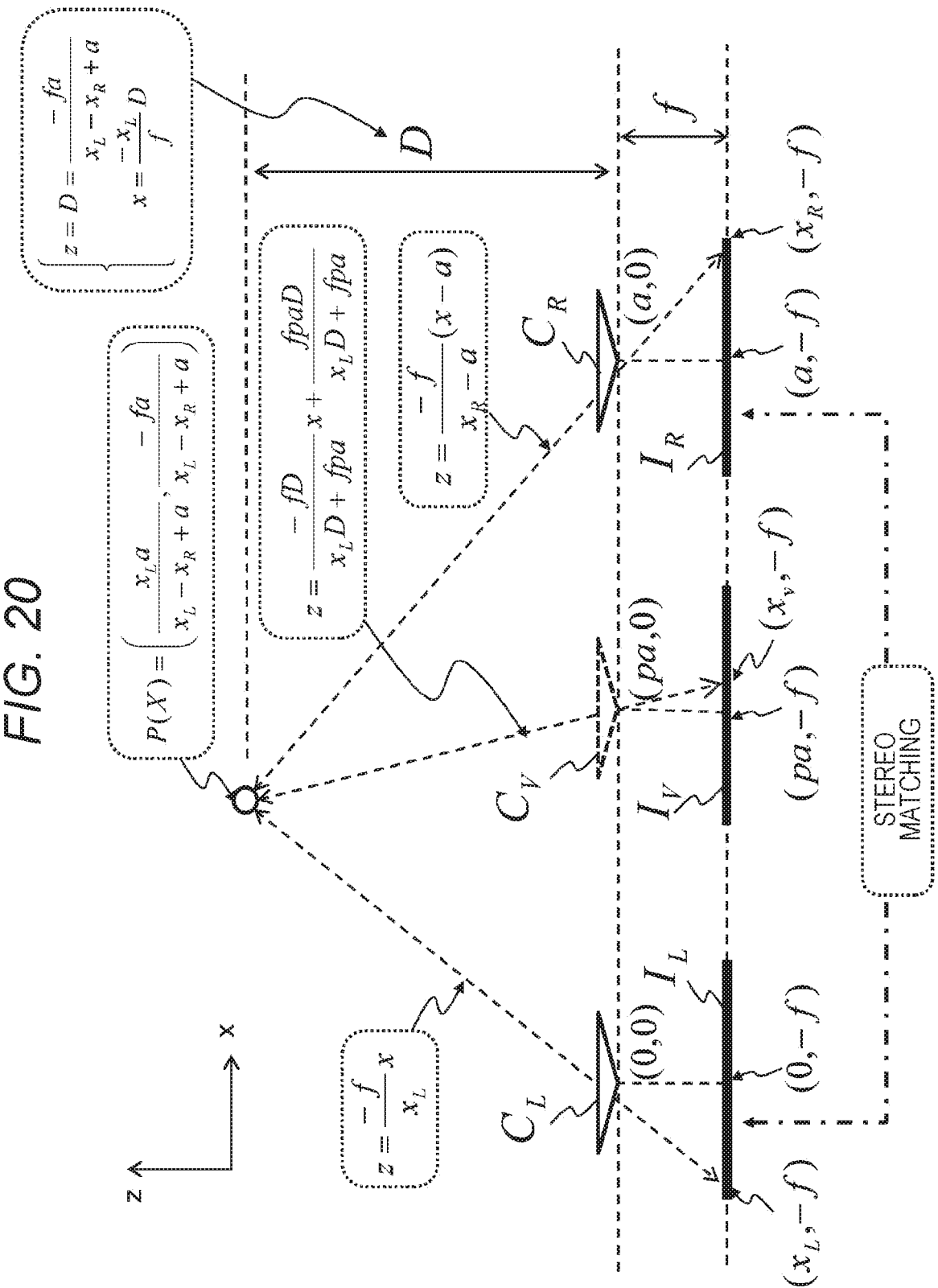
FIG. 20 is a diagram illustrating a specific example of virtual viewpoint image generation processing.

FIG. 20 illustrates an xz plane in which the rightward direction is the x-axis illustrating the horizontal direction, and the upward direction is the z-axis illustrating the depth.

It is assumed that a virtual viewpoint image I_V photographed by a virtual camera C_V of a virtual viewpoint is generated from images I_L and I_R photographed by two cameras C_L and C_R.

Note that, in the present specification, a character after an underline (_) represents a subscript.

For example, I_L represents IL.

The cameras C_L and C_R correspond to the L viewpoint camera 121 and R viewpoint camera 122 illustrated in FIGS. 7A and B or the like. I_L corresponds to a photographed image of the camera C_L, while I_R corresponds to a photographed image of the camera C_R.

A virtual image I_V being a photographed image of the virtual camera C_V corresponds to a virtual viewpoint D to F images each being a photographed image from the virtual viewpoints D to F illustrated in FIGS. 7A, 7B, and 8, for example.

An optical center of the camera C_L is defined as an origin (x, z)=(0, 0), while the separation distance between the camera C_L and the camera C_R is defined as a.

The coordinate position (x, z) of each of the cameras is as follows.

Position of camera C_L=(0, 0),
Position of camera C_R=(a, 0), and
Position of virtual camera C_V=(pa, 0).
where, 0<p<1.

The coordinates (x, z) of the image center of the photographed image of each of the cameras are as follows.

Center position of photographed image I_L of camera C_L=(0, −f),
Center position of photographed image I_R of camera C_R=(a, −f), and
Center position of photographed image I_V of the virtual camera C_V=(pa, −f).

The subject position in the three images of a subject P (X) at a distance D from a linear axis on which the three cameras are arranged is set as follows.

(1) Subject position of photographed image I_L of camera C_L=(x_L, −f),
(2) Subject position of photographed image I_R of camera C_R=(x_R, −f), and
(3) Subject position of photographed image I_V of virtual camera C_V=(x_V, −f).

At this time, the coordinate position (x, z) of the subject P (X) is:

(x,z)=((x_La)/(x_L−x_R+a),(−fa)/(x_L−x_R+a)).

That is, the position is expressed by the following (Expression 1).

[Mathematical Expression 1]

$$P(X) = \left( \frac{x_L a}{x_L - x_R + a}, \frac{-fa}{x_L - x_R + a} \right) \quad \text{(Expression 1)}$$

The depth (D) of the subject P (X) corresponds to the Z coordinates of the coordinate position (x, z) of the above subject P (X), which correspond to depth data (distance information) in the subject P (X) in the depth map corresponding to the photographed image of the camera C_L and the camera C_R.

When the depth data of the subject P (X) in the depth map of the camera C_L is [DM_L (XL)] and the depth data of the subject P (X) in the depth map of the camera C_R is [DM_R (XR)], the following (Expression 2) holds.

[Mathematical Expression 2]

$$DM_L(x_L) = DM_R(x_R) = D = \frac{-fa}{x_L - x_R + a} \quad \text{(Expression 2)}$$

In contrast, the x coordinate: x_V of the coordinate position (x_V, z) of the subject P (X) on the photographed image I_V of the virtual camera C_V is expressed by the following (Expression 3).

[Mathematical Expression 3]

$$x_V = \frac{paD + x_L D + fpa}{D} \quad \text{(Expression 3)}$$

With the setting of the pixel value of the coordinates (x_L, −f) of the image I_L of the camera C_L or the pixel value of the coordinates (x_R, −f) the image I_R of the camera C_R on the coordinates (x_V, −f) on the image I_V of the virtual camera C_V calculated by the above (Expression 3), it is possible to generate the virtual viewpoint image I_V at the viewpoint of the virtual camera C_V.

The virtual viewpoint image generation unit 414 illustrated in FIG. 19 uses the photographed images of the cameras 121 and 122 illustrated in FIGS. 7A and 7B and the depth map calculated on the basis of these photographed images so as to generate the virtual viewpoint image photographed from the virtual viewpoint in accordance with the above (Expression 3).

Note that by substituting the calculation formula of D indicated by (Expression 2) described above as the depth (D) included in the above (Expression 3), the following (Expression 4) is obtained.

[Mathematical Expression 4]

$$x_V = \frac{paD + x_L D + fpa}{D} = (1 - p)x_L + p x_R \quad \text{(Expression 4)}$$

In other words, when the photographed images of cameras from two different viewpoints are used and the corresponding relationship between these images is obtained, it is possible to generate a virtual viewpoint image without explicitly generating a depth map.

2-4. Specific Example of 3D Model Generation Processing

As described above with reference to FIG. 19, the virtual viewpoint image generation unit 414 may include a 3D model generation unit that executes 3D model generation processing.

Hereinafter, a specific example of 3D model generation processing executed by the 3D model generation unit will be described with reference to FIG. 21.

Figure 21:
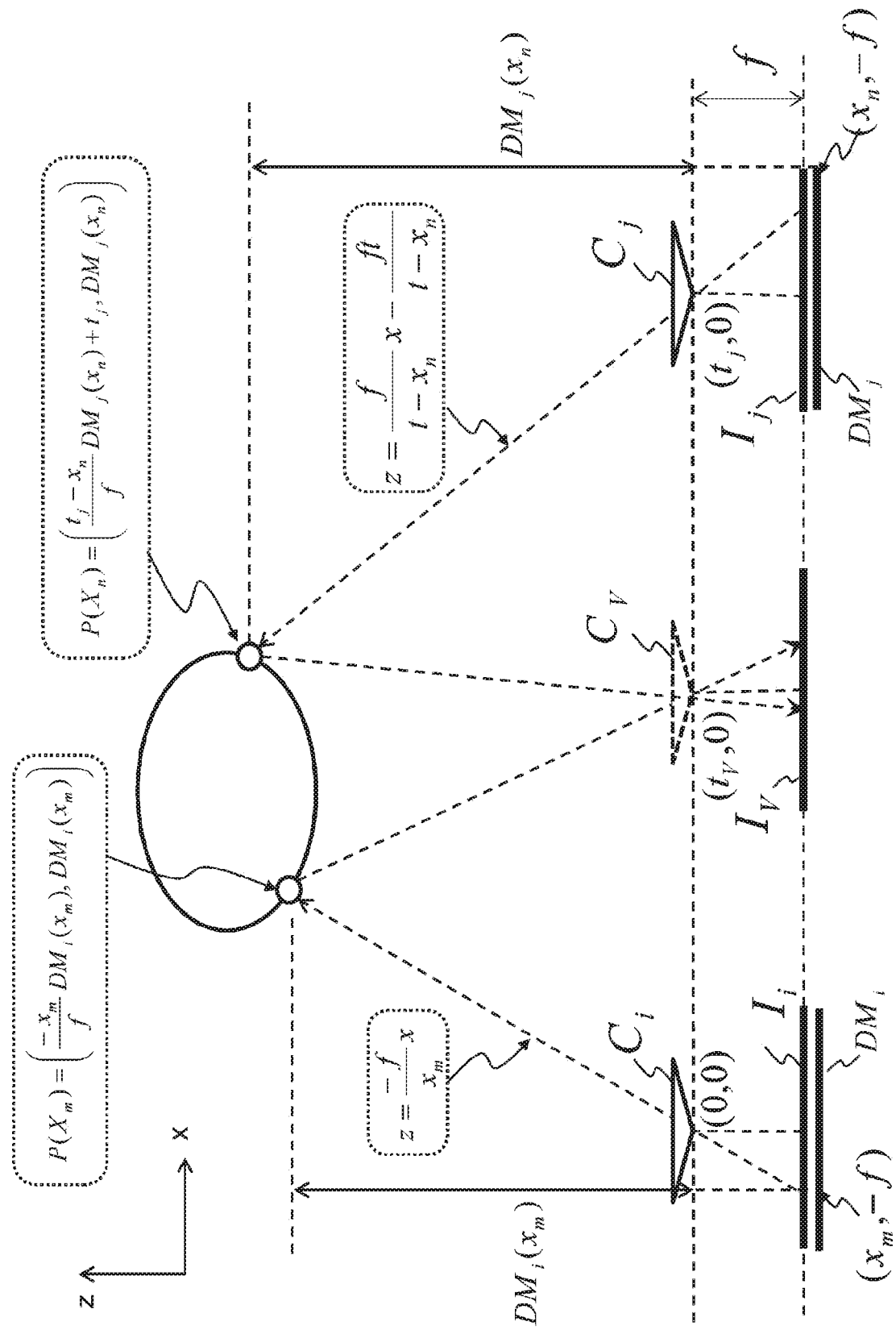
FIG. 21 is a diagram illustrating a specific example of 3D model generation processing.

FIG. 21 illustrates an xz plane in which the rightward direction is the x-axis illustrating the horizontal direction, and the upward direction is the z-axis illustrating the depth, similarly to the case of FIG. 20.

A 3D model observable from a large number of virtual viewpoints is generated from images I_i and I_j photographed by the two cameras C_i and C_j.

The cameras C_i and C_j respectively correspond to the L viewpoint camera 121 and the R viewpoint camera 122 illustrated in FIGS. 7A and 7B or the like, and thus, I_i is a photographed image of the camera C_i, and I_j is a photographed image of the camera C_j.

An optical center of the camera C_i is defined as an origin (x, z)=(0, 0), while the separation distance between the camera C_i and the camera C_j is defined as a.

The coordinate position (x, z) of each of the cameras is as follows.

Position of camera C_i=(0, 0),
Position of camera C_j=(t_j, 0),
Position of virtual camera C_V=(t_v, 0).

The coordinates (x, z) of the image center of the photographed image of each of the cameras are as follows.

Center position of photographed image I_i of camera C_i=(0, −f),
Center position of photographed image I_j of camera C_j=(t−j, −f),
Center position of photographed image I_V of virtual camera C_V=(t_v, −f), Now, a next task to consider is calculating the coordinates of points in the three-dimensional space corresponding to each of pixels on the image from the images photographed by the camera C_i and the camera C_j and the depth map corresponding to each of the images. At this time, each of the depth maps is assumed to have been generated by using the stereo matching method described above or a special sensor capable of depth measurement.

Now, with consideration of the coordinate x_m on the image I_i photographed by the camera C_i, a coordinate P (X_m) of a point X_m in the three-dimensional space represented by the pixel is calculated with reference to the depth map DM_i (x_m) from the geometric relationship by the following (Expression 5).

[Mathematical Expression 5]

$$P(X_m) = \left(\frac{-x_m}{f} DM_i(x_m), DM_i(x_m)\right) \quad \text{(Expression 5)}$$

In addition, a color E (X_m) of this point X_m is given by a value I_i (x_m) of the corresponding pixel. A combination of the coordinates and the color is defined as a component M (X_m) of the 3D model, that is, M (X_m)=(P (X_m), E (X_m))

being the component of the 3D model including the coordinate information: P (X_m) and the color information: E (X_m).

A 3D model component is calculated also for points in a three-dimensional space represented by each of other pixels on the same image or each of pixels on an image photographed with another camera (for example, $C_j$), and a set of these is defined a 3D model.

One virtual viewpoint image I_V corresponding to one virtual viewpoint can be generated by assigning a corresponding color E (X_m) to a coordinate position where a line segment connecting the coordinate X_m and the optical center of the virtual camera C_V intersects with the virtual viewpoint image I_V, corresponding to each of components M (X_m) of the 3D model.

In a case where the virtual viewpoint image generation unit 414 illustrated in FIG. 19 includes a 3D model generation unit, the virtual viewpoint image generation unit 414 first generates a 3D model in accordance with the above-described processing described with reference to FIG. 21, and further generates a virtual viewpoint image of an arbitrary viewpoint from the generated 3D model.

2-5. Modification (Variation) of Configuration and Processing of Information Processing Apparatus According to First Exemplary Embodiment Modifications (variations) of the configuration and processing of the information processing apparatus according to the first exemplary embodiment described with reference to FIGS. 7A, 7B, 8, 9, 10A, 10B, 11A, 11B, 12, 13, 14A, 14B, 15A, 15B, 16, 17, 18A, 18B, 19, 20, and 21 will now be described.

Hereinafter, modifiable configurations of the information processing apparatus according to the first exemplary embodiment described with reference to FIG. 19 will be sequentially described.

(1) Example in which Virtual Viewpoint Image Generation Processing is Omitted

It is possible to provide a configuration in which a real camera is arranged at a virtual viewpoint image generation position described in the above exemplary embodiment and a combined image is generated using the photographed image of the real camera. With this processing, it is possible to omit the virtual viewpoint image generation described in the above exemplary embodiment.

(2) Example of Changing Virtual Viewpoint Image Generation Processing

The depth data to be applied to the virtual viewpoint image generation processing may be obtained using the photographed image or a dedicated sensor (distance sensor).

Moreover, depth detection, 3D model generation, virtual viewpoint image generation, and processing for these can be performed using various known methods.

(3) Example of Changing User Position Detection Processing

The user position detection processing executed in the user position detection unit or the like is capable of performing detection processing using an known method such as face detection.

Alternatively, it is also allowable to use depth information obtained from the depth detection unit to judge solely a person in a certain predefined range from the display unit as a participant and detect the position of the person.

The detection information obtained by the user position detection unit at the first location can be transmitted to the second location as a communication destination via a network, and a virtual camera can be set at the position based on this detection information until completion of communication at the second location.

Alternatively, the user position detection unit at the first location may continuously detect the user position, transmits this detection information sequentially to the second location, and then, the position of the virtual camera is sequentially updated with the input information so as to give motion parallax, at the second location.

Execution of virtual camera position sequential change processing, however, might lead to an occurrence of discontinuous appearance at different virtual viewpoint image boundaries on the display unit.

In order to avoid this phenomenon, it is preferable to have a configuration to achieve the setting of each of the virtual viewpoint images in which the motion parallax generated gradually decreases toward the boundary portion, and to generate an image with no occurrence of substantial motion parallax at the boundary portion.

Alternatively, it is allowable to set the position of each of participants manually by the user and transmit setting information to the other party's site without providing the user position detection unit. Alternatively, the position of each of the participants may be stored beforehand as a predefined position in the storage unit in the apparatus, and this may be used.

(4) Example of Changing Other Configurations

While the above-described exemplary embodiment is a case where a combined image to be displayed at the second location is generated at the first location, it is allowable to generate, at the first location, intermediate data needed for combined image generation processing, transmit this generated data to the second location, and execute combined image generation processing at the second location.

Examples of the intermediate data include images photographed from different viewpoints and depth data, 3D model data, or the like.

Moreover, individual subject positions at the first location may be measured beforehand, transmitted to the second location, stored in the storage unit in the information processing apparatus at the second location, and used as occasionally.

In order to avoid disconnection of the subject image by the two virtual viewpoint images, it is preferable to set an extraction position of the selected region of each of virtual images in the background region. In addition, it is preferable to decide the extraction position in consideration of the continuity of the boundary portion during combining.

As the combining processing of a plurality of images, it is preferable to use an known stitching method and perform processing to suppress the discontinuity of the boundary portion, for example.

3. Configuration and Processing of Information Processing Apparatus According to Second Exemplary Embodiment of Present Disclosure Next, a configuration and processing of information processing apparatus according to the second exemplary embodiment of the present disclosure will be described.

The information processing apparatus according to the second exemplary embodiment described below controls a display image on a display unit (display) used in the bidirectional communication system illustrated in FIGS. 1, 2A, 2B and 2C described above, for example similarly to the information processing apparatus of the first exemplary embodiment.

3-1. Processing Executed by Information Processing Apparatus

Processing executed by the information processing apparatus according to the second exemplary embodiment of the present disclosure will be described with reference to FIG. 22 and the following.

Figure 22:
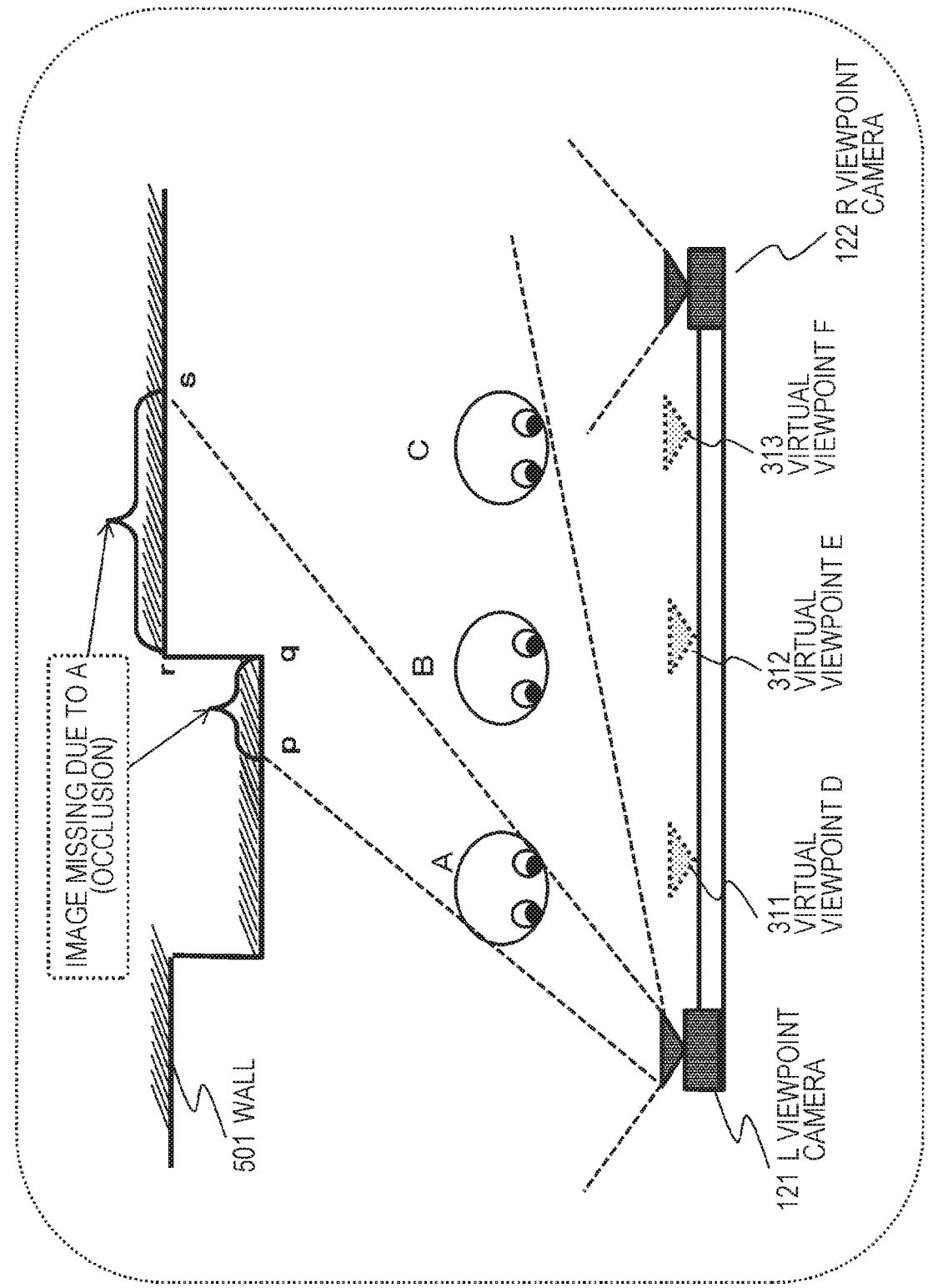
FIG. 22 is a diagram illustrating exemplary processing executed by an information processing apparatus according to a second exemplary embodiment of the present disclosure.

FIG. 22 is a diagram illustrating users (A, B, and C) and a wall 501 in the background at the first location during execution of the bidirectional communication described with reference to FIGS. 1, 2A, 2B and 2C.

The images of the users A to C are photographed by the L viewpoint camera 121 and the R viewpoint camera 122, photographing images from two different viewpoints.

On the basis of these images, the information processing apparatus at the first location generates virtual viewpoint images viewed from the viewpoints of the users (D to F) at the second location as the viewing users, and then, generates a combined image on the basis of these virtual viewpoint images and transmits the combined image to the second location.

This processing is similar to the case of the first exemplary embodiment.

The information processing apparatus according to the second exemplary embodiment further separates background images other than the users (A, B, and C) from the images photographed by the L viewpoint camera 121 and the R viewpoint camera 122, further performs filling correction of an image region (occlusion region) that is not output by being overshadowed by the users (A, B, and C), and uses the corrected background image and the virtual viewpoint image including the users A to C or the like to generate a combined image to be displayed on the display unit at the second location.

As illustrated in FIG. 22, the wall 501 to be a background image includes a region overshadowed by the users A to C so as to be unphotographable by the L viewpoint camera 121 or the R viewpoint camera 122.

In the example illustrated in FIG. 22, regions p to q and r to s of the wall 501 correspond to the unphotographable regions. Such an unphotographable region is referred to an occlusion region.

The second exemplary embodiment first separates the background image and the person image from each other and then, executes filling correction for eliminating the occlusion region of the background image.

An example of the filling correction will be described with reference to FIG. 23.

Figure 23:
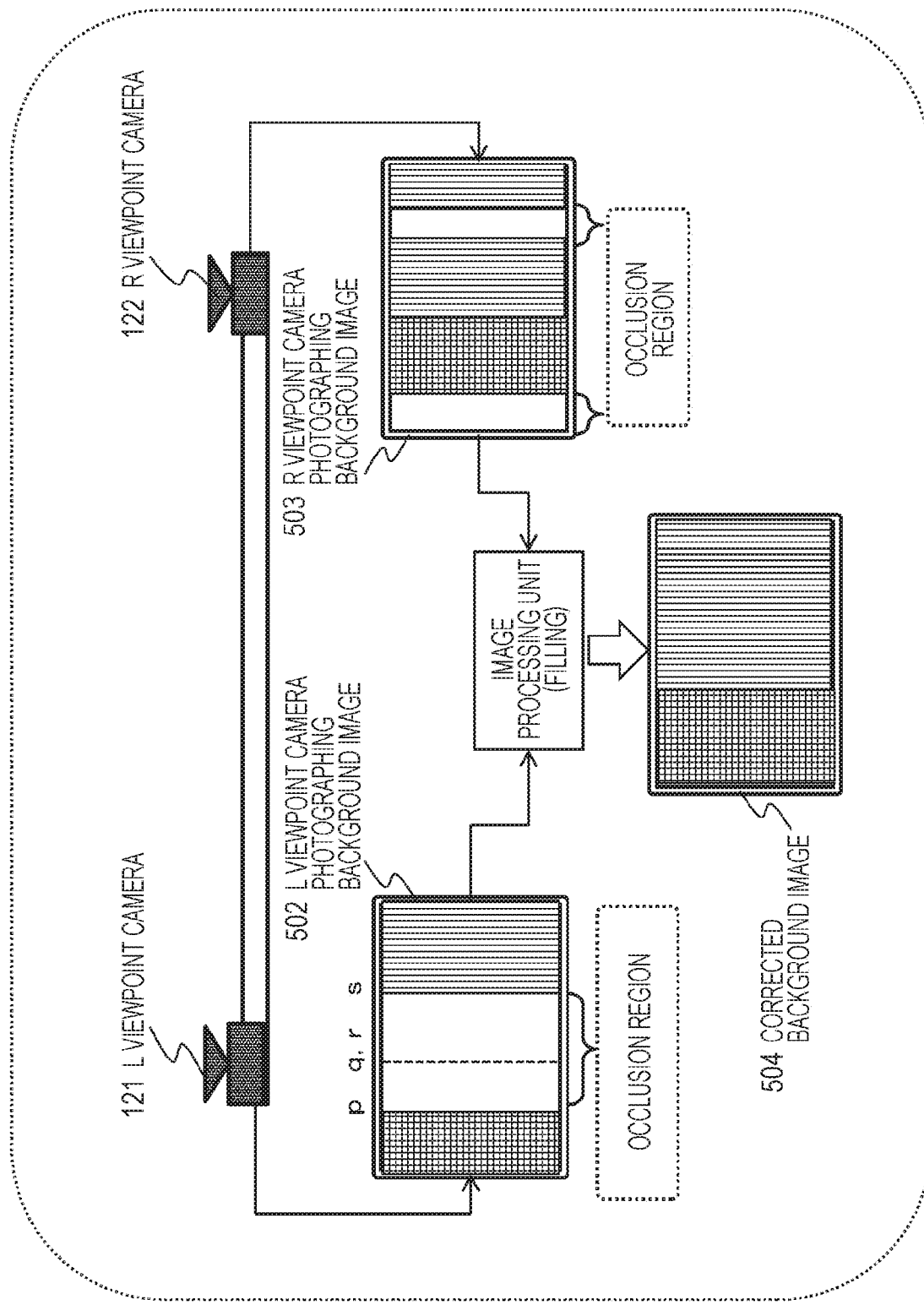
FIG. 23 is a diagram illustrating exemplary processing executed by an information processing apparatus according to the second exemplary embodiment of the present disclosure.

FIG. 23 illustrates an L viewpoint camera photographing background image 502 obtained by extracting and refining a background region from the image photographed by the L viewpoint camera 121 and an R viewpoint camera photographing background image 503 generated by extracting and refining a background region from the image photographed by the R viewpoint camera 122, in the photographing environment illustrated in FIG. 22.

Each of these two background images includes an occlusion region where the background image cannot be photographed because it is overshadowed by the users A to C existing between the camera and the background.

The information processing apparatus executes filling correction to eliminate this occlusion region. For example, the occlusion region of the L viewpoint camera photographing background image 502 illustrated in FIG. 23 is corrected by using a pixel value of a corresponding position from the R viewpoint camera photographing background image 503, while the occlusion region of the R viewpoint camera photographing background image 503 is corrected by using a pixel value of a corresponding position from the L viewpoint camera photographing background image 502. These corrections are executed to generate a corrected background image 504 in which the occlusion region has been eliminated.

Note that the corrected background image is generated as a virtual image of the virtual viewpoint position of a central viewpoint between the center of the L viewpoint camera and the center of the R viewpoint camera, for example. Alternatively, it is possible to have a configuration to generate background images from virtual viewpoints corresponding to a specific virtual viewpoint image used as a combined image, and then combine these images.

Moreover, regarding the regions that are not photographed in either the L viewpoint camera photographing background image 502 or the R viewpoint camera photographing background image 503, correction using interpolation processing or the like based on surrounding pixel values is applied.

The information processing apparatus at the first location superimposes the virtual viewpoint image including the user image on the background image generated in this manner to generate a final combined image, that is, an image to be displayed on the display unit of the second location, and transmits the generated image to the second location.

3-2. Configuration Example of Information Processing Apparatus

Next, a configuration of the information processing apparatus according to the second exemplary embodiment will be described with reference to FIG. 24.

FIG. 24 is a block diagram illustrating a configuration example of an information processing apparatus installed at the first location.

Note that the same information processing apparatus is installed in the second location, and mutual transmission and reception of images, voices, and other control information are executed via a network.

An imaging unit 401 is an imaging unit that corresponds to the L viewpoint camera 121 and the R viewpoint camera 122 illustrated in FIGS. 7A and 7B or the like, and photographs images from different viewpoints.

A display unit 403 displays a combined image transmitted from the second location received via the reception unit 402.

The photographed image of the imaging unit 401 is input to a data processing unit 520.

On the basis of these input images, the data processing unit 520 generates a combined image as an image to be displayed on the display unit at the second location.

The photographed image of the imaging unit 401 is input to a 3D model generation unit 523 via an image input unit 521 of the data processing unit 520.

The 3D model generation unit 523 executes generation processing of a 3D model including a virtual image from a large number of viewpoints.

The 3D model generation unit 523 generates a 3D model on the basis of images from different viewpoints and depth information. The depth information is distance information to the subject in the image detected by the depth detection unit 522. The distance from the camera is detected in units of pixel.

For example, the 3D model generation unit 523 executes 3D model generation processing in accordance with the processing described above with reference to FIG. 21.

The next background image separation unit 524 executes separation processing between the user region (person region) and the background region using the 3D model generated by the 3D model generation unit 523.

The person region image separated by the background image separation unit 524 is input to a virtual viewpoint image generation unit 526, and the background image is input to a background image generation unit 527.

The virtual viewpoint image generation unit 526 executes processing of generating an image from a specific virtual viewpoint.

For example, the virtual viewpoint image generation unit 526 generates the following virtual viewpoint image described with reference to FIGS. 7A, 7B, and 8, or the like, similarly to the first exemplary embodiment.

(1) Virtual viewpoint D image 321 corresponding to the observation image from the virtual viewpoint D, 311, (2) Virtual viewpoint E image 322 corresponding to the observation image from the virtual viewpoint E, 312, and (3) Virtual viewpoint F image 323 corresponding to the observation image from the virtual viewpoint F, 313.

In the present exemplary embodiment, however, the virtual viewpoint image does not include the background image but includes the image of the person region alone.

These virtual viewpoint images are generated on the basis of photographed images of the L viewpoint camera 121 and the R viewpoint camera 122 illustrated in FIGS. 7A and 7B or the like, that is, images from different viewpoints, and depth information.

The depth information is distance information to the subject in the image detected by the depth detection unit 522. The distance from the camera is detected in units of pixel.

Depth detection processing by the depth detection unit 522 is executed using the photographed images of the L viewpoint camera 121 and the R viewpoint camera 122 illustrated in FIGS. 7A and 7B or the like, that is, images from different viewpoints, for example.

Specifically, a depth map corresponding to each of the images, that is, a depth map having depth data (distance information) corresponding to constituent pixels of each of the images is generated using a stereo matching method or a special sensor capable of performing depth measurement.

Note that a virtual viewpoint image may be generated using the 3D model generated by the 3D model generation unit 523.

The user position detection unit 525 detects the position of the user (communication participant) in front of the display unit 403. For example, the user position is detected on the basis of photographed images from two different viewpoints input by the image input unit 521. Note that the user position detection unit 525 may be configured to detect the user position using a position sensor.

The user position information 531 detected by the user position detection unit 525 is input to the virtual viewpoint image generation unit 526 and an image combining unit 528. Furthermore, the user position information 531 is transmitted to the second location as viewing user position information 542 via the transmission unit 404. This transmission information is used as viewing user position information at the second location.

While the virtual viewpoint image generation unit 526 generates an image from a specific virtual viewpoint, from which viewpoint a virtual viewpoint image is to be generated is decided on the basis of the corresponding positional relationship between the displayed user and the viewing user similarly to what described in the above-described first exemplary embodiment.

For this processing, the virtual viewpoint image generation unit 526 inputs the user position information 531 generated by the user position detection unit 525, and further inputs the viewing user position information 532 received from the second location where the viewing user is located via the reception unit 402.

On the basis of these pieces of input information, the virtual viewpoint image generation unit 526 decides from which viewpoint a virtual viewpoint image is to be generated.

This is processing similar to what is described with reference to FIGS. 7A, 7B, 8, 9, 10A, 10B, 11A, 11B, 14A, 14B, 15A, 15B, 16, 17, 18A, and 18B corresponding to the above-described first exemplary embodiment. As basic processing, in a case where the viewing user and the displayed user face each other in the front direction, a virtual viewpoint image corresponding to the viewpoint of the viewing user with this setting is generated.

The virtual viewpoint image generated by the virtual viewpoint image generation unit 526 is output to the image combining unit 528.

The background image generated by the background image generation unit 527 is input to the image combining unit 528 together with the virtual viewpoint image generated by the virtual viewpoint image generation unit 526.

The background image generation unit 527 executes image correction processing such as occlusion filling correction described above with reference to FIG. 23 on the basis of the background image input from the background image separation unit 524, for example, and inputs the corrected background image to the image combining unit 528.

Note that the background image generation unit 527 generates the background image as a virtual image of the virtual viewpoint position of a central viewpoint between the center of the L viewpoint camera and the center of the R viewpoint camera, for example. Alternatively, it is allowable to use a configuration to generate background images from virtual viewpoints corresponding to a specific virtual viewpoint image used as a combined image, and then combine these images. In this case, for example, the virtual viewpoint information used by the virtual viewpoint image generation unit 526 can be input to the background image generation unit 527 for use.

The image combining unit 528 executes combining processing of combining one or more virtual viewpoint images of the person images generated by the virtual viewpoint image generation unit 526 and the background image generated by the background image generation unit 527, and generates a combined image (=transmission image (display image)) to be displayed on the display unit at the second location.

Note that the combining processing of the virtual viewpoint image including the person image is processing similar to what described in the first exemplary embodiment. For example, as described with reference to FIG. 9 or the like, a selected region is extracted from a plurality of virtual viewpoint images to generate one combined image.

Note that this combining processing is executed on the basis of the corresponding positional relationship between the displayed user and the viewing user.

As described with reference to FIGS. 7A, 7B, 8, 9, 10A, 10B, 11A, 11B, 14A, 14B, 15A, 15B, 16, 17, 18A, and 18B, basic processing generates a combined image in which a virtual viewpoint image from the viewpoint of the viewing user is set in a case where there is a displayed user in the front region of the viewing user.

Furthermore, in the second exemplary embodiment, a combined image of a plurality of virtual viewpoint images including a person is superimposed on the background image so as to generate a final combined image to be displayed on the display unit of the second location.

The combined image 541 generated by the combined image generation unit 528 is transmitted to the second location via the transmission unit 404.

3-3. Modification (Variation) of Configuration and Processing of Information Processing Apparatus According to Second Exemplary Embodiment Next, modifications (variations) of the configuration and processing of the information processing apparatus according to the second exemplary embodiment described with reference to FIGS. 22 to 24 will be described.

Hereinafter, modifiable configurations of the information processing apparatus according to the second exemplary embodiment described with reference to FIG. 24 will be sequentially described.

(1) Background Image Generation Unit

While the above description is an example in which the background image generated by the background image generation unit 527 is generated as a virtual image of the central viewpoint of the L viewpoint camera 121 and the R viewpoint camera 122, the image may be a virtual viewpoint image to match a virtual viewpoint image including a person used as a combined image.

In addition, the background image generation unit 527 may be configured to generate a background image using a 3D model for background prepared beforehand. Alternatively, a 2D image prepared beforehand may be used.

In addition, interpolation of a hole caused by the foreground of a person or the like can be performed on the 3D model in a 3D model generation means.

The background image generation unit 527 may input viewpoint position information of the other party's site (the second location) via the reception unit 402 and may determine the viewpoint position of the background image on the basis of the viewpoint position of participant of the other party's site.

(2) Other Modifications

Similarly to the first exemplary embodiment, the user position detection unit 525 continuously detects the position of the participant, making it possible to give a motion parallax to a video of the participant.

The viewpoint position information of the other party's site is input in the background image generation unit 527 via the reception unit 402, making it possible to give a motion parallax corresponding to the change of the viewpoint position of the participant to the background image.

In this processing, the background image may be divided and assigned to individual participants, and a different motion parallax may be given for each of the divided regions.

Note that in order to avoid an occurrence of discontinuous appearance at the boundary portion between the selected regions of the combined image, it is preferable to allow the motion parallax generated toward the boundary portion of each of the regions to be gradually reduced so as to generate a background image to substantially suppress occurrence of the motion parallax.

While the above-described exemplary embodiment is a case where a combined image to be displayed at the second location is generated at the first location, it is allowable to generate, at the first location, intermediate data needed for combined image generation processing, transmit this generated data to the second location, and execute combined image generation processing at the second location.

Examples of the intermediate data include images photographed from different viewpoints and depth data, 3D model data, or the like.

4. Configuration and Processing of Information Processing Apparatus According to Third Exemplary Embodiment of Present Disclosure Next, a configuration and processing of information processing apparatus according to a third exemplary embodiment of the present disclosure will be described.

The information processing apparatus according to the third exemplary embodiment described below controls a display image on a display unit (display) used in the bidirectional communication system illustrated in FIGS. 1, 2A, 2B and 2C described above, for example, similarly to the information processing apparatus of the first exemplary embodiment

4-1. Processing Executed by Information Processing Apparatus

Processing executed by the information processing apparatus according to the third exemplary embodiment of the present disclosure will be described with reference to FIGS. 25A and 25B and the following.

Figures 25A, 25B:
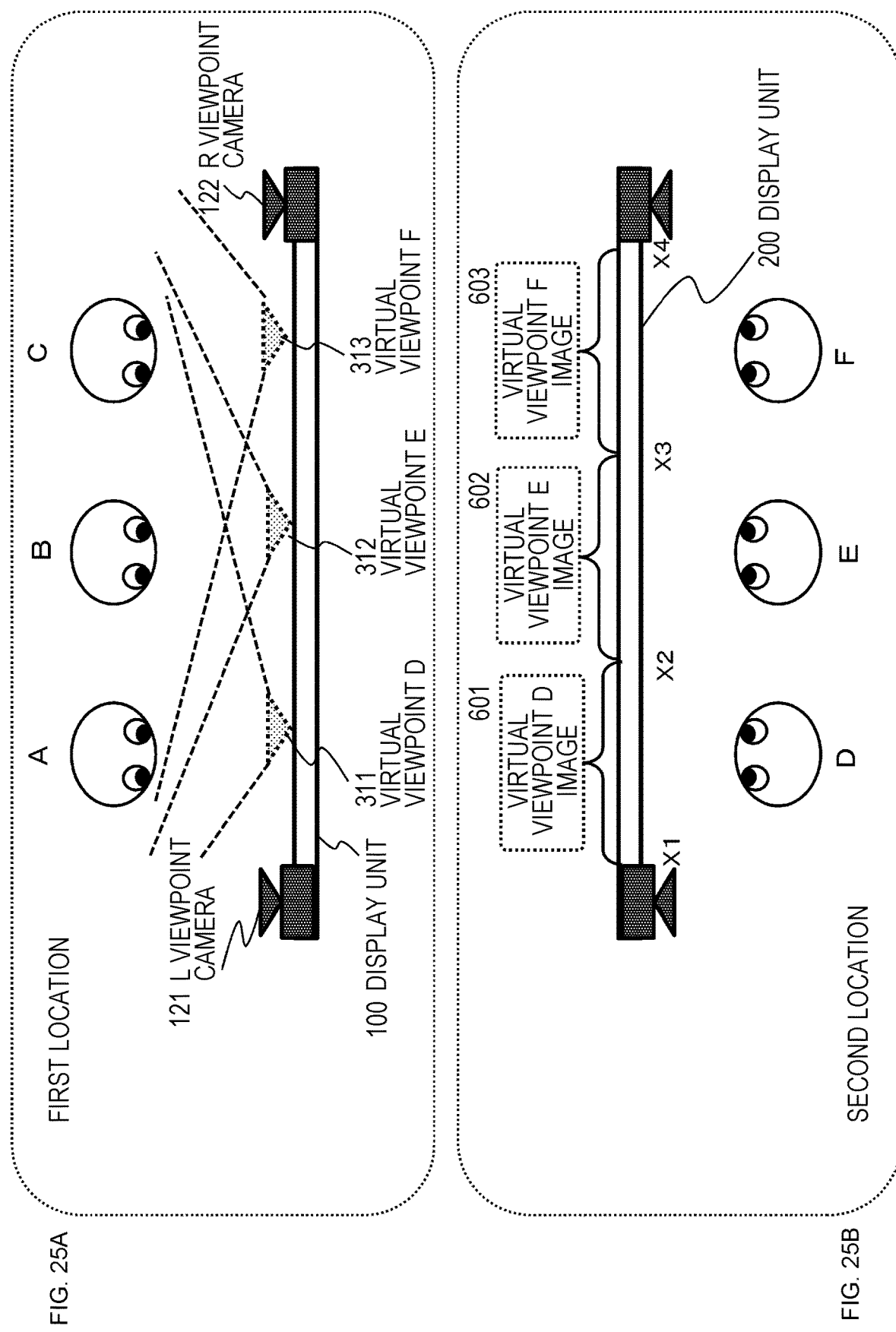
FIGS. 25A and 25B are diagrams illustrating exemplary processing executed by an information processing apparatus according to a third exemplary embodiment of the present disclosure.

FIGS. 25A and 25B illustrate users and a display unit at the first location and the second location during execution of bidirectional communication, similarly to the description with reference to FIGS. 1, 2A, 2B and 2C.

FIG. 25A is First location

FIG. 25B is Second location

The figure illustrates a configuration example of these two locations.

These two locations are remote places separated from each other, and users at individual locations perform bidirectional communication with each other. Systems at the individual locations are connected via a network, so as to transmit or receive images and voices.

There are users A, B, and C at the first location, and images containing users A, B, and C photographed by cameras 121 and 122 on the first location side, or a combined image generated on the basis of the photographed images is transmitted to the second location and displayed on a display unit 200 at the second location.

This display image is observed by viewing users D, E, and F at the second location.

Similarly, there are users D, E, and F at the second location, and images containing the users D, E, and F photographed by the cameras 221 and 222 on the second location side, or a combined image generated on the basis of the photographed images is transmitted to the first location and displayed on a display unit 100 at the first location.

This display image is observed by the viewing users A, B, and C at the first location.

The images photographed by the cameras 121 and 122 at the first location side are input to a data processing unit of an information processing apparatus on the first location side, and a transmission image (combined image) for the second location is generated and transmitted to the second location.

Similarly, the images photographed by the cameras 221 and 222 on the second location side are input to a data processing unit of an information processing apparatus on the second location side, and a transmission image (combined image) for the first location is generated and transmitted to the first location.

The above-described first exemplary embodiment is an exemplary configuration of generating and display a combined image in which the line-of-sight of the displayed user displayed in the display region in front of the viewing user watching the display unit is controlled to be in a same direction as the actual line-of-sight direction when observed from the viewpoint of the viewing user.

That is, as illustrated in FIGS. 25A and 25B, the combined image displayed on the display unit 200 at the second location has the following settings.

(1) Display region ranging from X1 to X2 in front of the viewing user D are images of virtual viewpoint D, (2) Display region ranging from X2 to X3 in front of the viewing user E are images of the virtual viewpoint E, and (3) Display region ranging from X3 to X4 in front of the viewing user F are images of the virtual viewpoint F.

In this manner, the image in the front region of the viewing user is set as the virtual viewpoint image observed from the viewpoint of each of the viewing users.

In the configuration of the first exemplary embodiment, in a case where the viewing user views a displayed user other than the front direction of the display unit, the displayed user is a virtual viewpoint image of a viewpoint different from the viewpoint of the viewing user, leading to a possibility of giving a strange feeling about the line-of-sight direction.

The third exemplary embodiment is an embodiment that solves such a problem.

Specifically, for example, the following processing is executed.

(1) Defining the display image of the display unit in the line-of-sight direction of the viewing user as the virtual viewpoint image observed from the viewpoint of the viewing user.

(2) Defining the image in the line-of-sight direction of the user (speaker) performing a dialog as the virtual viewpoint image observed from the viewpoint of the user (speaker).

(3) In a case where there is another viewer viewing the same image region, defining the user closer to the front of the image region as a priority user, and displaying a virtual viewpoint image observed from the viewpoint of the priority user in the image region.

The information processing apparatus according to the third exemplary embodiment executes the processing like these to generate a combined image, for example.

Processing executed by the information processing apparatus according to the third exemplary embodiment of the present disclosure will be described with reference to FIGS. 26A and 26B and the following.

FIGS. 26A and 26B illustrate the following two processing examples executed by the information processing apparatus of the third exemplary embodiment.

FIG. 26A is example 1 of controlling output images in accordance with line-of-sight direction of the viewing user.

FIG. 26B is example 2 of controlling output image in accordance with the line-of-sight direction of the viewing user (in a case where there is a plurality of viewing users viewing the same image region, viewing user closer to the screen position is given priority)

The example illustrated in FIG. 26A is an example of controlling an output image in accordance with the line-of-sight direction of the viewing user.

The user D is watching the front direction (region ranging from X1 to X2 of the display unit 200), and the region ranging from X1 to X2 of the display unit 200 displays a virtual viewpoint D image 611, that is, a virtual viewpoint image observed from the viewpoint of the user D.

The user E is watching the rightward direction (region ranging from X3 to X4 of the display unit 200), and the region ranging from X3 to X4 of the display unit 200 displays a virtual viewpoint E image 613, that is, a virtual viewpoint image observed from the viewpoint of the user E.

The user F is watching the leftward direction (region ranging from X2 to X3 of the display unit 200), and the region ranging from X2 to X3 of the display unit 200 displays a virtual viewpoint F image 612, that is, a virtual viewpoint image observed from the viewpoint of the user F.

Note that the users D to F illustrated in the figure are viewing users at the second location. The processing of generating the display image to be displayed on the display unit 200 is executed in the information processing apparatus at the first location.

The information processing apparatus at the first location inputs the line-of-sight direction information of the viewing users at the second location from the information processing apparatus at the second location, and on the basis of this information, generates a combined image with the setting as illustrated in FIG. 26A and transmits the generated image to the second location.

Note that it is also allowable to use a configuration in which the information processing apparatus at the first location generates three virtual viewpoint images corresponding to the entire display region of the display unit, that is, three display entire region-corresponding virtual viewpoint images corresponding to virtual viewpoints of the viewing users D, E, and F and transmits the images to the information processing apparatus at the second location, and the information processing apparatus at the second location executes image extraction from the display entire region-corresponding virtual viewpoint images in accordance with the line-of-sight direction of the viewing users D, E, and F and generates the combined image with the setting illustrated in FIG. 26A and displays the combined image on the display unit 200.

FIG. 26B illustrates an example of processing in a case where a plurality of viewing users views one display region of the display unit.

The viewing user D and the viewing user E are viewing the central region ranging from X2 to X3 of the display unit 200.

In this manner, in a case where a plurality of viewing users is watching the same display region, one of the users is selected as a priority user and a virtual viewpoint image from the viewpoint of the priority user is displayed in that region.

In the example illustrated in FIG. 26B, a user closer to the display region is defined as the priority user.

The region ranging from X1 to X2 of the display unit 200 displays a virtual viewpoint D image 621, that is, a virtual viewpoint image observed from the viewpoint of the user D in front of the region ranging from X1 to X2.

While the users D and E are viewing the region ranging from X2 to X3 of the display unit 200, the user closer to the region ranging from X2 to X3 is the user E, and thus, the user E is defined as the priority user. In this case, the region ranging from X2 to X3 displays a virtual viewpoint E image 622, that is, a virtual viewpoint image observed from the viewpoint of the user E as the priority user.

The user F is watching the frontward direction (region ranging from X3 to X4 of the display unit 200), and the region ranging from X3 to X4 of the display unit 200 displays a virtual viewpoint F image 623, that is, a virtual viewpoint image observed from the viewpoint of the user F.

Similarly to the description with reference to FIG. 26A, the combined image of this setting is generated by any of the information processing apparatus at the first location and the information processing apparatus at the second location.

FIG. 27 illustrates the following processing example executed by the information processing apparatus of the third exemplary embodiment.

FIG. 27 is an example of controlling output images in accordance with line-of-sight direction of a speaker among the viewing users.

The example illustrated in FIG. 27 is an example of controlling an output image in accordance with the line-of-sight direction of the speaker among the viewing users.

The viewing user D at the second location is a speaker and is speaking to the user B at the first location displayed in the display region ranging from X2 to X3 of the display unit.

In this case, the display image of the display region ranging from X2 to X3 is a virtual viewpoint D image 632, that is, the virtual viewpoint image observed from the viewpoint of the user D being the speaker among the viewing users.

While the viewing users D and F are directing their line-of-sight to the display region ranging from X2 to X3, the user D being the speaker is selected as the priority user, and the virtual viewpoint image observed from the viewpoint of the user D as the priority user is displayed as the virtual viewpoint D image 632.

The region ranging from X1 to X2 of the display unit 200 displays a virtual viewpoint D image 631, that is, a virtual viewpoint image observed from the viewpoint of the user D in front of the region ranging from X1 to X2.

The region ranging from X3 to X4 of the display unit 200 displays a virtual viewpoint E image 633, that is, a virtual viewpoint image observed from the viewpoint of the user E directing the line-of-sight to the region ranging from X3 to X4.

Similarly to the description with reference to FIG. 26A, the combined image of this setting is generated by any of the information processing apparatus at the first location and the information processing apparatus at the second location.

FIG. 28D illustrates the following processing example executed by the information processing apparatus of the third exemplary embodiment.

Figure 28:
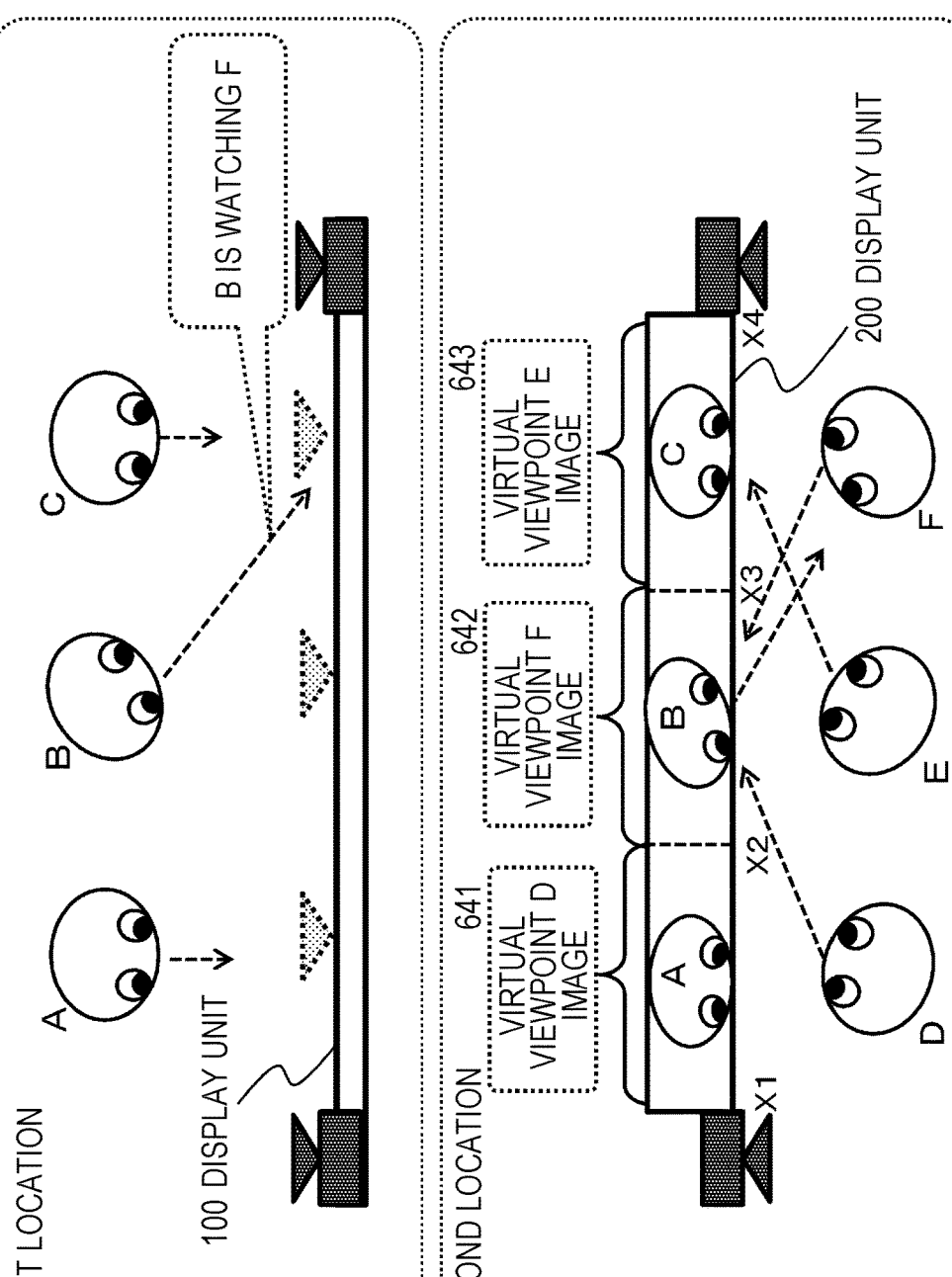
FIG. 28 is a diagram illustrating exemplary processing executed by an information processing apparatus according to the third exemplary embodiment of the present disclosure

FIG. 28 is an example of controlling output images in accordance with line-of-sight direction of the displayed user.

The example illustrated in FIG. 28 is an exemplary case where a plurality of viewing users is watching a same displayed user, and an image of the displayed user is decided in accordance with the line-of-sight of the displayed user.

The displayed user B at the first location is watching the user F at the second location displayed on the display unit 100 at the first location.

In contrast, the viewing user D and viewing user F at the second location are both viewing the same displayed user B.

Since the displayed user B displayed in this region is watching the viewing user F, the display region ranging from X2 to X3 displays a virtual viewpoint F image 642, that is, a virtual viewpoint image observed from the viewpoint of the user F among the viewing users.

In a case where the displayed user B is watching the viewing user E not viewing the display region ranging from X2 to X3, or in a case where the displayed user B is watching no one, the display region ranging from X2 to X3 presents a virtual viewpoint image of one of the viewing user D and the viewing user F.

This series of processing allows the viewing users D and F to understand that the displayed user B is not watching any of the viewing users D and F.

Note that the display region ranging from X3 to X4 presents the virtual viewpoint image of the viewing user E watching this region, that is, a virtual viewpoint E image 643 being a virtual viewpoint image observed from the viewpoint of the user E among the viewing users. Since no viewing users are viewing the display region ranging from X1 to X2, a virtual viewpoint E image 641 being a virtual viewpoint image observed from the viewpoint of the front viewing user D is presented.

Similarly to the description with reference to FIG. 26A, the combined image of this setting is generated by any of the information processing apparatus at the first location and the information processing apparatus at the second location.

4-2. Configuration Example of Information Processing Apparatus

Next, a configuration of the information processing apparatus according to the third exemplary embodiment will be described with reference to FIG. 29.

Figure 29:
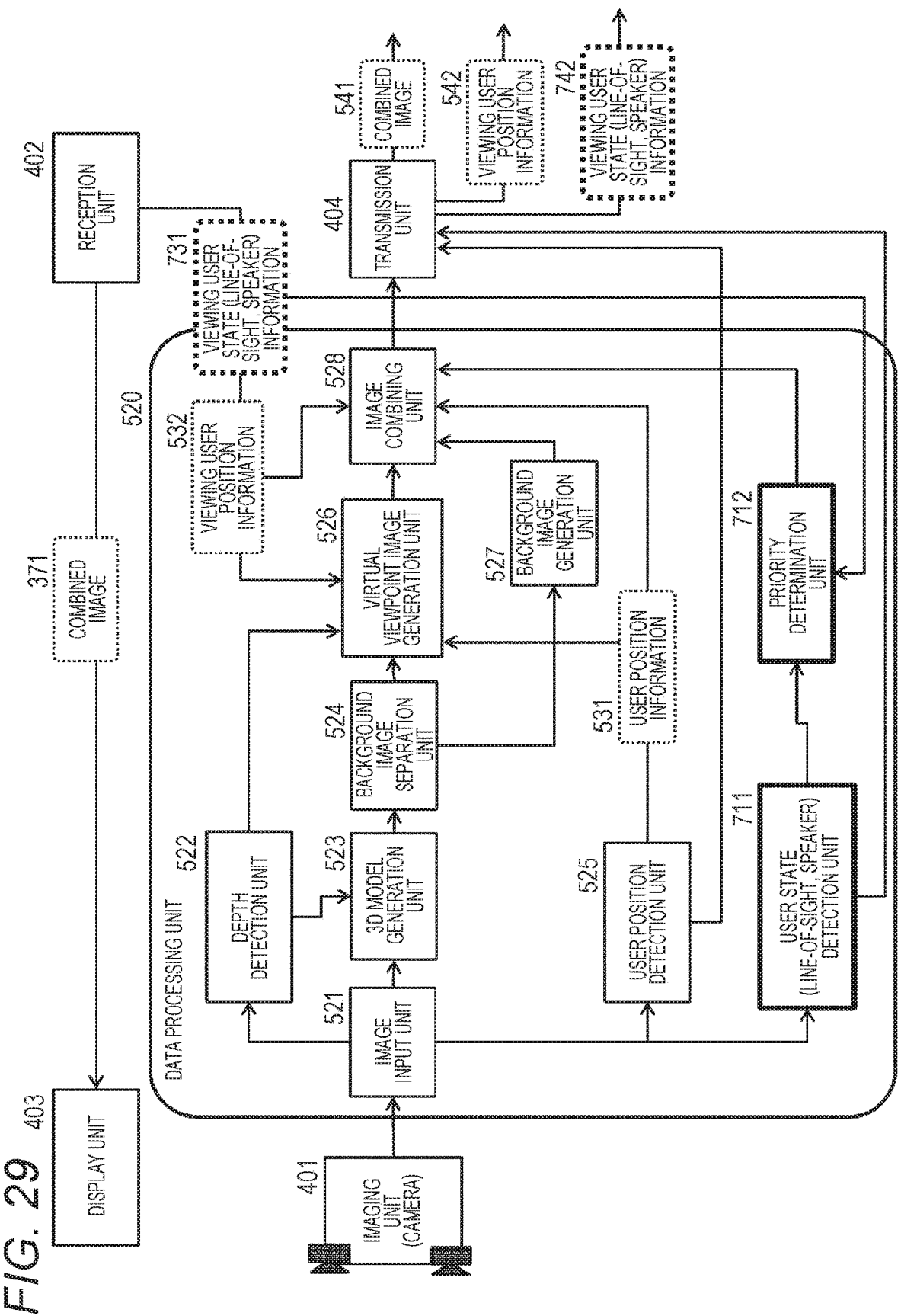

FIG. 29 is a block diagram illustrating a configuration example of an information processing apparatus installed at the first location.

Note that the same information processing apparatus is installed in the second location, and mutual transmission and reception of images, voices, and other control information are executed via a network.

The configuration of the information processing apparatus according to the third exemplary embodiment illustrated in FIG. 29 is based on the configuration of the information processing apparatus of the second exemplary embodiment described above with reference to FIG. 24, to which a user state (line-of-sight and speaker) detection unit 711 and a priority determination unit 712 have been added to the inside of the data processing unit 520 of the information processing apparatus illustrated in FIG. 24.

Moreover, viewing user state (line-of-sight, speaker) information 731 has been added as information from the second location to be input via the reception unit 402.

Furthermore, viewing user state (line-of-sight, speaker) information 742 being the user information on the first location side has been added as the information to be transmitted to the second location via the transmission unit 404.

The other configuration is the same as the configuration described with reference to FIG. 24 in the second exemplary embodiment.

Hereinafter, the configuration and processing of the third exemplary embodiment different from the second exemplary embodiment will be mainly described.

The user state (line-of-sight, speaker) detection unit 711 in the data processing unit 520 detects the user state of the user at the first location.

Specifically, the user state such as the line-of-sight direction of each of the users, whether each of the users is speaking is detected.

Specifically, the line-of-sight direction of the user is determined by executing discrimination of the line-of-sight direction of each of the users as to which user displayed on the display unit 403 is being viewed.

This line-of-sight direction determination processing is executed on the basis of a plurality of images photographed from different viewpoints input to the image input unit 521, for example.

The speaker detection is also executed on the basis of the image input to the image input unit 521.

Note that, in addition to the image-based processing, it is allowable to use a sensor for line-of-sight detection and a sensor for detecting voice direction in the line-of-sight detection processing and speaker detection processing.

Detection information of the user state (line-of-sight and speaker) detection unit 711 is input to the priority determination unit 712.

Furthermore, the information is transmitted to the second location via the transmission unit 404. This corresponds to the viewing user state (line-of-sight and speaker) information 742 illustrated in the figure.

The priority determination unit 712 inputs detection information of the user state (line-of-sight and speaker) detection unit 711, that is, the line-of-sight direction information of each of users or speaker information of each of users at the first location and viewing user state (line-of-sight and speaker) information 731 received from the second location via the reception unit 402, generates priority information of which viewpoint image as a virtual viewpoint image is to be set as the virtual viewpoint image to be set as the combined image, and inputs the generated information to an image combining unit 528.

Various methods are available for setting the priority. For example, the following priority settings are available.

(1) Calculate a distance from each of regions of the display unit to each of users, and assign higher priority to closer users.

(2) Identify users speaking most in fixed time units by microphone or the like, and assign high priority to that user, and (3) Receive the line-of-sight direction of the participant at the other party's site and assign higher priority to the user closer to the line-of-sight direction of the user at the other party's site corresponding to the region viewed by the plurality of users at the own site.

(4) Priority of each of users is assigned by the combination of (1) to (3) above.

The image combining unit 528 executes combining processing of combining one or more virtual viewpoint images of the person images generated by the virtual viewpoint image generation unit 526 and the background image generated by the background image generation unit 527, and generates a combined image (=transmission image (display image)) to be displayed on the display unit at the second location.

Note that basic combining processing of combining virtual viewpoint images including a person image in a case where there is a displayed user in the front region of the viewing user is processing of generating a combined image having the setting of a virtual viewpoint image from the viewpoint of the viewing user similarly to the first exemplary embodiment described with reference to FIGS. 7A, 7B, 8, 9, 10A, 10B, 11A, 11B, 14A, 14B, 15A, 15B, 16, 17, 18A, and 18B.

Furthermore, the third exemplary embodiment generates a combined image by deciding which viewpoint image as a virtual viewpoint image is to be set as the virtual viewpoint image to be set in each of region of the combined image on the basis of the priority information input from the priority determination unit 712 and the viewing user state (line-of-sight and speaker) information 731 input via the reception unit 402.

Specifically, a virtual viewpoint image to be output to each of the image regions is decided and a combined image is generated in accordance with the processing described above with reference to FIGS. 26A, 26B, 27C, and 28D.

For example, a virtual viewpoint image to be set in each of the image regions is decided in accordance with the following virtual viewpoint image setting algorithm.

(1) Defining the display image of the display unit in the line-of-sight direction of the viewing user as the virtual viewpoint image observed from the viewpoint of the viewing user.

(2) Defining the image in the line-of-sight direction of the user (speaker) performing a dialog as the virtual viewpoint image observed from the viewpoint of the user (speaker).

(3) In a case where there is another viewer viewing the same image region, defining the user closer to the front of the image region as a priority user, and displaying a virtual viewpoint image observed from the viewpoint of the priority user in the image region.

The image combining unit 528 of the information processing apparatus of the third exemplary embodiment executes these series of processing for example, and generates a combined image.

Note that the third exemplary embodiment is a case where a combined image of a plurality of virtual viewpoint images including a person is superimposed on the background image so as to generate a final combined image to be displayed on the display unit of the second location, similarly to the case of the second exemplary embodiment.

The combined image 541 generated by the combined image generation unit 528 is transmitted to the second location via the transmission unit 404.

4-3. Modification (Variation) of Configuration and Processing of Information Processing Apparatus According to Third Exemplary Embodiment Next, modifications (variations) of the configuration and processing of the information processing apparatus according to the third exemplary embodiment described with reference to FIGS. 25A, 25B, 26A, 26B, 27C, 27D, and 29 will now be described.

Hereinafter, modifiable configurations of the information processing apparatus according to the third exemplary embodiment described with reference to FIG. 29 will be sequentially described.

(1) Priority Setting

In the above-described exemplary embodiment, the following setting example has been described as a priority setting example.

(a) Calculate a distance from each of regions of the display unit to each of users, and assign higher priority to closer users.

(b) Identify users speaking most in fixed time units by microphone or the like, and assign high priority to that user, (c) Receive the line-of-sight direction of the participant at the other party's site and assign higher priority to the user closer to the line-of-sight direction of the user at the other party's site corresponding to the region viewed by the plurality of users at the own site, and (d) Priority of each of users is assigned by the combination of (a) to (c) above.

These are an example of priority setting, and various other priority setting algorithms can be applied.

For example, the priority may be set for a plurality of users (participants) beforehand, and the set priority may be used.

Moreover, it is possible to set priorities considering the user states of both the viewing user and the displayed user, priority settings considering solely the user state of either type of user, and the like.

In addition, the user closer to the display screen during the viewing user feels more strange about the line-of-sight, and thus, it is allowable to use the setting of increasing the priority for the user closer to the display screen.

In addition, various priority setting algorithms according to the situation can be applied.

An example of the priority determination executed by the priority determination unit 712 will be described below. For example, the priority determination unit 712 can determine the priority on the basis of the following information.

(a) Position of the displayed user to be displayed on the display unit, (b) Line-of-sight direction of the displayed user displayed on the display unit, (c) Speaker among the displayed users displayed on the display unit, (d) Position of the viewing user viewing the display unit, (e) Line-of-sight direction of the viewing user viewing the display unit, and (f) Speaker among the viewing users viewing the display unit.

Determination is made on the basis of at least one of the above types of information (a) to (f).

The setting example of the priority adopting the above-described criteria is the following setting, for example.

(a) For the display region displayed by the displayed user, the closer to the camera the position of the displayed user is, the higher priority is given.

Specifically, the processing is such that, for example, in a case where there are a large number of displayed users and this makes it difficult to specify the display region for each of the displayed users, and a plurality of displayed users enters one virtual viewpoint image region, priority is given to a displayed user closer to the camera, and the display region of this user is defined as a virtual viewpoint image from the viewpoint of the viewing user viewing the displayed user closer to the camera.

(b) For the display region displayed by the displayed user, the higher priority is given to the viewing user present in the line-of-sight direction.

(c) For the display region displaying the speaker among the displayed users, higher priority is given to the viewing user being the dialog partner of the displayed user.

(d) The shorter the distance between the position of the viewing user and the display region of the display unit, the higher priority is given to the viewing user for the display region.

(e) For the display region of the display unit in the line-of-sight direction of the viewing user, higher priority is given to the viewing user.

(f) For the display region in which the displayed user being the dialog partner of the speaker among the viewing users, higher priority is given to the viewing user.

(2) Modification of Entire Processing

While the above-described exemplary embodiment is a case where a combined image to be displayed at the second location is generated at the first location, it is allowable to generate, at the first location, intermediate data needed for combined image generation processing, transmit this generated data to the second location, and execute combined image generation processing at the second location.

Examples of the intermediate data include images photographed from different viewpoints and depth data, 3D model data, or the like.

5. Hardware Configuration Example of Information Processing Apparatus

Next, an example of the hardware configuration of the information processing apparatus will be described with reference to FIG. 30.

Figure 30:
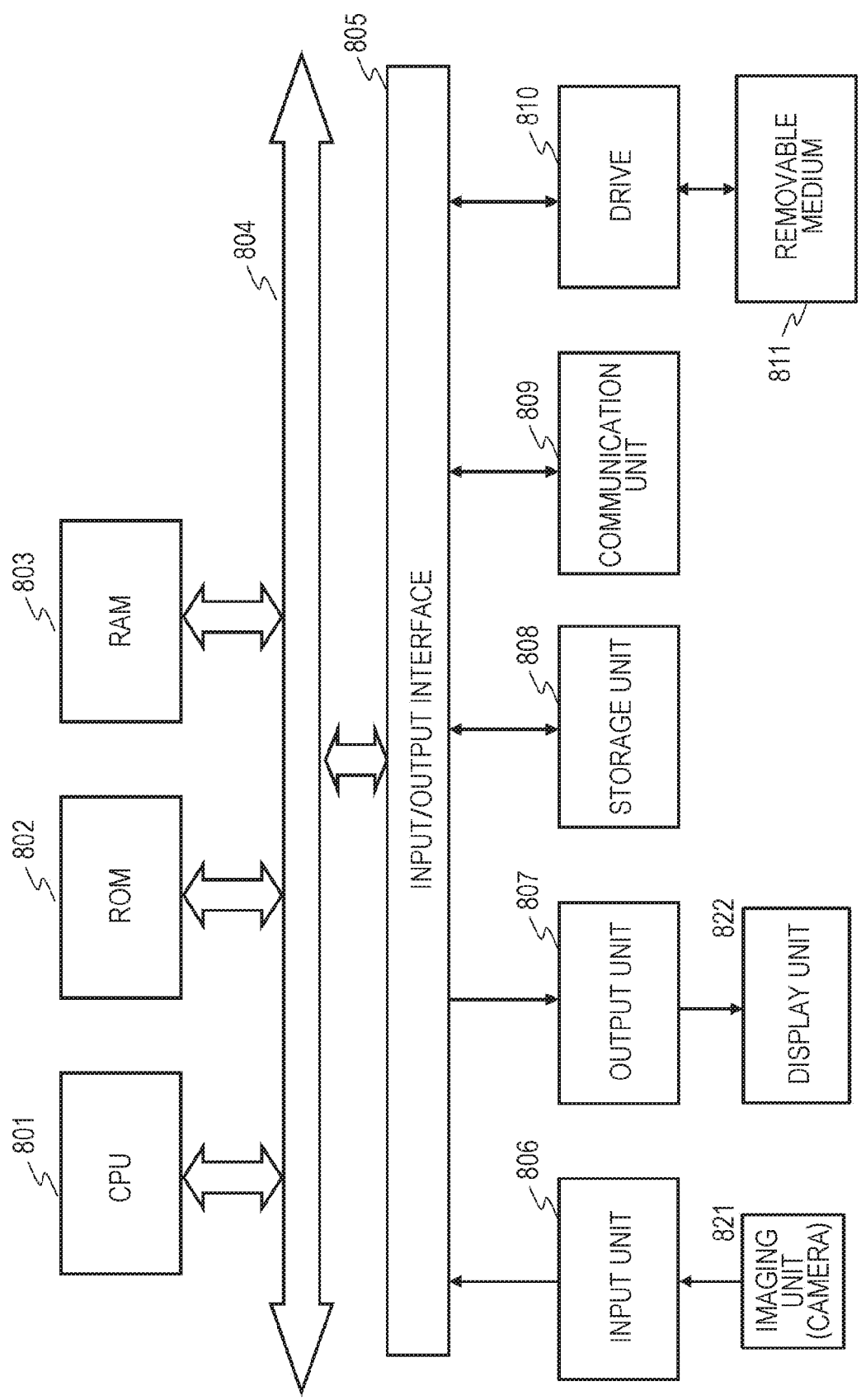

FIG. 30 is a diagram illustrating a hardware configuration example of an information processing apparatus that executes processing according to the present disclosure.

A central processing unit (CPU) 801 functions as a control unit or a data processing unit that executes various types of processing in accordance with a program stored in a read only memory (ROM) 802 or a storage unit 808. For example, the processing according to the sequence described in the above exemplary embodiment is executed. A random access memory (RAM) 803 stores programs executed by the CPU 801, data, or the like. The CPU 801, the ROM 802, and the RAM 803 are mutually connected by a bus 804.

The CPU 801 is connected to an input/output interface 805 via the bus 804. The input/output interface 805 is connected to an input unit 806 that inputs a photographed image of an imaging unit 821, and including various switches, a keyboard, a mouse, a microphone, and the like that can be used for user input, and also connected to an output unit 807 that executes data output to a display unit 822, a speaker, or the like. The CPU 801 executes various types of processing in accordance with an instruction input from the input unit 806, and outputs processing results to the output unit 807, for example.

The storage unit 808 connected to the input/output interface 805 includes a hard disk and the like, for example, and stores a program to be executed by the CPU 801 and various data. A communication unit 809 functions as a transmission/reception unit for Wi-Fi communication, Bluetooth (registered trademark) (BT) communication, and other data communication via a network such as the Internet and a local area network, and communicates with an external apparatus.

A drive 810 connected to the input/output interface 805 drives a removable medium 811 such as a magnetic disk, an optical disk, a magneto-optical disk, a semiconductor memory such as a memory card, and executes data recording or reading.

6. Summary of the Configuration of the Present Disclosure

As explained above, the exemplary embodiments of the present disclosure have been described in detail with reference to specific exemplary embodiments. Still, it is self-evident that those skilled in the art can make modifications and substitutions of the exemplary embodiments without departing from the scope and spirit of the present disclosure. That is, the present invention has been disclosed in the form of exemplification, and should not be interpreted restrictively. In order to judge the scope and spirit of the present disclosure, the scope of claims should be taken into consideration.

Note that the technology disclosed in this specification can be configured as follows.

(1) An information processing apparatus including:
a virtual viewpoint image generation unit that inputs a photographed image from a plurality of different viewpoints and generates a plurality of virtual viewpoint images; and
an image combining unit that combines the plurality of virtual viewpoint images to generate a combined image to be output to a display unit,
in which the virtual viewpoint image generation unit generates a plurality of user viewpoint-corresponding virtual viewpoint images each corresponding to each of viewpoints of a plurality of viewing users viewing the display unit, and
the image combining unit
extracts a portion of each of the plurality of user viewpoint-corresponding virtual viewpoint images in accordance with a relative position between the viewing user and the display unit, and combines the extracted images to generate the combined image.

(2) The information processing apparatus according to (1),
in which the image combining unit
extracts a display region image located at a front position of the viewing user at the viewpoint corresponding to the virtual viewpoint image from among the user viewpoint-corresponding virtual viewpoint images corresponding to individual viewing users, and
combines individual extracted images to generate the combined image.

(3) The information processing apparatus according to (1) or (2),
in which the virtual viewpoint image generation unit generates a user viewpoint-corresponding virtual viewpoint image corresponding to a viewing user solely in a case where there is a displayed user in a display region in front of the viewing user.

(4) The information processing apparatus according to any of (1) to (3),
in which the virtual viewpoint image generation unit generates a virtual viewpoint image with application of photographed images photographed from a plurality of different viewpoints and depth data including distance information of the subject included in the photographed image.

(5) The information processing apparatus according to any of (1) to (4),
in which the virtual viewpoint image generation unit includes a 3D model generation unit, and
generates a 3D model with application of photographed images photographed from a plurality of different viewpoints and depth data including distance information of the subject included in the photographed image and generates a virtual viewpoint image using the generated 3D model.

(6) The information processing apparatus according to any of (1) to (5),
in which the image combining unit
inputs position information of the input viewing user, and uses the position information of the viewing user to generate a combined image including a plurality of user viewpoint-corresponding virtual viewpoint images each corresponding to each of viewpoints of a plurality of viewing users viewing the display unit.

(7) The information processing apparatus according to any of (1) to (6),
in which the image combining unit
inputs position information of the displayed user to be displayed at the display unit, and generates a combined image including a plurality of user viewpoint-corresponding virtual viewpoint images on the basis of a corresponding relationship between the position information of the displayed user and the position information of the viewing user.

(8) The information processing apparatus according to (7),
in which the image combining unit generates a combined image including a viewpoint-corresponding virtual viewpoint image of the viewing user in a case where the position of the displayed user and the position of the viewing user are set to face each other.

(9) The information processing apparatus according to any of (1) to (8),
further including a background image separation unit that separates a person and a background image from the photographed image,
in which the virtual viewpoint image generation unit generates a virtual viewpoint image with application of an image including the person, and the image combining unit executes combining processing of combining a virtual viewpoint image including a person generated by the virtual viewpoint image generation unit, and a background image.

(10) The information processing apparatus according to (9), further including a background image generation unit that performs filling correction on an occlusion region of the background image generated by the background image separation unit to generate a corrected background image, in which the image combining unit executes combining processing of combining a virtual viewpoint image including a person generated by the virtual viewpoint image generation unit, and the corrected background image.

(11) The information processing apparatus according to any of (1) to (10), in which the image combining unit decides a virtual viewpoint image to be included in the combined image in accordance with a priority calculated by a predefined priority algorithm.

(12) The information processing apparatus according to (11), in which the priority is priority decided by at least any of information of the following (a) to (f):

(a) a position of a displayed user to be displayed on the display unit;

(b) a line-of-sight direction of a displayed user to be displayed on the display unit;

(c) a speaker among displayed users to be displayed on the display unit;

(d) a position of a viewing user viewing the display unit;

(e) a line-of-sight direction of the viewing user viewing the display unit; and (f) a speaker among the viewing users viewing the display unit.

(13) The information processing apparatus according to any of (1) to (12), further including a transmission unit that transmits the combined image generated by the image combining unit.

(14) The information processing apparatus according to any of (1) to (12), further including a display unit that displays the combined image generated by the image combining unit.

(15) An information processing apparatus including:

a reception unit that executes data reception via a communication network;

a virtual viewpoint image generation unit that inputs, via the reception unit, a photographed image from a plurality of different viewpoints and generates a plurality of virtual viewpoint images;

an image combining unit that combines the plurality of virtual viewpoint images to generate a combined image to be output to a display unit, and the display unit that displays the combined image, in which the virtual viewpoint image generation unit generates a plurality of user viewpoint-corresponding virtual viewpoint images each corresponding to each of viewpoints of a plurality of viewing users viewing the display unit, and the image combining unit extracts a portion of each of the plurality of user viewpoint-corresponding virtual viewpoint images in accordance with a relative position between the viewing user and the display unit, and combines the extracted images to generate the combined image.

(16) An information processing system including:

a transmission apparatus that executes image transmission; and a reception apparatus that receives a transmission image from the transmission apparatus and displays the transmission image on a display unit, in which the transmission apparatus includes:

a virtual viewpoint image generation unit that inputs a photographed image from a plurality of different viewpoints and generates a plurality of virtual viewpoint images; and an image combining unit that combines the plurality of virtual viewpoint images to generate a combined image to be output to the display unit, the virtual viewpoint image generation unit generates a plurality of user viewpoint-corresponding virtual viewpoint images each corresponding to each of viewpoints of a plurality of viewing users viewing the display unit, the image combining unit extracts a portion from each of the plurality of user viewpoint-corresponding virtual viewpoint images in accordance with a relative position between the viewing user and the display unit, and combines the extracted image to generate the combined image, and the reception apparatus receives the combined image transmitted by the transmission apparatus, and displays the received combined image on the display unit.

(17) An information processing method to be executed on an information processing apparatus, the information processing apparatus including:

a virtual viewpoint image generation unit that inputs a photographed image from a plurality of different viewpoints and generates a plurality of virtual viewpoint images; and an image combining unit that combines the plurality of virtual viewpoint images to generate a combined image to be output to a display unit, in which the virtual viewpoint image generation unit generates a plurality of user viewpoint-corresponding virtual viewpoint images each corresponding to each of viewpoints of a plurality of viewing users viewing the display unit, and the image combining unit extracts a portion of each of the plurality of user viewpoint-corresponding virtual viewpoint images in accordance with the relative position between the viewing user and the display unit, and combines the extracted images to generate the combined image.

(18) A program that causes an information processing apparatus to execute information processing, the information processing apparatus including:

a virtual viewpoint image generation unit that inputs a photographed image from a plurality of different viewpoints and generates a plurality of virtual viewpoint images; and an image combining unit that combines the plurality of virtual viewpoint images to generate a combined image to be output to a display unit, in which the program causes the virtual viewpoint image generation unit to generate a plurality of user viewpoint-corresponding virtual viewpoint images each corresponding to each of viewpoints of a plurality of viewing users viewing the display unit, and causes the image combining unit to execute processing of extracting a portion of each of the plurality of user viewpoint-corresponding virtual viewpoint images in accordance with the relative position between the viewing user and the display unit, and processing of combining the extracted images to generate the combined image.

In addition, the series of processing described in the specification can be executed by hardware, software, or a combination of both. In the case of executing the processing by software, it is possible to allow the program recording processing sequences to be installed and executed on a memory within a computer, incorporated in dedicated hardware, or possible to allow the program to be installed and executed on a general-purpose computer capable of executing various types of processing. For example, the program can be recorded in the recording medium beforehand. The program can be installed from a recording medium to a computer, or can be received via a network such as a local area network (LAN) so as to be installed in a recording medium such as a built-in hard disk.

Note that the various types of processing described in the specification may be executed in parallel or individually in accordance with the processing capability of the apparatus that executes the processing or in accordance with necessity, in addition to execution in time series following the description. Moreover, in the present description, the system represents a logical set of a plurality of apparatuses, and that all the constituent apparatuses need not be in a same housing.

INDUSTRIAL APPLICABILITY

As described above, according to a configuration of an exemplary embodiment of the present disclosure, it is possible to achieve a configuration that reduces the artificiality to give a strange feeling about the viewpoint of the user displayed on the display unit not matching with the actual viewpoint.

Specifically, a photographed image from a plurality of different viewpoints is input to generate a plurality of virtual viewpoint images, and then, the plurality of virtual viewpoint images is combined to generate a combined image to be output on a display unit. The virtual viewpoint image generation unit generates a plurality of user viewpoint-corresponding virtual viewpoint images each corresponding to each of viewpoints of each of a plurality of viewing users viewing the display unit, while the image combining unit extracts a portion from each of the plurality of user viewpoint-corresponding virtual viewpoint images in accordance with a relative position between the viewing user and the display unit, and combines the extracted image to generate a combined image. The combined image is generated by extracting a display region image located at a front position of the viewing user at the viewpoint corresponding to the virtual viewpoint image from among the user viewpoint-corresponding virtual viewpoint images corresponding to individual viewing users.

With this configuration, it is possible to achieve a configuration that reduces the artificiality to give a strange feeling about the viewpoint of the user displayed on the display unit not matching with the actual viewpoint.

REFERENCE SIGNS LIST 10, 20 Data processing unit
11, 21 Display unit (display)
12, 22 Camera
13, 23 Speaker
30 Network
100 Display unit
121 L viewpoint camera
122 R viewpoint camera
200 Display unit
311 Virtual viewpoint D
312 Virtual viewpoint E
313 Virtual viewpoint F
321 Virtual viewpoint D image
322 Virtual viewpoint E image
323 Virtual viewpoint F image
326 to 328 Selected region
331 Combined image
341 Virtual viewpoint D image
342 Virtual viewpoint E image
343 Virtual viewpoint F image
351 to 352 Selected region
361 Combined image
381 to 382 Selected region
383 Combined image
391 Virtual viewpoint D image
392 Virtual viewpoint F image
401 Imaging unit
402 Reception unit
403 Display unit
404 Transmission unit
410 Data processing unit
411 Image input unit
412 Depth detection unit
413 User position detection unit
414 Virtual viewpoint image generation unit
415 Image combining unit
520 Data processing unit
521 Image input unit
522 Depth detection unit
523 3D model generation unit
524 Background separation unit
525 User position detection unit
526 Virtual viewpoint image generation unit
527 Background image generation unit
528 Image combining unit
711 User state (line-of-sight and speaker) detection unit
712 Priority determination unit
801 CPU
802 ROM
803 RAM
804 Bus
805 Input/output interface
806 Input unit
807 Output unit
808 Storage unit
809 Communication unit
810 Drive
811 Removable medium
821 Imaging unit
822 Display unit

The invention claimed is:

1. An information processing apparatus, comprising:
a display device; and
circuitry configured to:
input a photographed image from a plurality of viewpoints;
generate a plurality of virtual viewpoint images based on the photographed image;
combine the plurality of virtual viewpoint images to generate a combined image to be output to the display device;
generate a plurality of user viewpoint images of a plurality of viewing users based on a line-of-sight direction of each of the plurality of viewing users, wherein
the plurality of user viewpoint images corresponds to the plurality of virtual viewpoint images, and
the plurality of viewing users views the display device;

extract a portion of each of the plurality of user viewpoint images based on a relative position between each viewing user of the plurality of viewing users and the display device; and generate the combined image based on a combination of the extracted portion.

2. The information processing apparatus according to claim 1, wherein the circuitry is further configured to:

extract a display region image from among the plurality of user viewpoint images corresponding to each viewing user of the plurality of viewing users, wherein the display region image is at a front position of a viewing user of the plurality of viewing users at a virtual viewpoint image of the plurality of virtual viewpoint images; and generate the combined image based on a combination of the extracted display region image.

3. The information processing apparatus according to claim 1, wherein a user viewpoint image of the plurality of user viewpoint images corresponds to a viewing user of the plurality of viewing users solely in a case where there is a displayed user in a display region in front of the viewing user.

4. The information processing apparatus according to claim 1, wherein a virtual viewpoint image of the plurality of virtual viewpoint images based on the photographed image and depth data including distance information of a subject in the photographed image.

5. The information processing apparatus according to claim 1, wherein the circuitry is further configured to:

generate a 3D model the photographed image and depth data including distance information of a subject in the photographed image; and generate a virtual viewpoint image of the plurality of virtual viewpoint images based on the generated 3D model.

6. The information processing apparatus according to claim 1, wherein the circuitry is further configured to:

receive position information of the plurality of viewing users, and generate the combined image based on the position information, wherein the combined image includes the plurality of user viewpoint images.

7. The information processing apparatus according to claim 1, wherein the circuitry is further configured to:

receive position information of a displayed user to be displayed at the display device; and generate the combined image including the plurality of user viewpoint images based on a corresponding relationship between the position information of the displayed user and position information of a viewing user of the plurality of viewing users.

8. The information processing apparatus according to claim 7, wherein the circuitry is further configured to generate the combined image including a user viewpoint image of a viewing user of the plurality of viewing users based on a position of the displayed user faces a position of the viewing user.

9. The information processing apparatus according to claim 1, wherein the circuitry is further configured to:

separate a person and a background image from the photographed image;

generate a virtual viewpoint image of the plurality of virtual viewpoint images based on an image including the person; and combine the virtual viewpoint image and the background image.

10. The information processing apparatus according to claim 9, wherein the circuitry is further configured to:

generate a corrected background image based on filling correction on an occlusion region of the background image; and combine the virtual viewpoint image and the corrected background image.

11. The information processing apparatus according to claim 1, wherein the circuitry is further configured to:

determine a priority based on a priority algorithm; and determine that a virtual viewpoint image of the plurality of virtual viewpoint images is to be included in the combined image based on the priority.

12. The information processing apparatus according to claim 11, wherein the circuitry is further configured to determine the priority based on:

a position of a plurality displayed users to be displayed on the display device;

a line-of-sight direction of a displayed user of a plurality of displayed users to be displayed on the display device;

a speaker among the plurality of displayed users;

a position of a viewing user of the plurality of viewing users that views the display device;

the line-of-sight direction of the viewing user; and a speaker among the plurality of viewing users.

13. The information processing apparatus according to claim 1, wherein the circuitry is further configured to transmit the combined image.

14. The information processing apparatus according to claim 1, wherein the display device is configured to display the combined image.

15. An information processing apparatus, comprising:

circuitry configured to:

receive data via a communication network;

input, via a reception device, a photographed image from a plurality of viewpoints; and generate a plurality of virtual viewpoint images based on the photographed image;

combine the plurality of virtual viewpoint images to generate a combined image to be output to a display device;

control the display device to display the combined image;

generate a plurality of user viewpoint images of a plurality of viewing users based on a line-of-sight direction of each of the plurality of viewing users, wherein the plurality of user viewpoint images corresponds to the plurality of virtual viewpoint images, and the plurality of viewing users views the display device;

extract a portion of each of the plurality of user viewpoint images based on a relative position between each viewing user of the plurality of viewing users and the display device; and generate the combined image based on a combination of the extracted portion.

16. An information processing system, comprising:

a transmission apparatus configured to transmit an image; and a reception apparatus configured to:

receive the image from the transmission apparatus; and control a display device to display the image, wherein the transmission apparatus includes a circuitry configured to input a photographed image from a plurality of viewpoints;

generate a plurality of virtual viewpoint images based on the photographed image;

combine the plurality of virtual viewpoint images to generate a combined image to be output to the display device;

generate a plurality of user viewpoint images of a plurality of viewing users based on a line-of-sight direction of each of the plurality of viewing users, wherein the plurality of user viewpoint images corresponds to the plurality of virtual viewpoint images, and the plurality of viewing users views the display device;

extract a portion from each of the plurality of user viewpoint images based on a relative position between each viewing user of the plurality of viewing users and the display device; and generate the combined image based on a combination of the extracted portion, wherein the reception apparatus is further configured to:

receive the combined image transmitted by the transmission apparatus; and display the received combined image on the display device.

17. An information processing method, comprising:

in an information processing apparatus:

inputting a photographed image from a plurality of viewpoints;

generating a plurality of virtual viewpoint images based on the photographed image;

combining the plurality of virtual viewpoint images to generate a combined image to be output to a display device;

generating a plurality of user viewpoint images of a plurality of viewing users based on a line-of-sight direction of each of the plurality of viewing users, wherein the plurality of user viewpoint images corresponds to the plurality of virtual viewpoint images, and the plurality of viewing users views the display device;

extracting a portion of each of the plurality of user viewpoint images based on a relative position between each viewing user of the plurality of viewing users and the display device; and generating the combined image based on a combination of the extracted portion.

18. A non-transitory computer-readable medium having stored thereon, computer-executable instructions, which when executed by an information processing apparatus, cause the information processing apparatus to execute operations, the operations comprising:

inputting a photographed image from a plurality of viewpoints;

generating a plurality of virtual viewpoint images based on the photographed image;

combining the plurality of virtual viewpoint images to generate a combined image to be output to a display device;

generating a plurality of user viewpoint images of a plurality of viewing users based on a line-of-sight direction of each of the plurality of viewing users, wherein the plurality of user viewpoint images corresponds to the plurality of virtual viewpoint images, and the plurality of viewing users views the display device;

extracting a portion of each of the plurality of user viewpoint images based on a relative position between each viewing user of the plurality of viewing users and the display device; and generating the combined image based on a combination of the extracted portion.

\* \* \* \* \*